United States Patent [19]

Demuth et al.

[11] 4,450,525

[45] May 22, 1984

[54] CONTROL UNIT FOR A FUNCTIONAL PROCESSOR

[75] Inventors: Gordon L. Demuth; John E. Hinkle; J. Thomas Moran, all of Manassas, Va.

[73] Assignee: IBM Corporation, Armonk, N.Y.

[21] Appl. No.: 328,167

[22] Filed: Dec. 7, 1981

[51] Int. Cl.³ .......................... G06F 9/22; G06F 9/28
[52] U.S. Cl. .................................................. 364/200
[58] Field of Search ... 364/200 MS File; 900 MS File

[56] References Cited

U.S. PATENT DOCUMENTS

| | | | |
|---|---|---|---|
| 3,231,863 | 1/1966 | Ulfsparre | 364/200 |
| 3,740,728 | 6/1973 | Pullen | 364/200 |
| 3,900,834 | 8/1975 | Casey et al. | 364/200 |
| 3,935,563 | 1/1976 | Unger | 364/200 |
| 3,980,992 | 9/1976 | Levy et al. | 364/200 |
| 3,984,817 | 10/1976 | Barbour et al. | 364/200 |
| 4,016,543 | 4/1977 | Franks et al. | 364/200 |
| 4,041,462 | 8/1977 | Davis et al. | 364/200 |
| 4,058,715 | 11/1977 | Niwa | 364/726 |
| 4,064,554 | 12/1977 | Tubbs | 364/200 |
| 4,068,304 | 1/1978 | Beausoleil et al. | 364/200 |
| 4,095,269 | 6/1978 | Kawabe et al. | 364/200 |
| 4,109,311 | 8/1978 | Blum et al. | 364/200 |
| 4,110,822 | 8/1978 | Porter et al. | 364/200 |
| 4,115,853 | 9/1978 | Dummermuth | 364/900 |
| 4,138,730 | 2/1979 | Ali | 364/726 |
| 4,156,925 | 5/1979 | Tutt et al. | 364/200 |
| 4,181,934 | 1/1980 | Marenin | 364/200 |
| 4,181,935 | 1/1980 | Feeser et al. | 364/200 |

Primary Examiner—Jerry Smith
Assistant Examiner—Mark P. Watson
Attorney, Agent, or Firm—John E. Hoel

[57] ABSTRACT

A control unit for a functional processor is disclosed which minimizes programming complexity by eliminating data transfers and the transfer control associated with two level memory systems and which improves flexibility in program task changeovers in pipelined arithmetic architectures. This is accomplished by employing common page addressing for accessing memory address stacks for storing either main memory addresses or address increments, coefficient address stacks for storing coefficient memory addresses or address increments, and microinstruction sequencing control branch stacks for storing branch and loop control parameters. This permits chaining of long sequences of signal processing subroutines without external control and the associated execution time overhead. An additional feature is a revolving buffer operation in which a plurality of main memory modules are cyclically connected to each of a plurality of scratch pad buffers in the arithmetic unit in a synchronous manner so as to maximize the throughput of the combined operation of memory transfers, arithmetic processing and I/O transfers. In another feature, the controller employs a dual clocking arrangement whereby scratch pad storage elements and arithmetic elements can be selectively controlled to operate at twice the rate at which microinstructions are accessed from the microprogram store. The resulting controller for a pipelined arithmetic architecture provides a closely coupled control of looping and branching control operations with storage accessing operations and pipelined arithmetic operations to provide for immediate and flexible responses to changes in programming tasks.

69 Claims, 24 Drawing Figures

BRANCH AND LINK CONTROL

- 64K BY 16 BITS/BSM
- 4 MHZ TRANSFER(TOTAL)/BSM
- ALL EXTERNAL TRANSFERS ARE BLOCK TRANSFERS
- REVOLVING BUFFER-TWO PORTS

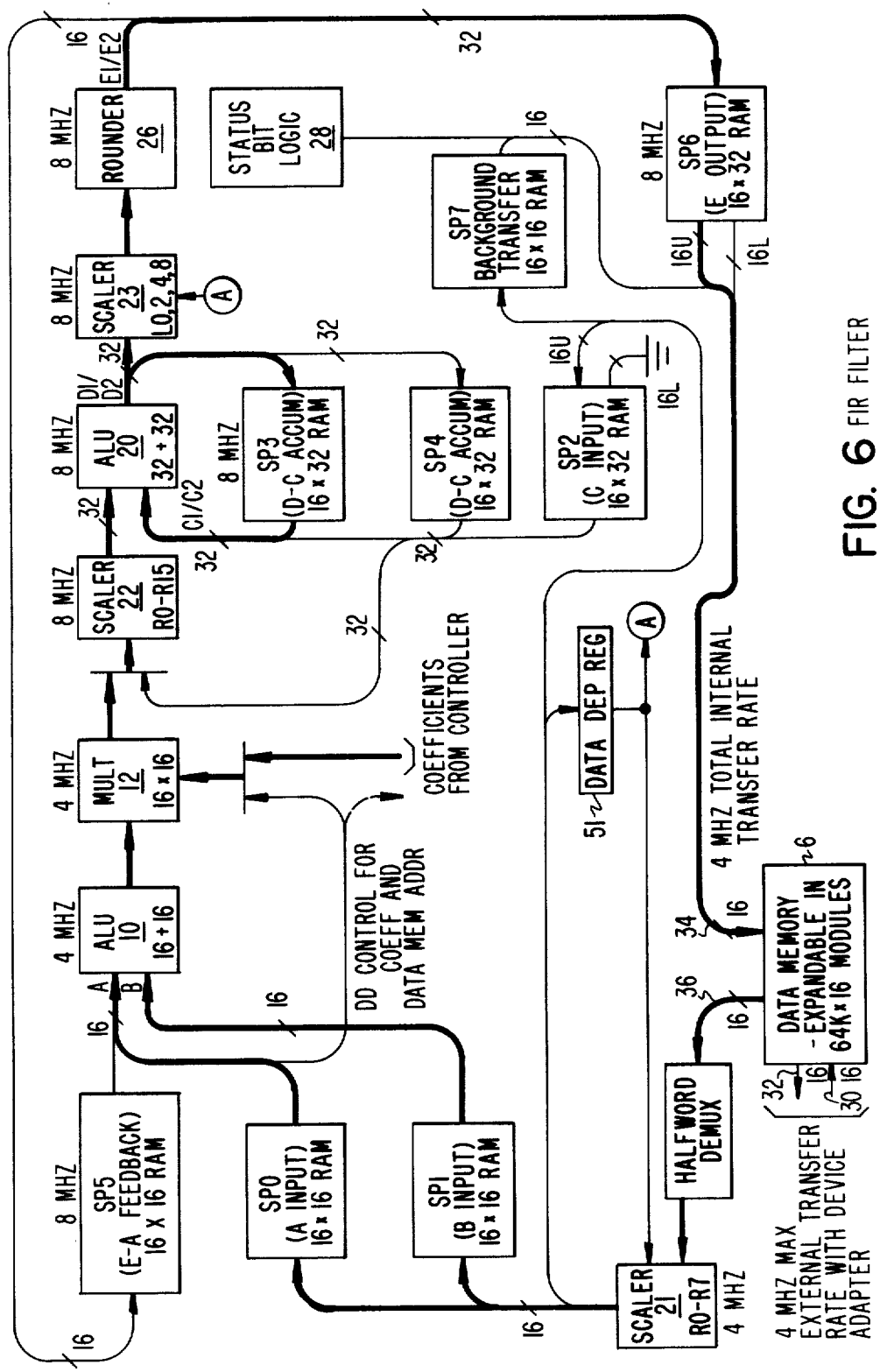
FIG. 6 FIR FILTER

FFT BUTTERFLY

FIG. 10 BEAMFORMING

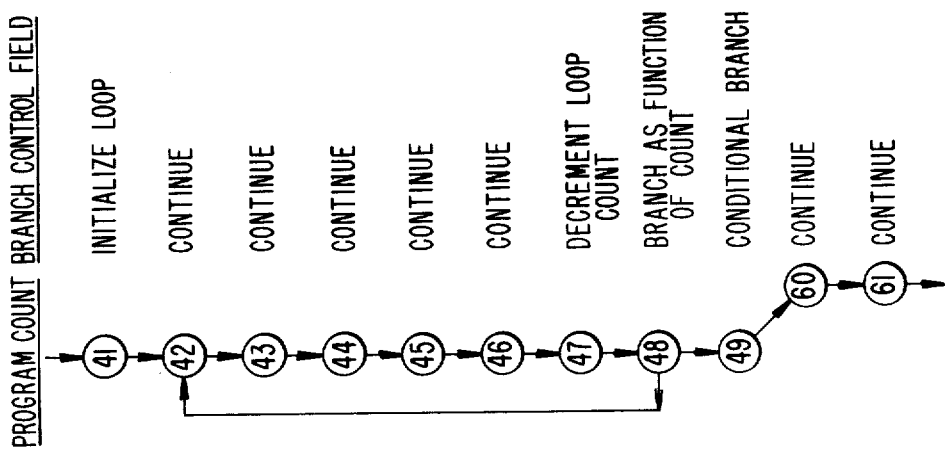
FIG. 22 LOOP CONTROL
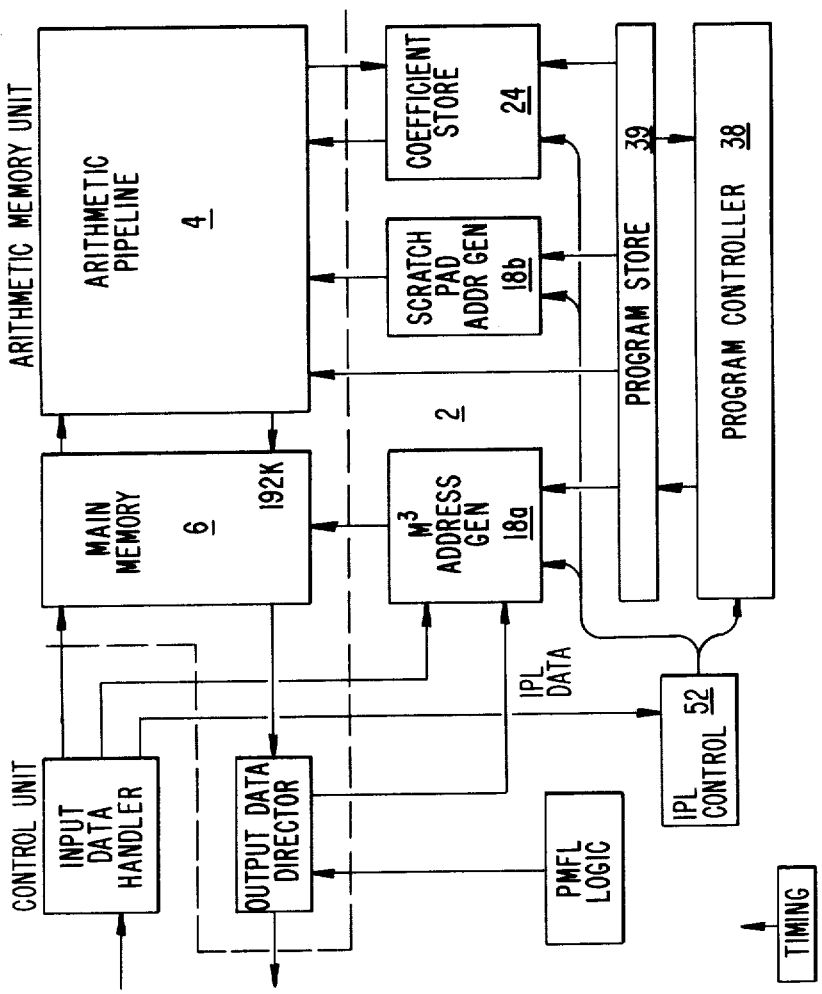
FIG. 14

UNCONDITIONAL/CONDITIONAL
BRANCH CONTROL

CONTROL UNIT FOR A FUNCTIONAL PROCESSOR

FIELD OF THE INVENTION

The invention disclosed broadly relates to data processors and more particularly relates to high speed signal processing computers.

BACKGROUND OF THE INVENTION

Most prior art general purpose digital computers employ a central system organization in which main storage is connected to outlying secondary storage on one side and to the central processing unit on the other. The main storage hardware is frequently divided into hierarchical levels in which a small, fast access working storage is directly connected to the central processing unit and larger, slower access backing levels of bulk storage are successively connected to the first high speed working store level. For example, U.S. Pat. No. 3,218,611 to Kilburn, et at., assigned to the instant assignee, is directed toward a hierarchical organization with directory registers for keeping track of where particular data is stored.

The need for storage hierarchies in main storage results from the need for memory to keep pace with CPU speeds while, at the same time, providing the large physical memory size demanded by the need to handle large computational problems. However, large size and fast access speeds are incompatible goals in the design of main storage, for as memory capacity increases, a larger physical package results which causes an increase in transmission times. The hierarchical arrangement of main storage, although capable of matching speeds between the main storage and the CPU, introduces the necessity for separate storage transfer control programs which coordinate the transfer of data between the bulk storage and the working storage and between the work storage and the arithmetic processing units, in addition to the executive and arithmetic processing control programs necessary to carry out the basic arithmetic data processing task.

Another problem arises which is unique to signal processing computers having arithmetic pipelined architectures. Signal processing arithmetic operations are highly repetitive and it has been found that a sequential pipelined architecture can substantially enhance the throughput in performing such functions. For example, in U.S. Pat. No. 4,041,461 to G. L. Kratz, et al. entitled "Signal Analyzer System," assigned to the instant assignee, describes an arithmetic processor which contains a sequentially pipelined arithmetic architecture for carrying out highly repetitive signal processing operations such as beamforming, finite impulse response (FIR) filtering, and Fast Fourier Transforms (FFT). In order to control the arithmetic pipeline, an arithmetic element controller is contained in the arithmetic processor, containing its own microinstruction sequencer. This arithmetic element controller is, in turn, controlled by a separate control processor which serves as the supervisor and storage manager for the overall signal processing operation. Still a third processor controls data transfers between a bulk data storage and a working storage and between the bulk data storage and the input/output channels. Although the system described in the Kratz, et al. patent works well for carrying out a highly repetitive signal operation such as a Fast Fourier Transform over an extended computational period, the several processors require a fairly extensive changeover period to switch from one type of processing task to another. Thus, if it is desired to switch from a beamforming computational task to a finite impulse response filtering task and then to a Fast Fourier Transform computation within a relatively brief interval of time, the control architecture described in the Kratz, et al. patent will not easily permit such changeovers. The control processor must carry out its supervisory and storage management functions and communicate to the storage transfer controller and the arithmetic element controller the new task sequences and parameters necessary to carry out the new type of task desired.

Objects of the Invention

It is therefore an object of the invention to provide an improved data processing system which matches the speed of bulk storage access with the speed of arithmetic processing unit, without the need for hierarchical storage configurations.

It is still another object of the invention to provide a control mechanism for a data processor which simplifies stored program control for memory transfers, arithmetic processing and input/output transfers.

It is a further object of the invention to provide a control mechanism for a pipelined arithmetic architecture which permits greater flexibility in changing from one type of task to another, in a faster manner than has been available in the prior art.

SUMMARY OF THE INVENTION

These and other objects, features and advantages of the invention are accomplished by the control unit for a functional processor invention disclosed herein. A control unit for a functional processor is disclosed which minimizes programming complexity by eliminating data transfers and the transfer control associated with two level memory systems and which improves flexibility in program task changeovers in pipelined arithmetic architectures. This is accomplished by employing common page addressing for accessing memory address stacks for storing either main memory addresses or address increments, coefficient address stacks for storing coefficient memory addresses or address increments, and microinstruction sequencing control branch stacks for storing branch and loop control parameters. This permits chaining of long sequences of signal processing subroutines without external control and the associated execution time overhead.

A microprogram store contains microprograms whose microinstructions are sequenced through by a microinstruction sequencer. The microinstruction will use a common page number call out from the branch parameter stack, the first of a sequence of loop cycles, will call out of the main memory address stack the starting address in main memory for the associated operand to be manipulated in the arithmetic processor, and will call out from the coefficient stack, the first of the associated coefficients which are to be manipulated along with the operands in the pipelined arithmetic unit during that microinstruction interval. The main memory stack also contains the memory addresses to which the processed data is to be written after the arithmetic unit has completed its function. The same microinstruction will also call out the arithmetic element and scratch pad memory operations to be performed during that microinstruction interval in the arithmetic pipeline. The resulting processor system requires only a single microprogram to carry out memory transfers, arithmetic processing and the initiation of I/O transfers.

An additional feature is a revolving buffer operation in which a plurality of main memory modules are cyclically connected to each of a plurality of scratch pad buffers in the arithmetic unit in a synchronous manner so as to maximize the throughput of the combined operation of memory transfers, arithmetic processing and I/O transfers. In another feature, the controller employs a dual clocking arrangement whereby scratch pad storage elements and arithmetic elements can be selectively controlled to operate at twice the rate at which microinstructions are accessed from the microprogram store. The resulting controller for a pipelined arithmetic architecture provides a closely coupled control of looping and branching control operations with storage accessing operations and pipelined arithmetic operations to provide for immediate and flexible responses to changes in programming tasks.

DESCRIPTION OF THE FIGURES

These and other objects, features and advantages of the invention will be more fully appreciated with reference to the accompanying figures.

FIG. 6 is a data flow diagram of the arithmetic/memory unit as it carries out a finite impulse response filtering computation.

FIG. 14 is a functional block diagram of the functional processing unit.

FIG. 22 is a sequential flow diagram of an example loop control operation.

DISCUSSION OF THE PREFERRED EMBODIMENT

Table of Contents

Overview of the System

Introduction

Functional Processing Element Architecture Description

Functional Processing Element Characteristics

Figure 1:
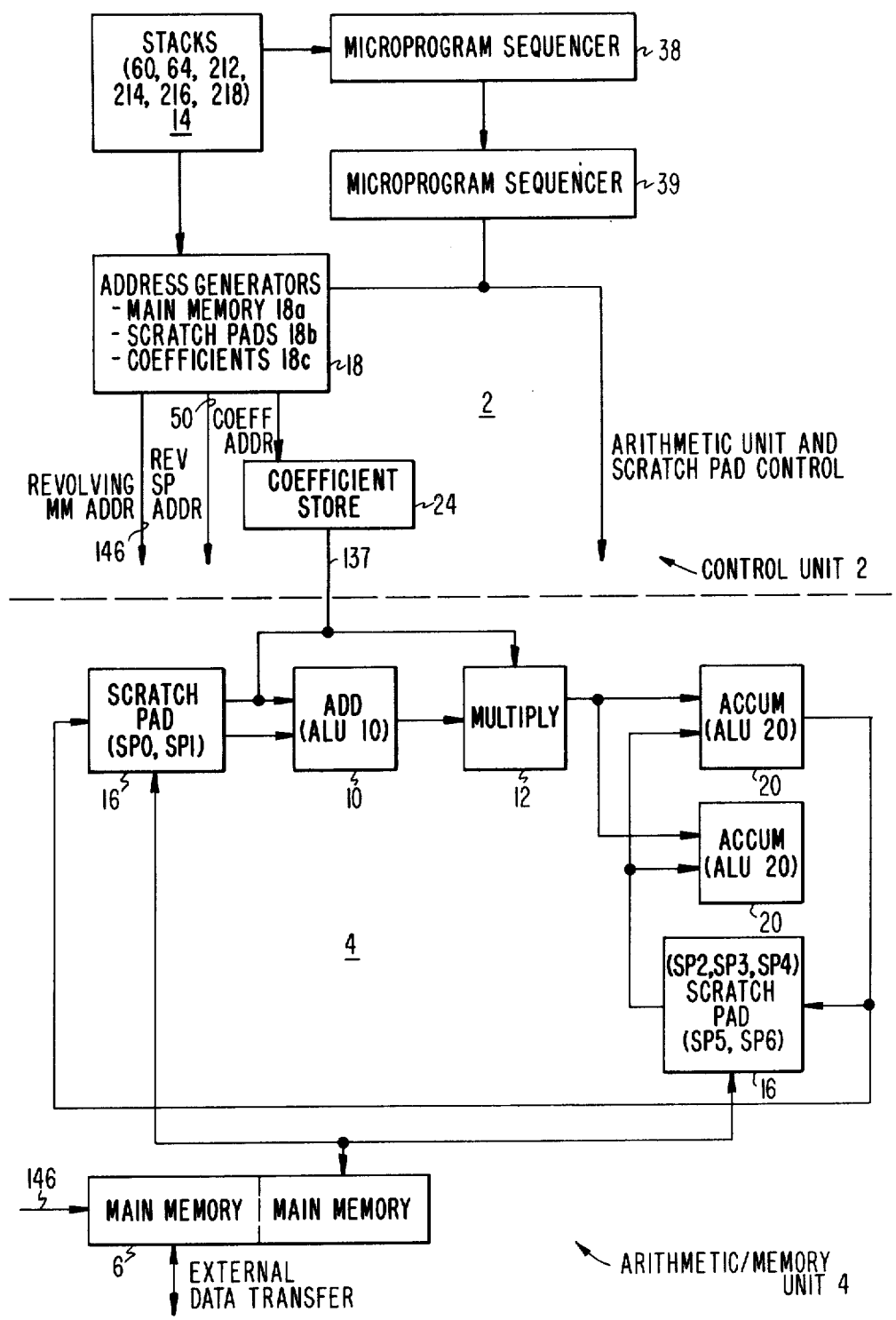
FIG. 1 is a functional block diagram of the control unit and arithmetic/memory unit.

Processor Modular Units
    Arithmetic and Memory Unit
    Control Unit

Algorithm Flow Examples

Functional Processing Element Hardware Description
    Processor Arithmetic Pipeline
    Processor Main Memory
    Processor Timing
    Control Unit Detailed Description of the Control Unit Architecture Detailed Description of the Operation of the Control Unit Discussion of the Preferred Embodiment Overview of the System

INTRODUCTION

A new control architecture is described for a pipelined arithmetic architecture which can flexibly and efficiently carry out a wide assortment of processing functions. The overall combination of the control unit and the arithmetic unit will be referred to as the functional processing element (FPE).

FUNCTIONAL PROCESSING ELEMENT (FPE) ARCHITECTURE DESCRIPTION

The FPE architecture has been designed to flexibly and efficiently perform a wide range of signal processing functions. The FPE employs modular arithmetic/memory units (AMU) and control units (CU) that may be functionally dedicated via an initial program load (IPL). Interaction with a system supervisory controller is minimized to permit a high degree stand-alone operation within each functionally dedicated processing segment. A collection of CUs and AMUs can be microprogrammed and interconnected to perform the processing functions associated with a larger system. Features incorporated into the CU enhance the internal control capability of the functionally dedicated processor and minimize the involvement of the system supervisory controller. The wide range of signal processing functions that can be performed with the AMU and CU architecture permits use of the same microprogrammable elements for functions that were previously performed in unique, individually designed units (beamforming units, filtering units, Fast Fourier Transform (FFT) units, broadband processing units, etc.). Also, the microcode format does not change when implementing the different functions as is the case when a specially tailored architecture is used for each function. Hence, hardware commonality within a larger system is extended to the functional unit level in addition to the basic hardware module level and commonality of microcode format can be present throughout the system.

FUNCTIONAL PROCESSING ELEMENT (FPE) CHARACTERISTICS

To assure wide applicability of the FPE for signal processing, design characteristics were defined to include the following:

PROCESSING a. Multi-dimensional (space-time) filtering and spectrum analysis:

The FPE efficiently implements multi-dimensional FFTs, frequency domain beamforming, time domain beamforming, frequency band shifting and band shaping.

b. Convolutions and correlations:

The FPE implements convolutions and correlations either directly or in the transform domain for sonar functions such as ranging, localization, split array and transform domain spatial processing.

c. Detection and post detection operations:

The FPE can implement magnitude and squared magnitude detection, integration, noise mean estimation, requantization and packing of output data.

PARAMETERS a. Filtering function:

The FPE can implement either finite impulse response (FIR) or infinite impulse response (IIR) filters. FIR filters can be computed at any integer data decimation and/or interpolation ratio. Computation efficiency is doubled for symmetric impulse responses. IIR filters can be constructed using cascaded quadratic stages via repeated application of a basic stage microprogram.

b. FFTS:

The FPE implements radix 2 and mixed radix FETs. The mixed radix FFTs are required for "orthogonal sampling" in frequency domain beamforming.

c. The processor works on data from distributed main store (no working store required);

The arithmetic element can address data from a large randomly addressable memory. This alleviates the corner turning problem in two-dimensional FETs. Data transfers from main store to working store (and back) are eliminated.

d. Internal record edge data handling:

The FPE stores data in revolving scratch pads and main memories (modulo wrap) so that samples at the edges of temporal records (batches) do not require special handling. An example is when a filter impulse response encompasses a record edge and signal samples are required from the previous record as well as the current record.

ARCHITECTURE a. Microcoded pipeline processor:

Most of the high utilization signal processing functions are variations of convolution filters; the basic operation is the weighted sum of a finite set of signal samples. Therefore, a microcoded pipeline processor that includes this capability is efficient for high speed execution of a large range of signal processing functions such as beamforming, band shaping, spectrum analysis, smoothing, integration, etc.

b. Distributed processing, memory and control:

The distribution of processing and control allows more independent development of a functional segment of the system. Addition or modification of a function is not dependent upon the time utilization of a shared processor by other functions. Distributed memory reduces the levels in the memory reduces the levels in the memory hierarchy by one and eliminates possible contention for access. The distributed memory modules are designed to facilitate transfer of data from one distributed memory to another via bus interconnection.

c. Standard bus interface:

The AMU has separate ports for external data transfer and arithmetic element transfer. The two ports do not work out of the same basic storage module (BSM) so that time sharing and contention are not factors in external transfers.

d. Batch processing of data blocks:

To minimize the involvement of the system supervisory controller, large data batches are processed in the AMU; consequently external synchronization and data transfer control requirements are less tightly coupled to the distributed processors.

e. Single level control and memory

PROCESSOR MODULAR UNITS

The processor is comprised of two basic units, the control unit (CU)2 and the arithmetic/memory unit (AMU)4. These two units are functionally depicted in FIG. 1. The control unit 2 furnishes the microprogram control required for each machine cycle of arithmetic pipeline operation of the AMU4 and the addressing and timing required for transfer of data between the main memory 6 and the external I/O queuing buffers. A control unit 2 can be connected to one or more arithmetic/memory units 4. When more than one AMU4 is connected to a CU2, all AMUs perform the same operation is locked step.

The AMU4 pipeline has been designed to efficiently implement a wide range of feed-forward and feed-backward signal processing algorithms with either real or complex data. An adder 10 at the multiplier 12 input allows computation saving factorization of algorithms to increase processor throughput, for example the addition of signal samples that are multiplied by the same impulse response coefficient in symmetric FIR filters and the addition of variables that receive the same weight in Winograd type algorithms (e.g., Winograd Fourier Transforms). (H. F. Silverman, *An Introduction to Programming the Winograd Fourier Transform Algorithm (WFTA), IEEE Transactions on Acoustics,* "Speech and Signal Processing," Vol. ASSP-25, No. 2, April 1977.)

The capability of performing two add (or accumulate) operations at the multipler 12 output is used in complex data operations such as two-point FFT butterflies; four multiplies and six to eight additions are used in most straightforward factorizations of this algorithm. Conversely, most filtering operations require only one accumulation operation per multiply. As will be discussed later with the Arithmetic/Memory Unit, this requirement dichotomy in terms of the multiply-to-add ratio was resolved by using an adder logic unit (ALU) for the add function 20 that operates at twice the speed of the multiplier 12 and therefore additional hardware was not introduced.

The control unit 2 employs 1024 deep stacks 14 for storing main memory addresses and address increments, coefficient store addresses and address increments, and branch as a function of count (BFC) parameters. This permits chaining of long sequences of signal processing subroutines without external control and the associated execution time overhead penalty.

Experience in microcoding signal processing algorithms has shown that algorithms usually require stacks of less then eight registers. Therefore to permit signal processing microprograms to be chained and used with different initialization parameters, the 1024 deep register stacks 14 are subdivided into pages by using link microinstructions to identify the page via setting status bits. Status bits divide the stacks 14 into 64 pages of 16 registers.

The large number of initialization parameters stored at initial program load (IPL) permit many processing chains to be executed without any further modification of the stack 14 contents. When modifications are required, they occur infrequently and the resulting interaction with the system supervisory controller is minimized.

Another features is the inclusion of 16 current address registers for each of the three stack sets, main memory address, coefficient address and microprogram address. Addresses stored in a stack can be loaded into a specified current address register and subsequently this address can be incremented without disturbing the contents of the base address/increment stacks. Consequently, the microprogrammer does not have to remember to restore base address/increment values in the stacks because they are not altered. The large number of current or running addresses that can be held concurrently permits considerable flexibility in address generation.

The address generators of the control unit 2 permit revolving buffer addressing of main memory 6. The revolving buffer addressing capability is also included for the input scratch pads 16 and eliminates the need for coding repetitive variations of microcode subroutines for FIR filters, FFT smoothing and other sliding window type functions; the main memory address generator 18 permits addressing across the boundaries of basic storage modules (data batches) and eliminates the need for special microcode to handle data points near record edges.

Figures 2, 23:
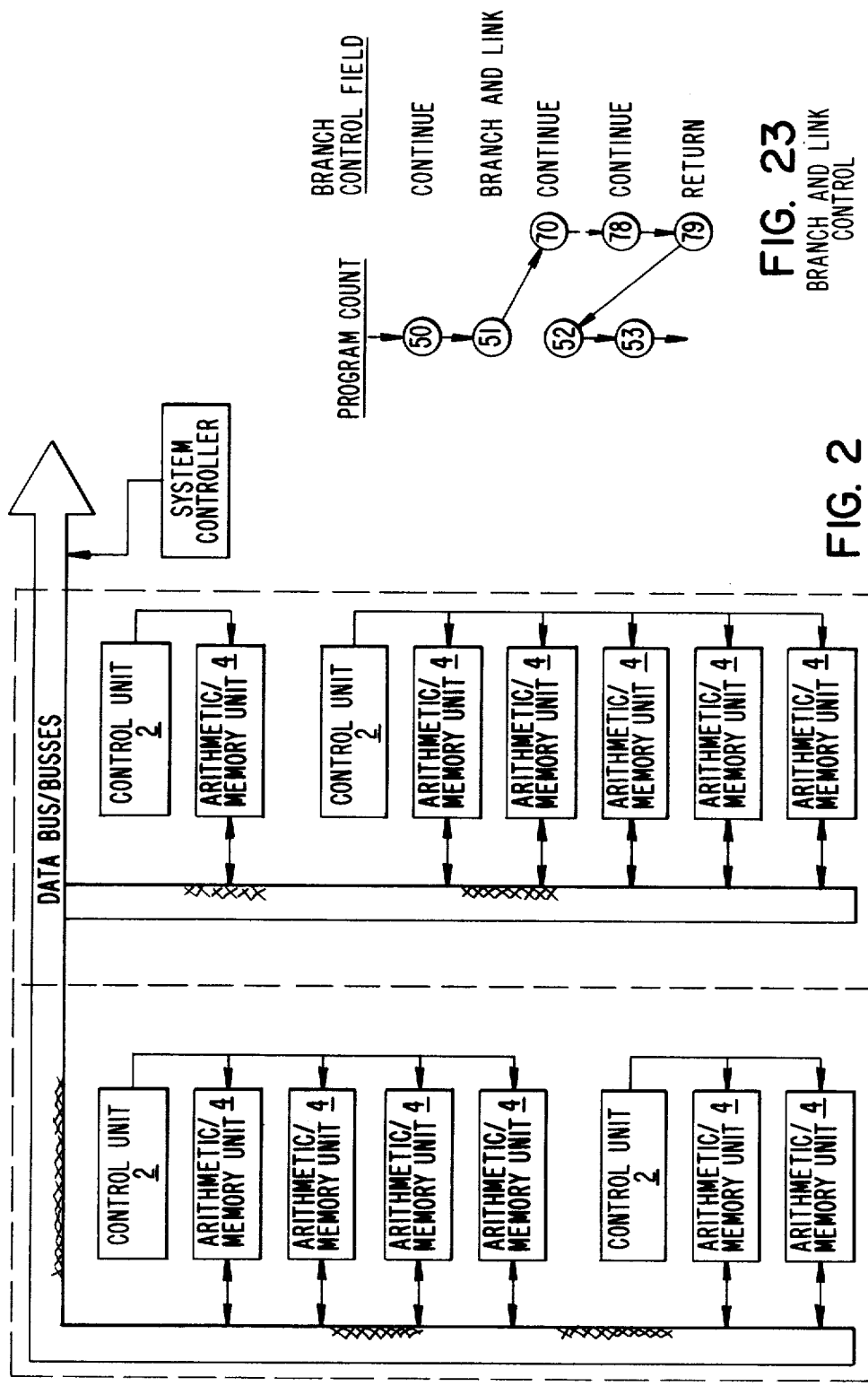
FIG. 2 is a system block diagram of a distributed processing system employing a plurality of functional processor units.
FIG. 23 is a sequential flow diagram of an example branch and link operation.

The FPE modules (CU2 and AMU4) have been designed for versatile signal processing in functionally dedicated processing modules that require a minimum of intervention by the system supervisory controller. A simplified example of a typical processor configuration is shown in FIG. 2.

ARITHMETIC AND MEMORY UNIT (AMU)

Figure 3:
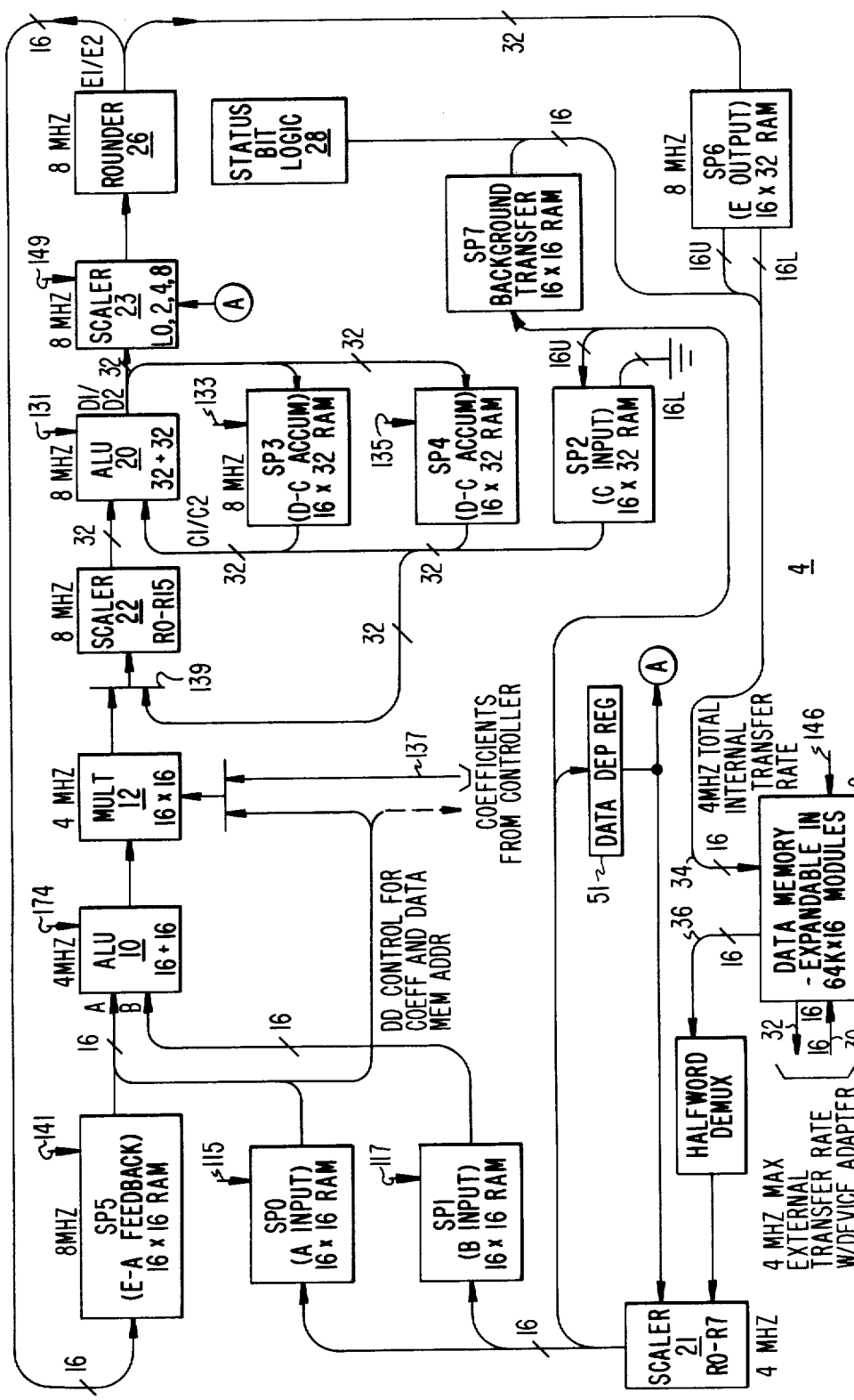
FIG. 3 is a functional block diagram of the arithmetic/memory unit.

The design parameters associated with the arithmetic memory unit 4 are listed in Table 1. A more detailed block diagram of the arithmetic/memory unit 4 is shown in FIG. 3. The main memory 6 is dedicated to an arithmetic pipeline element and is not shared by other arithmetic elements. In a larger system configuration the output operands of one AMU4 are passed on to an AMU performing the next stage of processing via the external transfer port. The second main memory port transfers operands to and from the scratch pads 16 of the arithmetic element 4; in essence, the arithmetic element 4 works directly out of one or more basic storage modules of main memory 6 under microinstruction control. Since the arithmetic unit 4 works on data transferred directly from the distributed main memory 6, no working stores or main memory/working store transfer control is required. The microinstruction controls all main memory 6 and scratch pad 16 addressing, data path switching, scaling, ALU operation, coefficient selection, rounding, etc. for the 4 MHz machine cycle. The scratch pad 16 may be considered functionally allocated into six portions labeled SP0 through SP5, as shown in FIG. 3. All data transfers from main memory 6 to scratch pads SP0, SP1 or SP2 can be scaled (right shifted) by scaler 21; this scaling can be directly specified by microcode or be data dependent for FFT block floating point scaling. Scratch pads SP0 and SP1 have revolving buffer addressing for all sliding window type algorithms. The revolving buffer addressing is used for both write and read operations in these scratch pads and is accomplished by using modulo 16 adders for incrementing write and read addresses. An example of the use of this feature is given later in the Processing Flow Example, under FIR filters.

In feedback algorithms such as IIR filters and four-point FFT butterflies, scratch pad SP5 is used to queue inputs to ALU10. A separate scratch pad for feedback eliminates possible write contention with transfers from main memory 6. ALU10 is used to permit the summation of a pair of operands before weighting and thereby double the throughput of the pipeline for such algorithms as FIR filters. An example of this feature appears later in the Processing Flow Example, for FIR filters. When weighted pairs are not required, the operand is directly passed through ALU10 to the multiplier 12.

Table 1. Arithmetic/Memory Unit Parameters

Four MHz Machine Cycle
Functions Per Machine Cycle (Half precision option also; uses same module types)
   Pre-multiply add (16+16)
   Multiply (16 by 16)
   Two Accumulators (32+32)
   Three Scalers
   Rounder (32→16)
Swinging Buffer Main Memory
   Four MHz Transfer To/From Arithmetic Element
   Four MHz transfer To/From Interface The second port of the multiplier 12 can receive inputs either from the coefficient store 24 or from the SP0 SP5 bus. The coefficient store 24 inputs represent filter impulse response samples, FFT roots of unity, beamformers aperture shading weights, coarse resolution band shifter samples, etc. The SP0, SP5 bus input is used for squared magnitude ($y = x^2$), complex conjugate multiplies, direct implementation correlations, etc. Scaler 22 which follows the multiplier 12 is used to prevent overflow in accumulations and in conjunction with ALU20 for implementing weights of the form $(1-2^{-a})$ in first order linear difference equations such as long term integrations. Scaler 22 can receive inputs from either the multiplier 12 or the SP2, SP3, SP4 bus.

ALU20 is a versatile arithmetic logic unit and is used in conjunctiion with scratch pads SP3 and SP4 for integrations, building up beamforming and temporal FIR filter partial sums, magnitude approximations, requantization and packing of output data, etc. Again a separate scratch pad, SP2, is used for transfers from main memory 6 to avoid contention in writing into scratch pads SP3 and SP4.

All processing blocks after the multiplier 12 operate at 8 MHz, two operations per basic machine cycle, to permit increasing the add-to-multiply ratio (ALU20-/MULT ratio) to 2:1 when required, without adding additional hardware in the form of ALUs and scratch pads. This ratio is required for algorithms such as FFTs Scaler 23 is used to left shift data into the most significant half word aperture prior to rounding from 32 to 16 bits. Overflow results in a saturation output. The rounder 26 can produce rounded outputs for transfer to scratch pads SP5 or SP6, full 32 bit-outputs for transfer to scratch pad SP6 or truncated 16-bit outputs to scratch pad SP5. Scratch pad SP6 serves as a queuing buffer for transfer of outputs to main memory 6. Sixteen bit transfers of either the upper or lower half word from SP6 permit double transfers to main memory 6 for full resolution 32 bit operand storage in main memory 6 using adjacent address locations.

The status bit logic 28 is used for sensing most significant bit occurrence in previous FFT stage execution for block floating point scaling, for conditional data transfers from SP2/SP3 or SP3/SP4 to ALU20 and for conditional branching as a function of the sign generated by the previous ALU20 operation.

Figure 4:
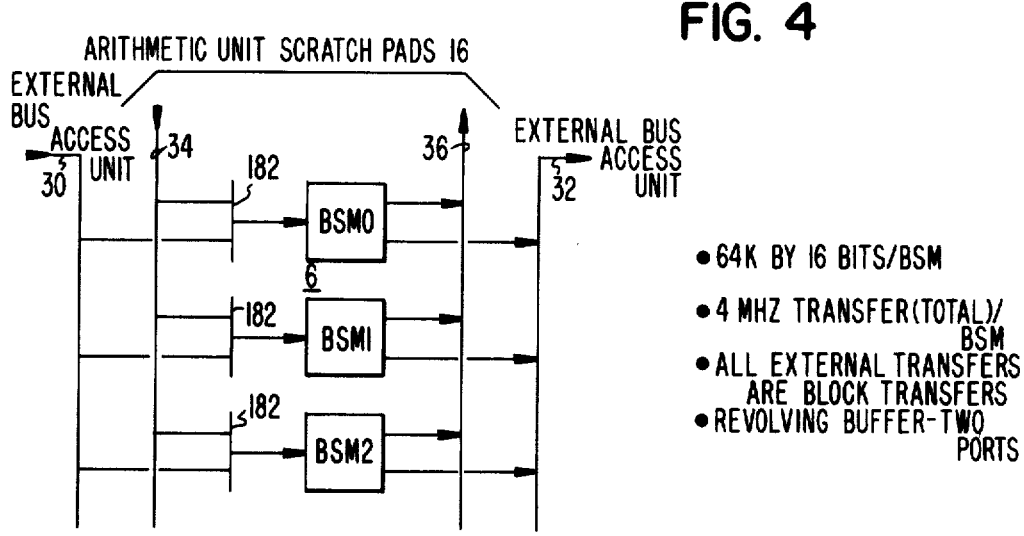
FIG. 4 is a functional block diagram of the interconnection of the main memory modules.

The modularity and interconnection of main memory 6 is shown in FIG. 4. The basic storage module (BSM) is 64K words × 16 bits. The data transfer rate is 4 MHz for a basic storage module. As shown in FIG. 4, each basic storage module can be assigned to accept input data from one of two sources and to output data to one of two sinks. The memory modules can be assigned in a revolving buffer fashion; usually a single basic storage module is assigned to the external port 30 and 32 and two basic storage modules are assigned to the internal (arithmetic element transfer) port. When two basic storage modules are used for arithmetic element (AE) data transfer, data from two successive batches are available for use by the AE and no special microcode is required to handle data near record or batch edges. One module contains the most current batch and the other module contains the previous batch.

A control bit in the microinstructin is used to rotate the basic storage module assignments.

When swinging or revolving buffers are not used, a "cycle stealing" operation can be employed for external data transfers.

OVERVIEW OF THE CONTROL UNIT

Control of each FPE is accomplished using a single controller and program store; the program store contains both the library of signal processing subroutines and a standard linkage program. Use of a single level controller and a single instruction format for all programming (subroutines and linkage of subroutines) simplifies the programming task significantly.

The control unit (CU)2 defines all arithmetic element parameters for each machine cycle via microinstructions stored in the microprogram store 39 and chains the arithmetic element operations through a microprogram sequencer 38. The microinstruction controls all main memory 6 and scratch pad 16 addressing, data path switching, scaling, ALU operation, coefficient selection, rounding, etc. for the AMUs4 associated with the CU2. The CU2 can control one or more AMUs4 and when more than one AMU4 is connected, they all operate in locked step.

Figure 5:
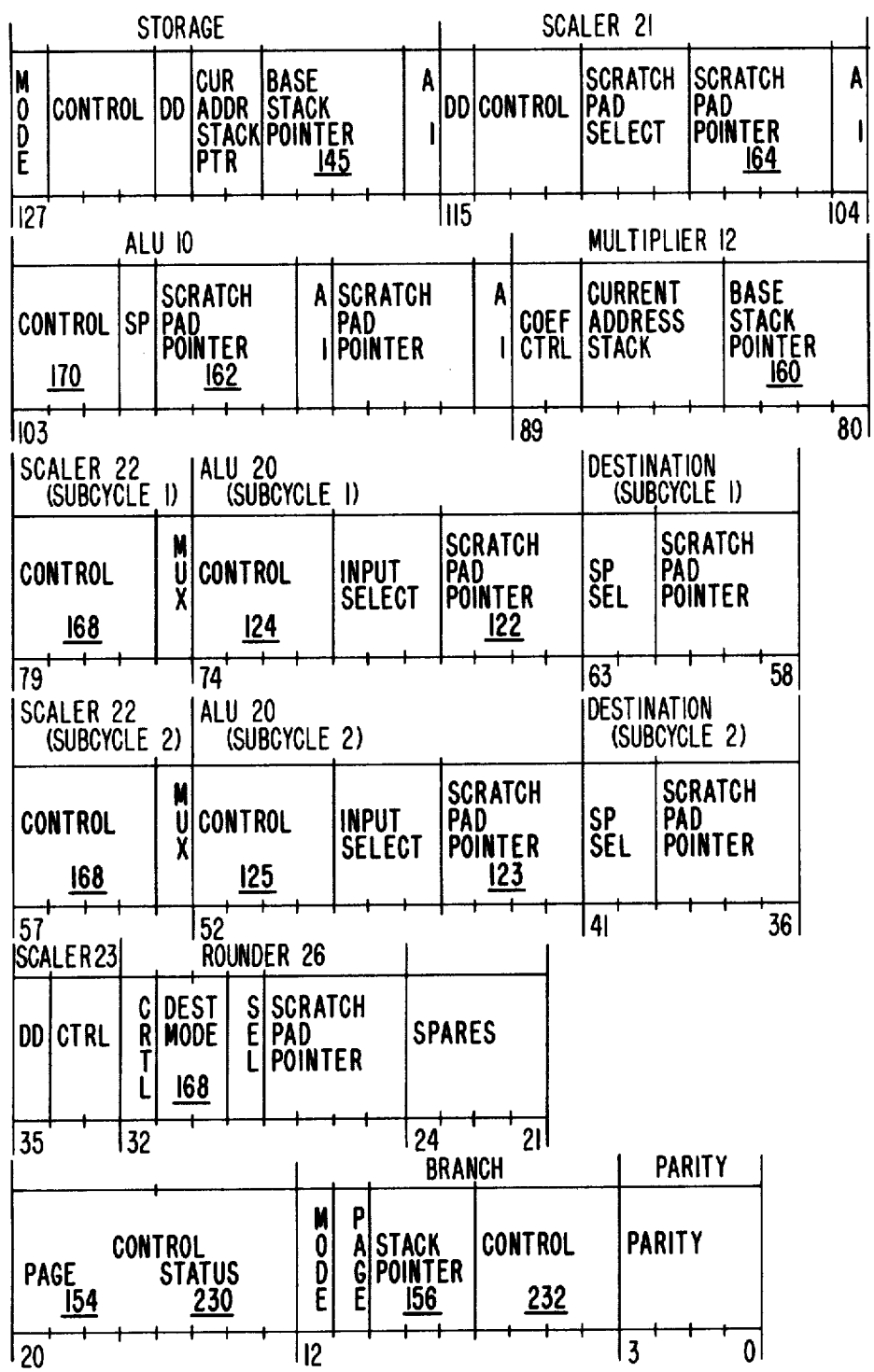
FIG. 5 illustrates the microinstruction format.

The microinstruction format is shown in FIG. 5. The basic fields of the microinstruction control the following:

a. Main memory 6/scratch pad 12 data transfer.
b. ALU10 function and data source control.
c. Multiplier 12 input and coefficient store 24 control.
d. ALU20 function, data source and destination control (for two subcycles).
e. Rounder 26 function and data destination control.
f. Scaling control (3 scalers 21, 22, 23).
g. Branch control for microprogram sequencing.
h. Status bit 28 control for conditional operations, address stack paging in the controller.

Main Store/Scratch Pad Transfer

Some characteristics of the data transfer between main store 6 and arithmetic element scratch pads 16 are:

1. There is circular file addressing for both main store 6 and input scratch pads SP0, SP1 and SP5.
2. The arithmetic unit 4 works directly out of main store 6.
3. Address, address plus increment functions are provided.
4. There is computed, data dependent main store addressing.

The base address and increment values are never altered or updated and therefore the microprogrammer is not required to remember to restore them to their original value.

ALU10 Control

The ALU10 control characteristics are summarized by the following:

1. It is an eight function ALU.
2. The feedback or main memory scratch pad input is selectable for "A" port.
3. There is circular file addressing for input scratch pads SP0 and SP1.
4. ALU10 is used predominantly for FIR filters with symmetric impulse responses and Winograd factorization of algorithms.

Coefficient Control

The coefficient control field of the microinstruction has the following capabilities:

1. The scratch pad or coefficient input to multiplier 12 second port is selectable.
2. There is address, address plus increment, and address plus increment specification for the coefficient store 24.
3. There is a data dependent table look-up from a section of the coefficient store 24.

ALU20 Control (Subcycle 1/2)

The AIU20 control field is repeated to permit two ALU20 executions per basic 4 MHz machine cycle. The control function characteristics are:

1. There are two executions per basic 4 MHz machine cycle.
2. The inputs are selected from one of three scratch pads.
3. Partial sums/intermediate results are stored in either of two scratch pads.
4. It is a 16 function ALU.
5. ALU20 is used predominantly as an accumulator. It is also used in magnitude approximation and requantization.

Rounder 26 Control

The rounder 26 has the following characteristics:
1. Sixteen bit or 32 bit outputs are available.
2. The left shifter produces a saturation value with overflow.
3. There are two executions per basic 4 MHz, machine cycle.

Scale Control

Three scalers 21, 22 and 23 are distributed throughout the arithmetic pipeline element:
1. Scaler 21 has a data dependent control option for FFT block floating point.
2. Scaler 22 prevents overflow in the accumulation process.
3. Scaler 23 is used to position data in the aperture for 16 bit rounded outputs and has optional data dependent control.

The scaling provided includes a wide range of gain adjustment within the AMU4 to minimize quantization distortion and simultaneously prevent saturation distortion prior to spectrum analysis. Scaler 21 provides right shifts from 0 to 7 bits on the 16-bit operands transferred to the arithmetic pipeline. Summation of a pair of operands in ALU10 requires a one-bit right shfit to prevent overflow and can be a fixed scaling factor.

Conversely, long FFTs require a large dynamic range at the transform output and, apriori, scaling to prevent possible overflow throughout all stages of the computation leads to an inefficient use of the available bits. Therefore, block floating point scaling is provided so that data dependent scaling may be employed wherein the scale factor to be used in the next stage of FFT computation is a function of the largest magnitude produced during the previous stage. For radix 2, 3, 4 and 5 stages, the maximum required right shift is around four bits and well within the capabilities of scaler 21.

Scaler 22 can right shift the 32-bit operands from 0 to 15 bits. The scaling of accumulator inputs in weighted summations should use a factor no greater than the reciprocal of the sum of the weight magnitudes. This provides a factor range from 1 to $2^{-15}$ which is more than adequate. This range also provides for flexible time constant control in first order linear difference equations such as long term integrators.

Scaler 23 is used to position significant data bits in the upper half quantization aperture prior to rounding.

Branch Control

Branch control for microprogram sequencing permits chaining of a large number of signal processing subroutines without external control. This eliminates the need for frequent action on the part of a system supervisory controller. Branch characteristics are:
1. Branch types
   Unconditional
   Conditional
   Function of count
   Branch and link
2. Branch to address, address plus displacement
2. Up to 512 nested loops
4. 512 word stack for branch function of count parameters
5. Branch stack can be externally loaded.

Status (Stack Pointer Control)

This field is used for page control in the microinstruction sequencer stacks, in the main memory address stack and in the coefficient store address stack. It is also used to set and reset status bits. Status bit 0 (SB0) is used for conditional branches and conditional data selection as a function of thresholding operations. Status bit 1 (SB1) is used for conditional branches.

ALGORITHM FLOW EXAMPLES

Several signal processing algorithms that typically represent heavy computation loads in signal processing are selected to illustrate the processing flow in the AMU4.

FIR FILTERS

A FIR filter of even length with a symmetric impulse response is used for this flow example shown in FIG. 6. The filter equation can be expressed as $$Y_{Di} = \sum_{k=1}^{L/2} h_k (X_{Di+1-k} + X_{Di-L+k})$$

When
$Y_{Di}$ indicates the filter output sample at time Di.
D = the decimation ratio
$h_k$ = the Kth impulse response sample
$X_m$ = the filter input signal sample at time m.

Since the length of the filter is even (L/2 = integer), the two signal samples that are added together before being multiplied by the impulse response coefficient are always an odd and an even sample. Therefore in loading the revolving buffer scratch pads, SP0 and SP1, the even samples are loaded in SP0 and the odd samples are loaded in SP1. The two samples that are added before weighting are always available at separate ports of ALU10 to permit the pair summation within the parenthesis to be accomplished using ALU10. The sample pair is then weighted using the multiplier 12. The coefficient store 24 supplies the $h_k$ coefficients. Scaler 22 is used to prevent overflow in the summation of the L/2 weighted sample pairs. Previously, scaler 21 was used during the transfer of the even and odd samples from main memory 6 to avoid overflow in the odd-even sample summation. ALU20 and SP3 are used in the summation of the weighted pairs with SP3 acting as a partial sum store. When all L/2 pairs have been summed, the output is passed on to scaler 23 and the rounder 26 for rounding to 16 bits. The output samples are queued in SP6 for transfer to main memory 6. The filter subroutine is repeated for each output sample and requires L/2 machine cycles per output. The number of main store 6 transfers required is D+1; D new input samples are fed to the scratch pads 16 and one output sample is transferred. Equating the number of transfer cycles to the number of computation cycles yields L = 2D + 2. For a decimation of 2, the filter process fully utilizes the arithmetic element throughput when L = 6 or larger. Consequently for all filters of practical interest, the architecture is well matched.

Figure 7:
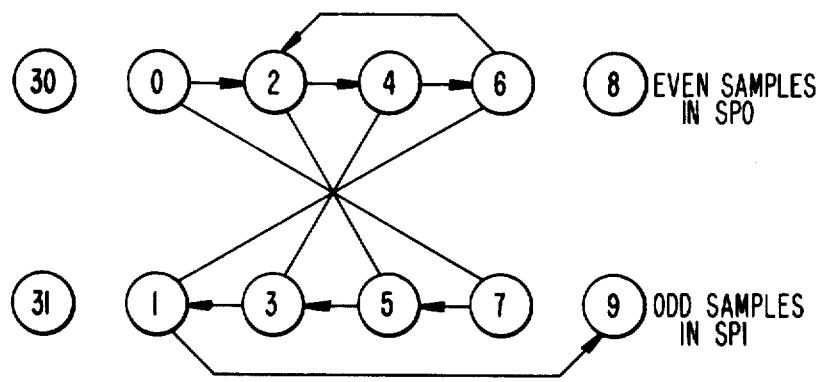
FIG. 7 is a data flow diagram for carrying out the scratch pad memory address increments for the finite impulse response filter computation.

FIG. 7 illustrates how the modulo 16 addressing of SP0 and SP1 simplifies the filter execution. The top line represents the even samples stored in SP0 and the bottom line represents the odd samples stored in SP1. Assume the first filter output involves signal samples 0 through 7. Samples 0 and 7 are fed to ALU10, added, weighted and then stored in SP3. The address of SP0 is incremented by one and the address of SP1 is decremented by one making samples 2 and 5 available for summing prior to weighting. This is repeated two more times making sample pairs 4-3 and 6-1 available for summing prior to weighting. Then the address of SP0 is decremented by two and the address of SP1 is incremented by four to start the filter computation involving samples 2 through 9 (when the decimation is two). The inner loop using SP0 increments of one and SP1 decrements of one is repeated.

A similar procedure is used for loading the odd and even samples into the scratch pads 16; the address increment is one for both scratch pads and a pair of samples (D=2) is transferred to the scratch pads 16 for every inner loop execution.

Figure 8:
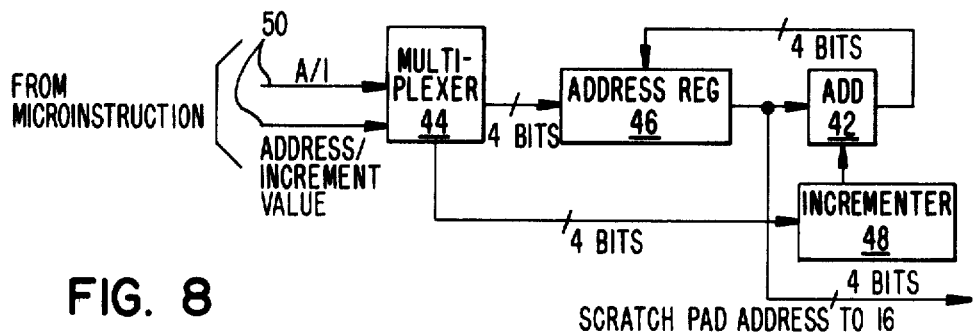
FIG. 8 is a functional block diagram of the scratch pad module adder.

FIG. 8 illustrates how a simple four-bit slice adder 42, multiplexer 44, address register 46, and incrementer 48 are used as a modulo 16 adder 40 for the scratch pad SP0 and SP1 revolving buffer addressing.

FAST FOURIER TRANSFORMS (FFTs)

Figure 9:
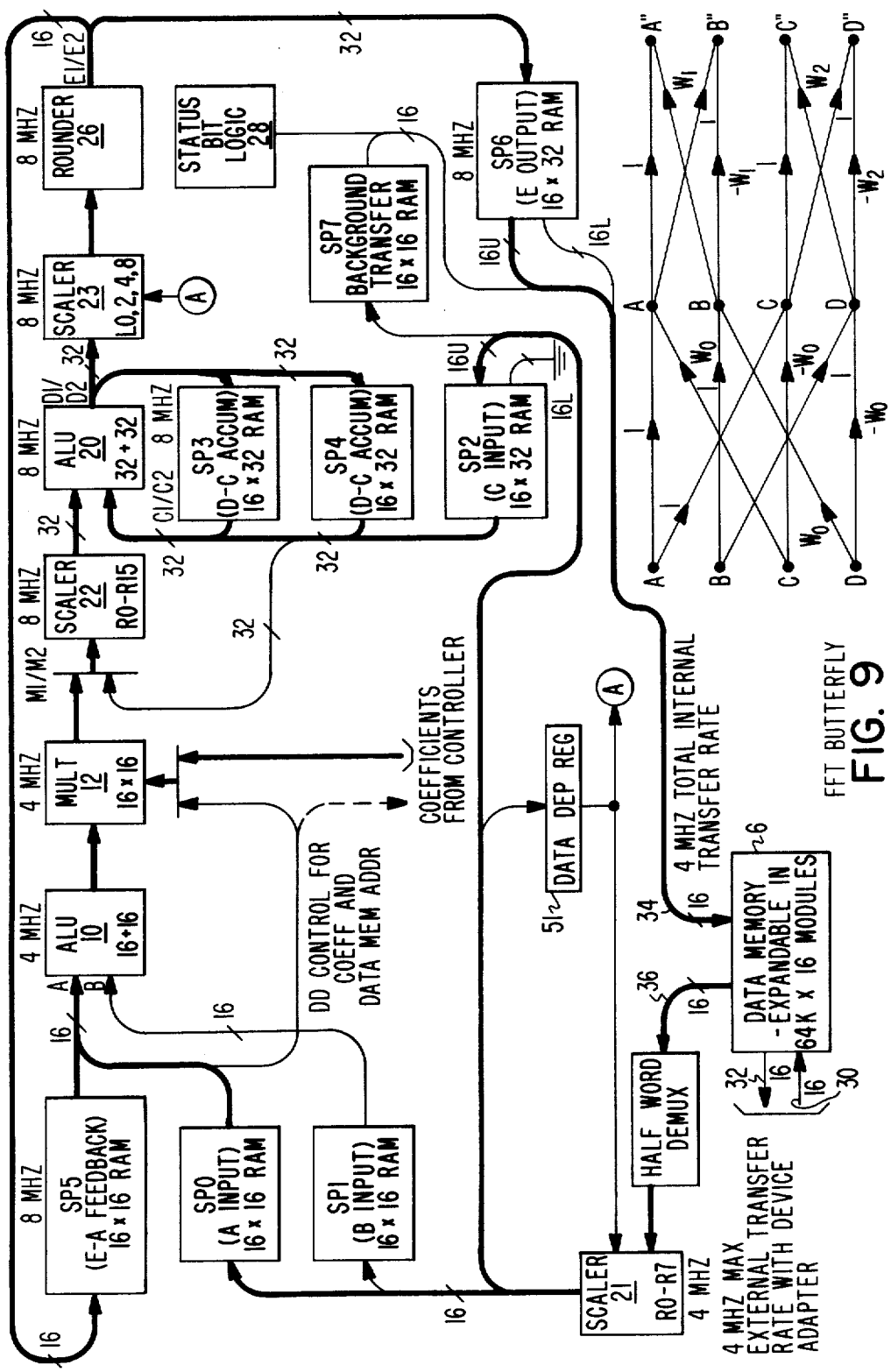
FIG. 9 is a data flow diagram of the arithmetic/memory unit for carrying out a four-point Fast Fourier Transform butterfly computation.

A four-point FFT butterfly is chosen to illustrate a flow that involves complex data and feedback. As shown in FIG. 9, the four-point butterfly represents the execution of a pair of two-point butterflies for each of two FFT stages. Of the four complex data samples input to the first stage, two samples (C,D) must be multiplied by a roots of unity and two (A,B) do not. Samples C and D are transferred from main memory 6 through scaler 21 to scratch pad SP0 and samples A and B are transferred to SP2 via scaler 21. Scaler 21 is used in the data dependent, block floating point mode to prevent overflow during the four-point, two-stage algorithm execution. The first stage is executed producing outputs A', B', C' and D' which are stored in scratch pads 16 to permit the execution of the second stage without any additional main memory 6 transfers. Since B' and D' must be multiplied by roots of unity in the second stage, they are routed to the feedback buffer, SP5. The intermediate points A' and C' do not have to be multiplied and are stored in temporary buffers, SP3 and SP4. The second stage is then executed and the outputs (A'', B'', C'', D'') are queued in SP6 for transfer back to main memory 6. Since the basic two-point butterfly equation has the form:

$$A' = A + W_o C$$

$$C' = A - W_o C$$

the two subcycles of ALU20 are used to accomplish the addition and subtraction required. The roots of unity are supplied by the coefficient store 24. Note that separate buffers are provided for all transfers to and/or from main memory 6 to avoid any contention with storing of the feedback and temporary variables at the end of the first stage. The four-point FFT algorithm is matched since it requires 16 machine cycles for inner loop execution and 16 machine cycles for transferring the eight complex inputs and outputs. FFTs are not executed in place and therefore bit reversal hardware is not included in the design. The large randomly addressable main memory 6 that is available to the arithmetic element (typically 64K words) makes allocation of a work space equal to two times the FFT size (for complex points) a cost effective approach. When FFTs are not being executed, this resource is available for other use.

TIME DELAY BEAMFORMING

Time delay beamforming represents the weighted summation of appropriately delayed sensor signal samples.

$$B_{m,k} = \sum_{p=0}^{P-1} W_p X_p (k - D_{m,p})$$

Where $B_{m,k}$=the kth time sample of the mth beam output $W_p$=the shading coefficient for the pth hydrophone signal $X_{p,k}$=the kth time sample of the pth hydrophone signal.

$D_{m,p}$=delay for the mth beam and the pth sensor.

The advantage of two-dimensional addressing is immediately obvious from the above expression. Also the ability to independently increment the indices in the selection of the sensor-time samples ($X_{p,k-D_{m,p}}$) permits straightforward time domain beamforming for arrays of any geometry.

Figure 10:
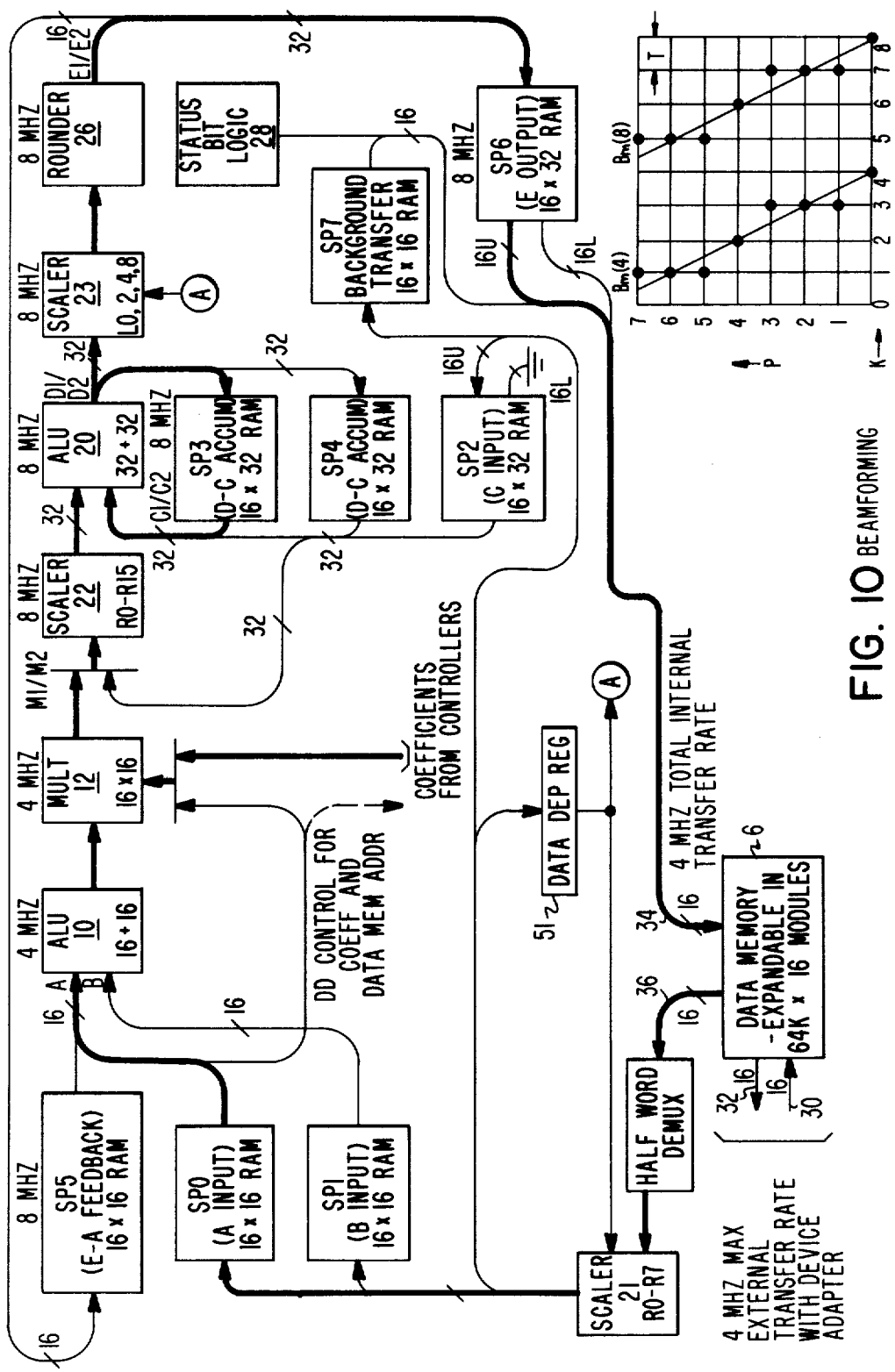
FIG. 10 is a data flow diagram of the arithmetic/memory unit for carrying out a time delay beam forming computation.

The process flow is illustrated in FIG. 10 for time domain beamforming when the nearest available time sample is used (no interpolation). The signal samples are two-dimensionally addressed from the main store 6 and fed to SP0, routed through ALU10 to the multiplier 12 where the weighting of the sample takes place. The shading coefficients are obtained from the coefficient store 24. All P sensor-time samples used to produce a beam output are addressed in succession; the partial sum is stored in SP3. When all P sensor signals have been summed, the output (Bm,k) is passed through scaler 23 and the rounder 26 for transfer to main store 6 via SP6. The ability to consecutively sum the sensor samples to produce a beam output results in a very straightforward algorithm when compared to some partialsum beamforming architectures; the processor also has the ability to perform frequency domain beamforming very efficiently.

Time domain beamforming is a spatial FIR filter and with this architecture, the computations are performed at the output rate so that data decimation can be utilized efficiently. This is important for systems in which narrowband processing is used in conjunction with the time domain beamformer. It has been shown that severe side lobe degradation can result in uniformly spaced, linear arrays if the sensor signals are not sampled at many times the Nyquist rate or if interpolation is not used to increase the effective sample rate. Interpolation can be included in the beamforming computation by extracting an adjacent set of temporal samples for sensors that have large delay errors and applying interpolation filtering. The aperture weight and interpolation weight can be combined into a composite weight that is stored in the coefficient store. Therefore for a linear interpolation (produces good performance when original sensor sample rate is approximately four to five times Nyquist), sample pairs are fed to the arithmetic element for sensors requiring interpolation and two weights are used, one for each sample. Higher order interpolation can also be implemented in the same manner. Another advantage of being able to execute time domain beamforming as a FIR filter, wherein the computational load is a function of the bandwidth determined output sample rate, occurs when using nested aperture linear arrays; the computational load is a function of bandwidth and is not a fixed channel utilization independent of signal bandwidth.

FUNCTIONAL PROCESSING ELEMENT (FPE) HARDWARE DESCRIPTION

The FFE is a microprogram controlled signal processor that operates at a basic machine cycle of 4 MHz. The control functions of the pipeline are partitioned on the control unit (CU)2 element such that a single CU2 is capable of driving several arithmetic/memory units (AMU)4 in a lock-step fashion. This description will limit itself to a singular AMU/CU configuration.

PROCESSOR ARITHMETIC PIPELINE

The arithmetic pipeline (AP), FIG. 3 is made up of various scalers, scratch pad memories, weighing ALUs, a multiplier and an output rounder. It operates in a time-staged sequence capable of producing data throughput at an 8 MHz rate. Two's complement arithmetic is used throughout. The entire AP is controlled by the microinstruction, FIG. 5.

The processor receives input data at an effective 4 MHz rate from main memory 6. The input data scaler 21 accepts 16-bit data from main memory 6 and right shifts it 0 to 7 bit positions under control of a three-bit shift code from either the microinstruction when in normal mode or from a code determined by previously processed data when in the data dependent mode. The mode is specified by the microinstruction. The data dependent scale control is determined by the status code logic.

Two's complement data is used, so the high order bits vacated by shifting are each filled with the sign of the input (0 for positive, 1 for negative). The scaler 21 is implemented with cascaded four-way multiplexers.

The scaled input data is received by one of three scratch pad (SP) memories SP0, SP1 or SP2 defined by the microinstruction. The entire transfer from main memory 6 source location to scratch pad sink location is specified by microinstruction bits.

Main memory 6 can have SP0, SP1 or SP2 as an output sink and SP6 as an input.

The scratch pad memories are 16 word, high speed static transistor transistor logic (TTL) random access memories with tri-state outputs which permit busing (wireoring) of various sources together. This eliminates the need of hardware multiplexing.

Arithmetic logic unit (ALU)10 is high speed 16-bit, 16-function module that is capable of output function, $F=A$, $B$, $A+B$. The function code for this ALU is specified by microinstruction bits.

The ALU's A port input can be either SP0 or SP5, determined by microinstruction. The B port input is wired directly from SP1. Addressing for these scratch pads is directly specified by microinstruction bits. The output of ALU10 is stored in the multiplicand (X) register of the multiplier 12. The transfer of data from scratch pad memory through ALU10 is stage 1 of the pipeline (total elapsed time: 125 nanoseconds).

The multiplier 12 (Y) input is controlled by microinstruction bits. The source is either the SP0 or SP5, from the ALU10 A port or the 16-bit values from the coefficient store 24 (located on the control unit). This data is fed to the multiplier 12 input via a two-input multiplexer which is controlled by a decode of microinstruction bits.

The multiplier 12 is a high speed, low power, large scale integration (LSI) device with onboard input and output registers. The device produces a 16 by 16 bit two's complement double precision product in less than 250 nanoseconds (ns). The product is clocked into the output registers where it is held stable for the subsequent operations. The multiplier 12 is stages 2 and 3 of the pipeline (total elapsed time: 375 nanoseconds).

Up to this point of the pipeline, the arithmetic has been running at a 4 MHz rate with new data being processed every 250 nanoseconds. From this point forward, data is processed at an 8 MHz rate. This allows for the required two additions per multiply commonly needed in many signal processing algorithms. Since the microinstruction is only available at a 4 MHz rate from the CU2, provision is made by duplicating the control bits in the microinstruction where necessary (ALU20 and round sink code). When not duplicated, the control bits are maintained for both operations (output scaler and round control). The data processed during the first 125 nanoseconds of the stable multiplied product is referred to as subcycle 1 and the data processed during the second 125 nanoseconds is referred to as subcycle 2. The data flow from this point forward will be discussed relative to subcycle 1, understanding that a similar independent process is happening in subcycle 2.

ALU20 input scaler 22 is capable of right shifting the 32-bit data 0 to 16-bit positions under control of a four-bit scale code from microinstruction bits. The scaler 22 is implemented with the same cascaded four-input multiplexer modules as described in the input data scaler 21. Also, as in the input data scaler 21, the sign value fills the high order bits vacated by the shifting process.

The data source for the ALU20 input scaler 22 can either be the product output or SP2, SP3 or SP4. This data is gated via a two-input multiplexer controlled by a microinstruction bit. If the scratch pad port of the multiplexer is selected, then the same scratch pad being used as the source to ALU20 is passed simultaneously to ALU input scaler 22.

ALU20 input scaler 22 is stage 4 of the pipeline (500 nanoseconds total elapsed time).

ALU20 is implemented using two high speed function generator modules for the 32-bit wide data path. The functions required of this ALU are: $F=A$, $B$, $A+B$, $B-A$, $|A|+|B|$, and $|B|-|A|$. Since the module is not capable of providing $B-A$ directly, a two-input multiplexer was provided in front of each port to cross the inputs during the $B-A$ function.

The two-input multiplexer has as an input the stage delayed ALU20 input scaler 22 value or a scratch pad memory bus comprised of SP2, SP3 or SP4. The data sink for ALU20 can be either SP3 or SP4 or the output data scaler 23. A microcode design constraint is that the source scratch pad memory cannot also be chosen to be the sink scratch pad during the same subcycle. The microinstruction bits controlling the ALU function, the source scratch pad and address, and the sink scratch pad and address are a first field of bits for subcycle 1 and a second field of bits for subcycle 2. ALU20 is stage 5 of the pipeline (total elapsed time: 625 nanoseconds).

The output data scaler 23 provides output normalization of the processed data and is capable of left shifting the 32-bit data 0, 2, 4 or 6-bit positions under control of a two-bit scale control from the microinstruction. This scale code is applied to the data in both subcycle 1 and subcycle 2. The scaler 23 has overflow protect circuitry which senses significant bits as they are left shifted and dependent on whether the data is positive or negative, forces the output to 01 . . . or 10 . . . 0 upon overflow detection. The output data scaler 23 circuitry is basically made up of four-input multiplexers hardwired for the four possible shift conditions. The output of this multiplexer feeds a two-input multiplexer which passes either the shifted data or the forced values. The overflow detect logic is implemented in a field programmable logic array (FPLA). The output data scaler 23 is stage 6 of the pipeline (total elapsed time: 750 nanoseconds).

The final stage of the pipeline is the output data rounder 26 which operates on the high order 16 data bits. The 32-bit data can be passed unaltered or rounded to the high order 15 bits plus sign followed by 16 zeros. The round command of the microinstruction is applied to the data in both subcycle 1 and subcycle 2. The sink for the output data rounder 26 can either be SP5 or SP6. SP5 is only 16 bits wide and therefore truncates the data to sign and 15 bits if the round mode is not chosen. SP6 is a full 32-bit memory and buffers the output data for transfer to main memory 6. The SP5 or SP6 address is directly specified by a set of microinstruction bits, and other bits specify the subcycle data to be stored. If both E1 and E2 bits are active (see FIG. 5), then subcycle 1 data is to be stored in the specified address and subcycle 2 data is to be stored in the specified address plus one. The output data rounder is implemented by using function generator modules and two-input multiplexers to pass either the unaltered data or zeros to the low order 16-bit data field. The rounder 26 is stage 7 of the pipeline (total elapsed time: 875 nanoseconds).

SP6 is actually two 16-bit memories. Full precision (32-bit) data must necessarily require two successive transfers to the 16-bit main memory 6.

PROCESSOR MAIN MEMORY

Figure 11:
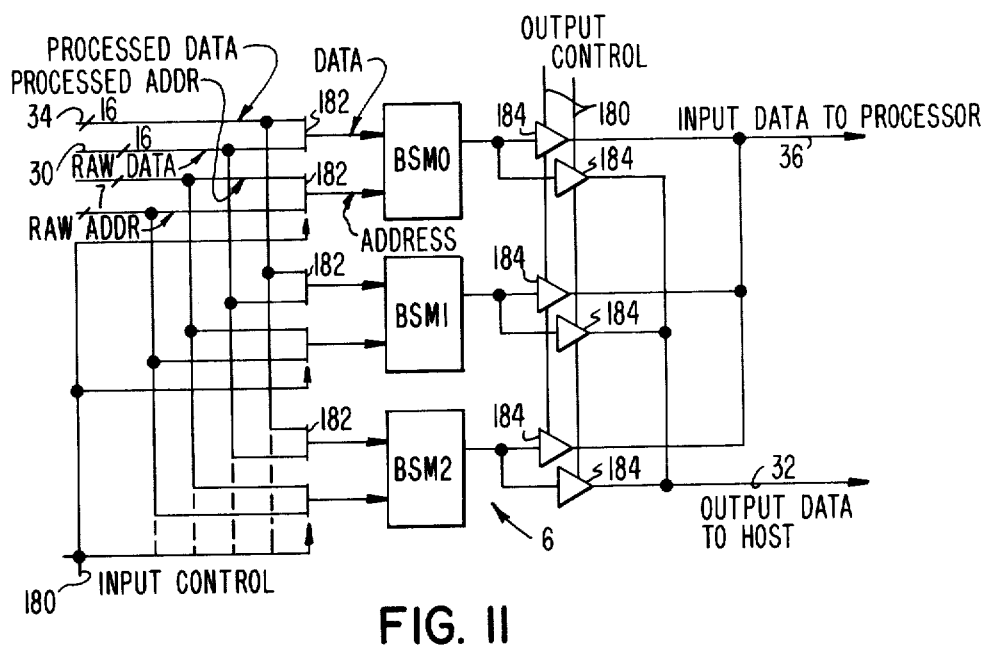
FIG. 11 is a functional block diagram of the main memory organization.

The main memory 6 is made up of three memory modules (FIG. 11), each of which is effectively 16 bits wide by 64K words deep.

Figure 12:
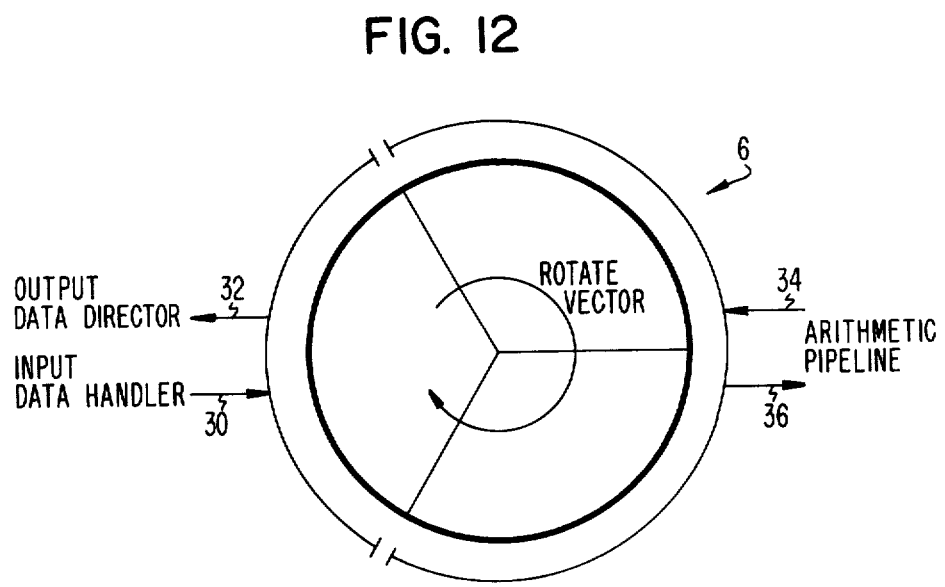
FIG. 12 is a schematic diagram of the revolving buffer concept.

The three modules are designed together in a circular file—or revolving buffer—fashion (FIG. 12) such that at any given point in time, two of the modules are switched to communicate with the arithmetic pipeline and a third is communicating with the input data handler and the output data director. At the end of the processing cycle, the microinstruction will rotate the modules such that the module that just emptied processed results to the outside world and just received a new input data record, becomes the new input data module for the arithmetic pipeline. The module that previously had the new input data record now becomes the overlap data record and current processed results buffer; and, the previously processed results module is now connected to the outside world to provide processed data to the host system and to accumulate the next new input data record.

The input to each main memory module is a two-input multiplexer 182 that has the arithmetic pipeline SP6 as one input 34 and the input data handler as the other input 30. The output of each module feeds two banks of tri-state (T/S) buffers 184. One bank is wired 36 to the arithmetic pipeline, the other bank is wired 32 to the output data director. Control of the input multiplexer and the output T/S buffers is directed over line 180 by the main memory address generator 18a which also multiplexes the address lines to and provides chip select and write enable to each of the main memory modules.

PROCESSOR TIMING

Figure 13:
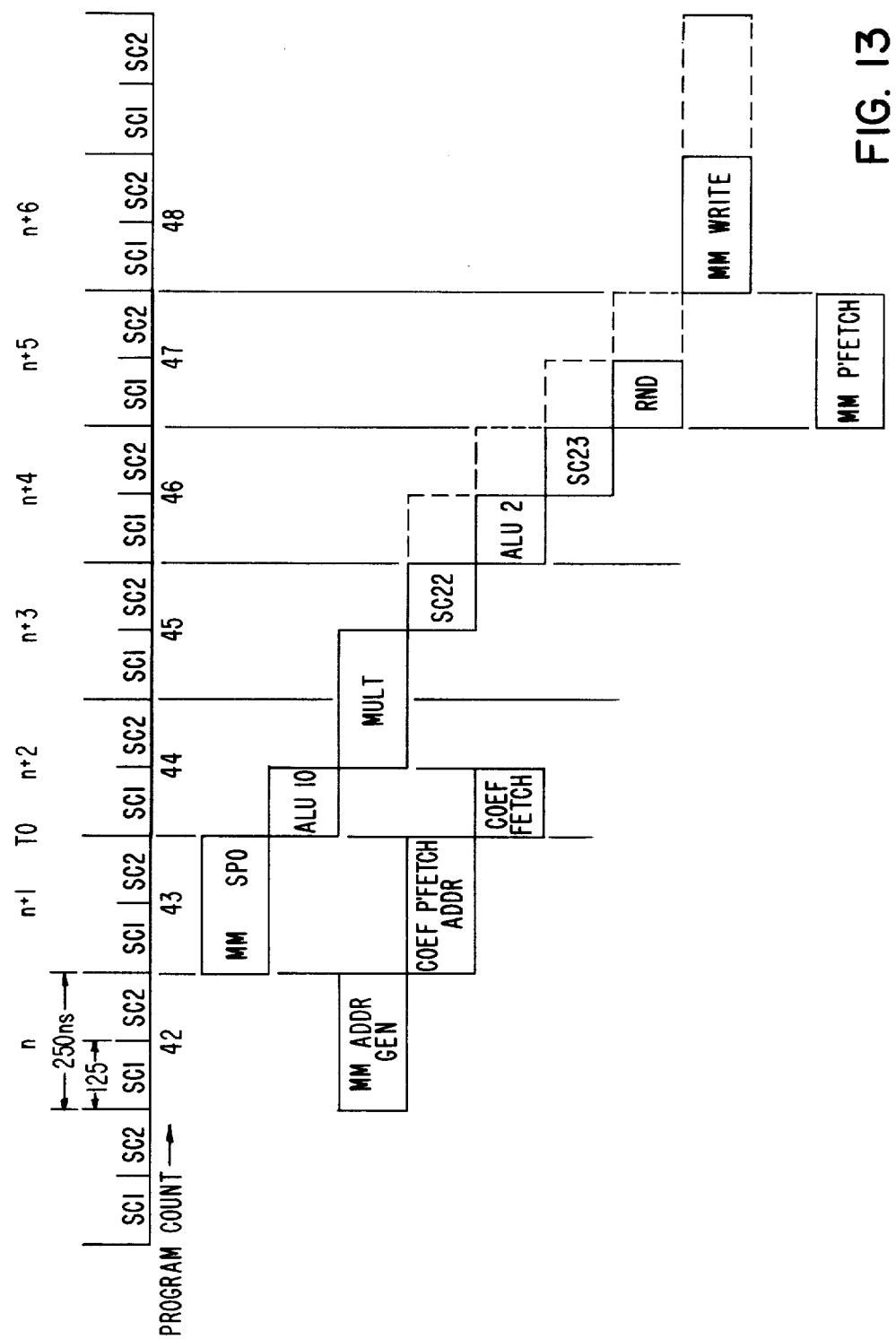
FIG. 13 is a timing diagram for the processor timing.

Basic timing for the processor is provided by six phases of 4 MHz. In the AMU4 chassis, phase 1 is used to generate 2 MHz and 4 MHz square wave signals. These are used to regulate the various memory controls and pipeline staging cycles. FIG. 13 shows the basic timing sequence of a main memory to scratch pad data transfer and the processing sequence of data from one of the main memory scratch pads (SP0 or SP1) through the six stages of the pipeline.

As can be seen on the diagram, data that enters the pipeline at time zero ($t_0$) is available at the rounder 26 output 875 ns later.

CONTROL UNIT

The purpose of the control unit (CU2) is to:
1. Provide initial program load (IPL) of microprogram, stack, and coefficient parameters.
2. Provide next address generation for microprogram store 39.
3. Provide coefficient store 24 address generation.
4. Provide scratch pad 16 address generation.
5. Provide main memory 6 address and control.

The CU2 function will be performed by various sections shown in FIG. 14. These sections are:
1. IPL control 52.
2. Microprogram store 39 and sequencer 38.
3. Multiplier coefficient store 24 and controller 18c.
4. Scratch pad address generator 18b.
5. Main memory address generator 18a.

These sections will now be described.

OVERVIEW OF CONTROL UNIT HARDWARE

Initial Program Load (IPL) Control 52

The IPL control section 52 will transfer data from the computer to the processor. The devices to be loaded during IPL are:
1. Microprogram RAM
2. Coefficient RAM
3. BFC preset and address stack
4. BFC loop count stack
5. Coefficient address/increment
6. Main memory address/increment stack

Microprogram Sequencer

Figure 15:
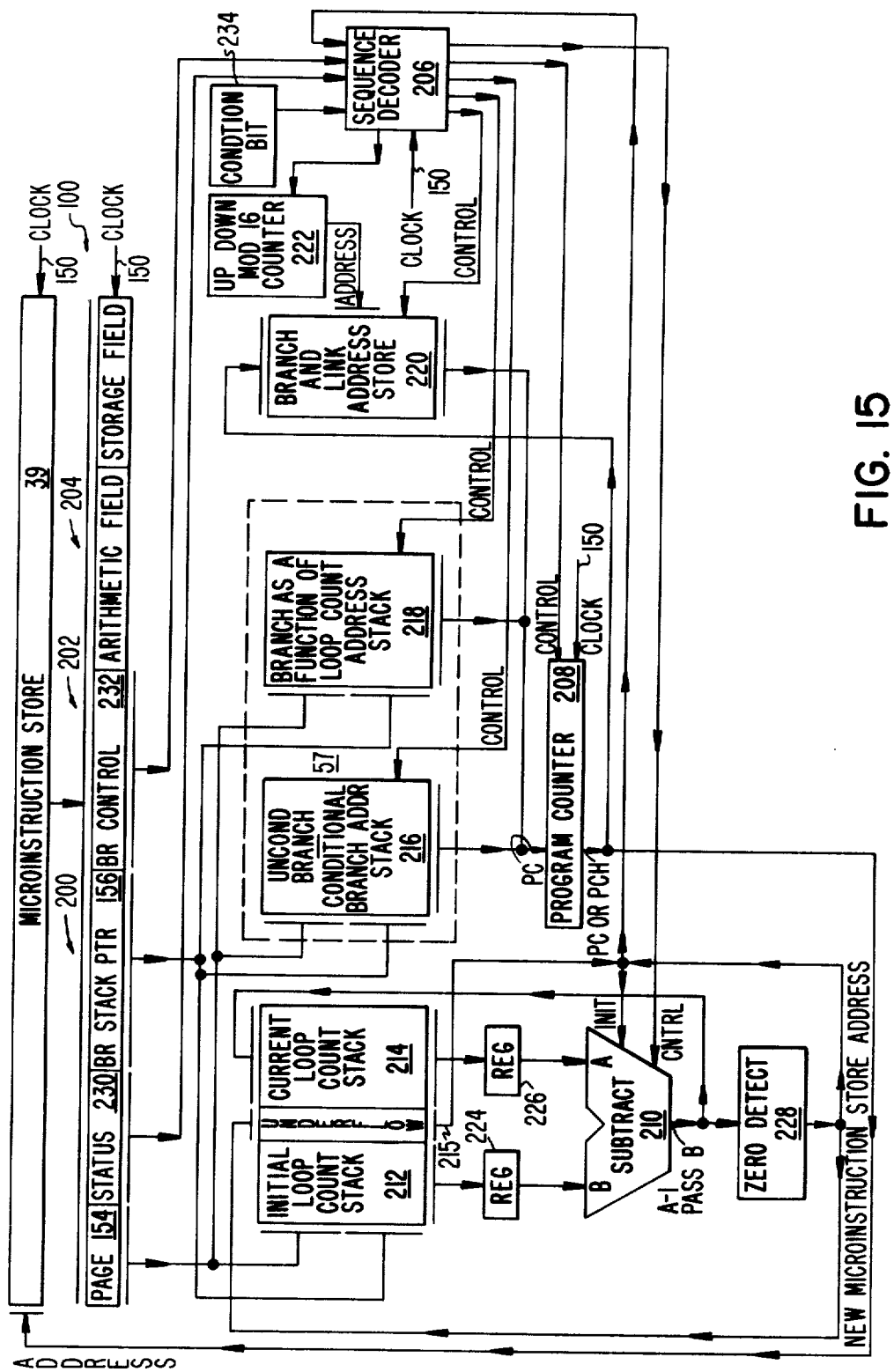
FIG. 15 is a functional block diagram of the microprogram sequencer.

The microprogram sequencer 38, FIG. 15, will provide all addressing and sequence control of the microprogram store 39. Features provided are current address plus one, nested loops and conditional or unconditional branching.

The sequencer 38 consists of microinstruction decoding logic 206, program counter 208 and register, loop control logic 210, two loop control stacks 212 and 214, an unconditional/conditional (UB/CB) branch address stack 216, a branch as a function of count (BFC) stack 218 and a branch and link address store 220.

Each loop control stack 212 and 214 contains 512 values. The initial loop count stack 212 contains the loop sizes (up to 2048 iterations per loop). It is initialized during IPL and remains unaltered during operational processing. The current loop count stack 214 contains the present value of each loop in the microprogram as well as a bit to indicate whether or not the loop has been satisfied. The BFC address stack 218 contains 512 addresses for BFC instructions and the UB/CB address stack 216 contains 512 addresses for UB and CB instructions.

Each of the microinstructions implemented by the sequencer 38 will be discussed below.

CONT (Continue)

The continue instruction causes the program counter 208 to be incremented, thus accessing the next microinstruction from the control store 39. No modification is made to any of the stack values.

BFC (Branch as Function of Count)

The BFC microinstruction will control all loop activity. The microprogram sequencer 38 will provide the ability to perform up to 2048 iterations of any loop, nested or not.

At the end of a sequence of code defined as a loop, the BFC op code will appear. The current loop count stack 214 is accessed as defined by the branch stack pointer field 156 of the microinstruction and the underflow bit 215 in stack 214 is examined. If this bit 215 is off, indicating that the loop has not completed, and the op code so indicates, the program counter 208 is loaded with the value for the beginning address in the loop, from the specified location of the BFC address stack 218. If the underflow bit 215 was set, the program counter 208 proceeds to address PC+1. In this case, the value in the current loop count stack 214 in is changed to the initial value, in preparation for a possible later return to this loop.

UB (Unconditional Branch)

When an unconditional branch is specified, the program counter 208 is loaded directly from the UB/CB address stack 216.

CBS∅, CBS1 (Conditional Branch)

Conditional branching occurs based on particular op codes and the state of status bits.

If the specified status bit is on, the program counter 208 is loaded from the UB/CB address stack 216. If the bit is not on, the program proceeds to address PC+1 (no branch).

DBCR (Decrement Branch Count Register)

This op code causes the contents of the specified address in the current loop count stack 214 to be read out, decremented, and written back into the same address. If the underflow bit 215 is detected when the current loop count is read out, the contents of the initial loop count stack 212 replace the current loop count value to re-initialize the loop. The program proceeds to address PC+1.

Microprogram Store

The microprogram store RAM 39 provides 2048 words of code for the processor. Each word is 128 bits wide. The various instruction fields in the microinstruction can be found in FIG. 5. Microprogram addressing is generated for expansion to up to 4096 words of microcode.

MULTIPLIER COEFFICIENT MEMORY 24 AND CONTROLLER 18c

The coefficient RAM (CR)24 and coefficient RAM controller (CRC)18c will provide all multiplier 12 coefficients for the arithmetic element (AE). The CR24 will be loaded during IPL and will be accessed by the microinstruction word. The CRC18C will generate all CR addresses based on the addressing mode selected via the microinstruction.

Figure 16:
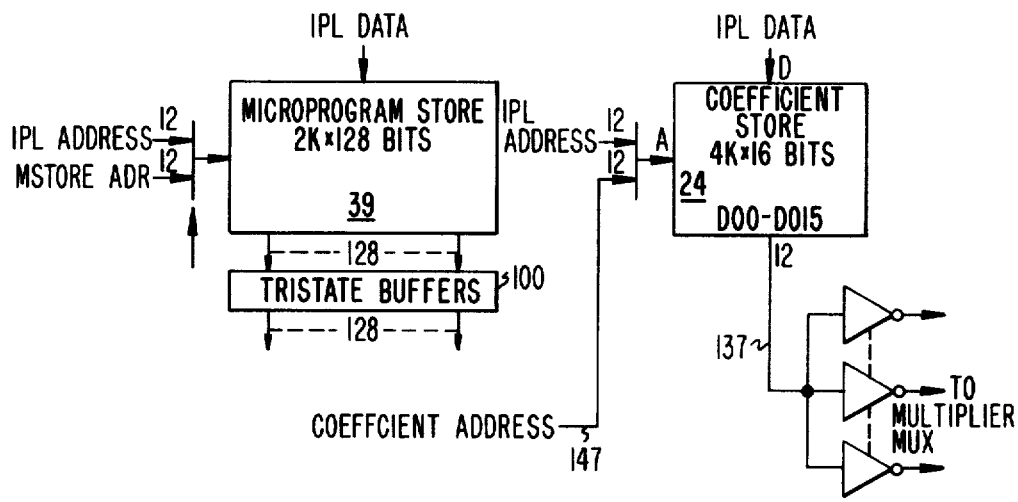
FIG. 16 is a functional block diagram of the microprogram store and coefficient store.
Figure 17:
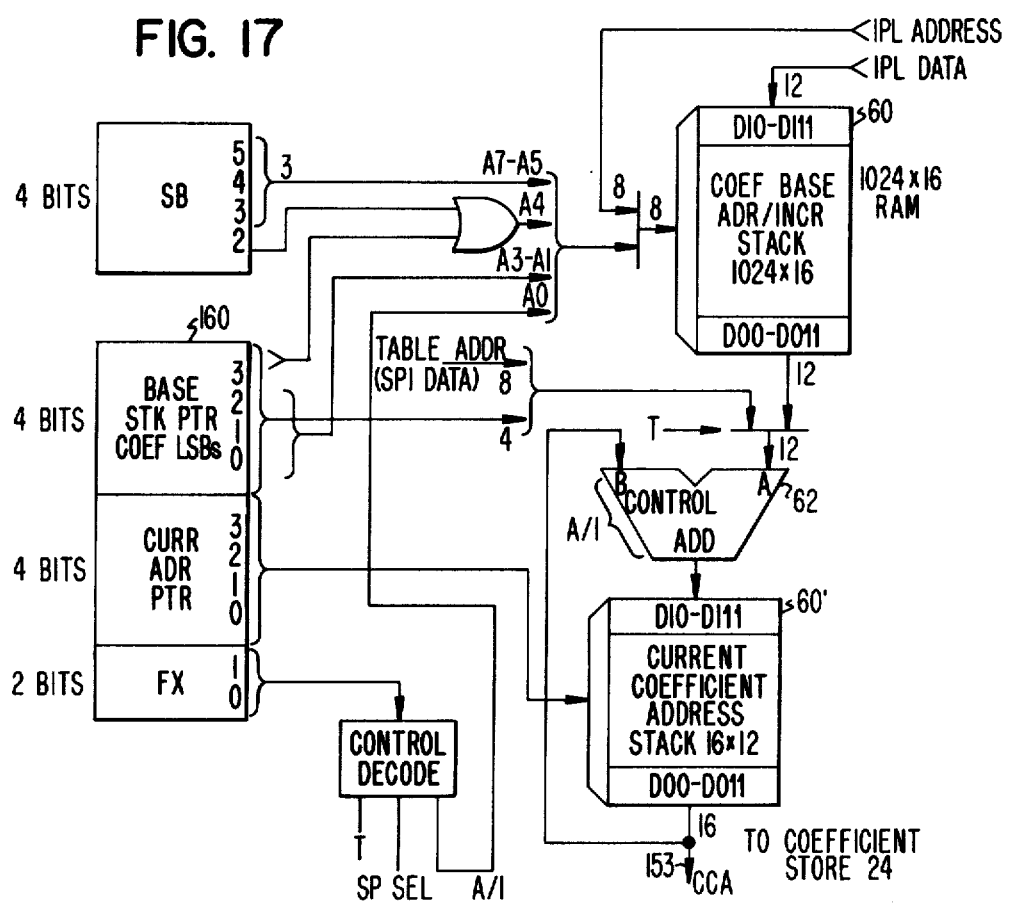
FIG. 17 is a functional block diagram of the multiplier coefficient controller.

This function consists of the coefficient RAM24 in FIG. 16, and the address/increment stacks 60 and address ALU62 of FIG. 17.

There are four basic control states of the CRC18c. These states are selected by bits of the microinstruction (see FIG. 5). These states use the addresses or increments from the two stacks 60 to generate the CR address.

The four control states of the CRC18c are:
1. Address mode
2. Increment mode
3. Table look-up mode
4. Scratch pad select.

In the first three modes, the coefficient RAM24 is selected as the multiplier 12 input. In the scratch pad mode, SP1 provides the multiplier 12 inputs and the coefficient RAM24 is locked out.

Discussion of the three coefficient RAM states will be broken into two parts. The first part will describe the actual address generation of the three modes and the second part will describe the generation of the stack pointers.

In the address mode, the 12-bit address found in the coefficient base address stack 60 will be gated directly to the current coefficient address (CCA) stack 60. The CCA stack 60 address is specified by the current address stack pointer. This current stack 60 will provide a temporary store for addresses to be incremented or will simply buffer the selected CCA.

In the increment mode, the 12-bit increment value from the coefficient base increment stack 60 will be added to one of 16 current coefficient addresses selected by the current address pointer of the same microinstruction.

In the table look-up mode, the output CCA will be SP1 data. This 12-bit address will be gated through the ALU62 and stored in the CCA stack location specified by the current address pointer.

SCRATCH PAD ADDRESS GENERATOR AND CONTROL 18b

As outlined previously, the microinstruction contains fields for selecting reading, writing, and addressing of all scratch pads 16 within the arithmetic element. Rather than detailing the various bit assignments, discussion will focus on the actual scratch pad function, that is, scratch pad select and address logic and common read/write circuitry.

Figure 18:
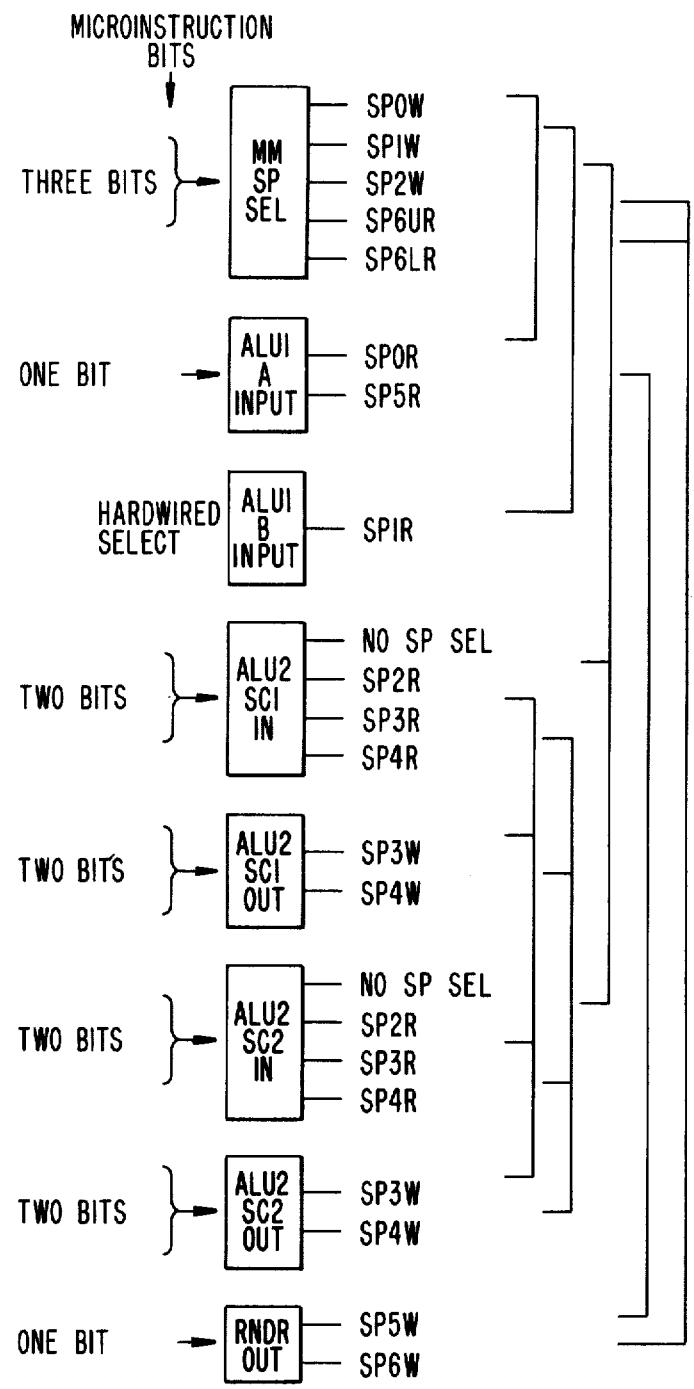
FIG. 18 is an operational diagram for a scratch pad memory address selection.

FIG. 18 presents an overview of the scratch pad select function. The microinstruction bits are labeled vertically, adjacent to each select decoder.

The brackets adjacent to the decode outputs depict the read/write address selections. For example SP0R is the origin of the SP0 read address and SP0W is the origin of the SP0 write address. The actual read or write address is gated to the appropriate select lines.

In the case of SP0 or SP1, the ultimate read/write address may be an absolute address directly from the associated address field or it may be an incremented address with the address field containing an increment value. All other scratch pads are directly addressed only.

Upon decode of address destination, the appropriate read or write controls are applied to the selected scratch pad 16. Each scratch pad will have similar circuitry for control "tailoring" to the specific case.

MAIN MEMORY ADDRESS GENERATOR

Figure 19:
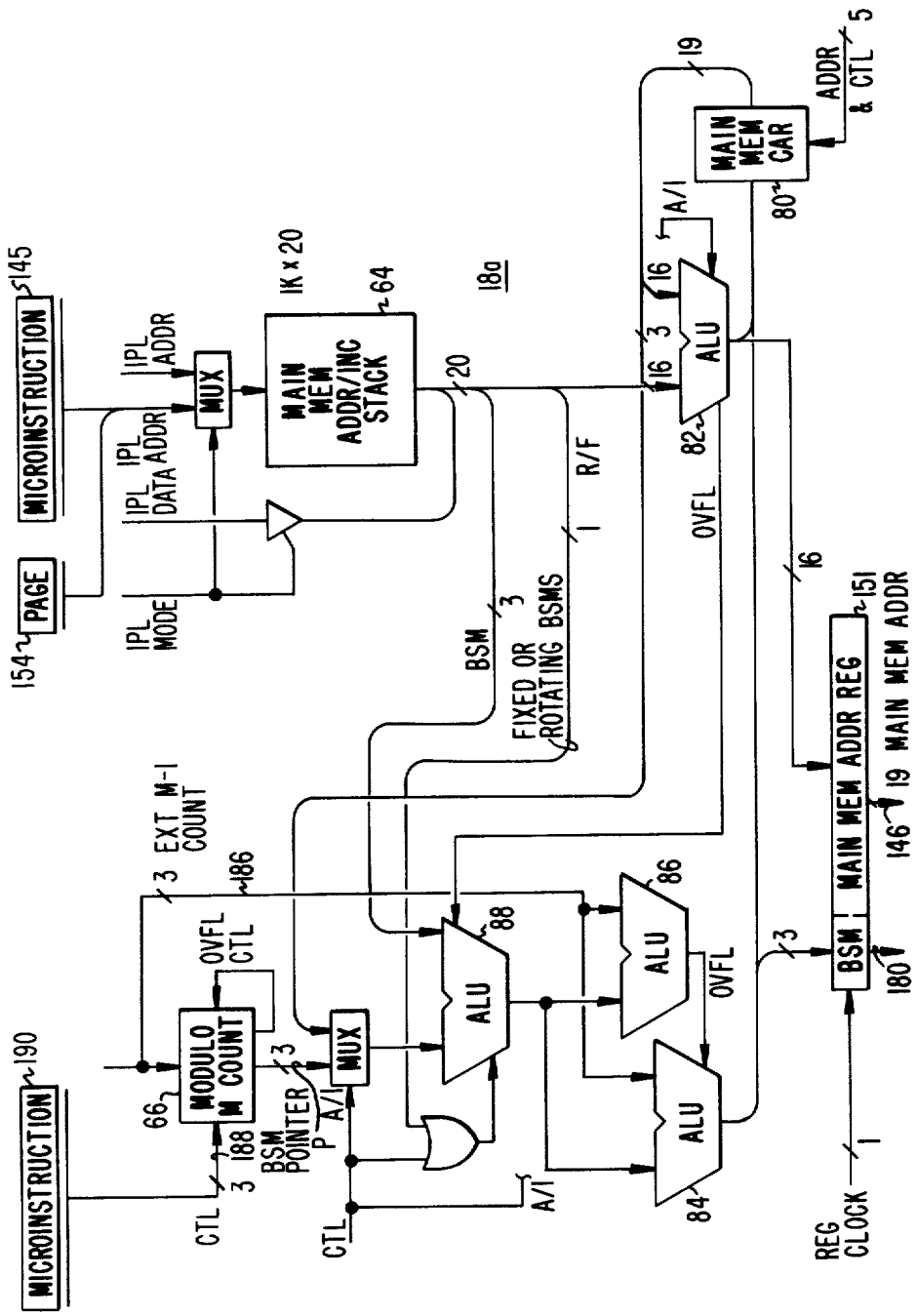
FIG. 19 is a functional block diagram of the main memory address generator.

The main memory address generator 18a is shown in FIG. 19. It provides addressing up to eight 64K word BSMs. The generated address is 19 bits in length. The most significant three bits select one of eight BSMs over line 180 and the least significant 16 bits are used to access a location within the selected BSM over line 146.

The main memory address generator 18a includes current address register 80, a base address/increment stack 64, main memory address register 151, modulo counter 66 and ALUs 84, 86 and 88 for BSM selection, and ALU 82 for address calculation.

The current address register 80 stores up to 16 current or updatable main store addresses. The base address stack 64 contains 1024 base addresses or increments, organized in a page fashion where the individual pages each contain 16 addresses or increments. The pages are selected by using page bits 154. The modulo counter 66 generates the most significant three bits of the main memory address as a function of the "rotate file" microinstruction usage and the number of BSMs defined as "rotating" at IPL in a set-up register. The most significant bit of the base stack 64 output is used to indicate whether the address is for a fixed BSM or a rotating BSM.

A new main memory address is calculated as the result of each microinstruction executed. A value is fetched from the base address stack 64 using a 10-bit address formed by catenating page bits 154 and the four-bit base stack pointer 145 in the microinstruction.

The ALU82 either passes the resulting 16-bit field or adds this field to the output of the specified current address location depending on whether the field is specified as an address or an increment.

The most significant three bits 180 of the base address (after the rotate/fixed bit) are used to select a BSM. If a fixed BSM is selected, these three bits are appended to the 16-bit ALU82 output 146 if the A/I bit indicates an address, or added to the most significant three bits of the current address stack 64 output if the A/I bit indicates an increment. If a rotating BSM is selected, these three bits 180 are added to either the three most significant bits of the current address register 80 (A/I=increment) or the current modulo pointer 66 (A/I=address).

The additional ALUs 84, 86 and 88 are provided to detect when a "rotate file" command will cause the BSM value to go beyond the boundary of rotatable BSMs as defined at IPL and to correct the value.

The modulo M counter 66 is loaded over line 186 at IPL time with a modulo base value which is the number of BSMs (from 0 through 7) to be operated in the revolving buffer manner. Bits 124 to 126 of the field 190 in the microinstruction word can then be applied over line 188 to the modulo M counter 66 to increment the counter each time it is desired to rotate the buffer. For example, at IPL time, the value M=3 is loaded into the module M counter, enabling a three-BSM revolving buffer operation. Then, the external bus interface unit (BIU) wants to load a BSM with data over line 30 to one half of its full capacity. Assume that at this time, BSM1 is being pointed to by the BSM pointer value P=1 output from the modulo M counter 66 to the line 180. BSM2 is connected to the load line 34 from the AU, BSM1 is connected to line 30 and BSM0 is connected to the unload line 36 from the AU. After the BIU has completed loading the data into BSM1, it sends a start pulse to the microinstruction sequencer 38 which will access a first microinstruction from the microinstruction store 39, the bits 124 to 126 of which form a control signal over line 188 to increment the BSM pointer P by unity. The new value of P=2 is output on line 180 to the multiplexers 182 and tri-state drivers 184, connecting the output of BSM1 to line 36 to the arithmetic unit 4. BSM2 is connected to the unload line 32 and the load line 30 from the BIU and BSM0 is connected to the load line 34 from the AU.

DETAILED DESCRIPTION OF THE CONTROL UNIT ARCHITECTURE

As can be seen from the previous overview discussion, the use of common page numbers to access microinstruction control stacks, data memory control stacks and coefficient memory control stacks from a microinstruction word which also includes a control field portion, an arithmetic field portion, and a storage field portion, provides for a tight coordination between the control operations, the arithmetic operations, and the input/output operations of a pipelined, signal processing computer. This tight coordination enables a quick response by the system to changes in tasks, thereby conferring a great flexibility in its operational characteristics akin to the flexibility generally achieved in a general purpose computer, notwithstanding the rigid sequential structuring which pipelined arithmetic operations generally require.

Figure 20:
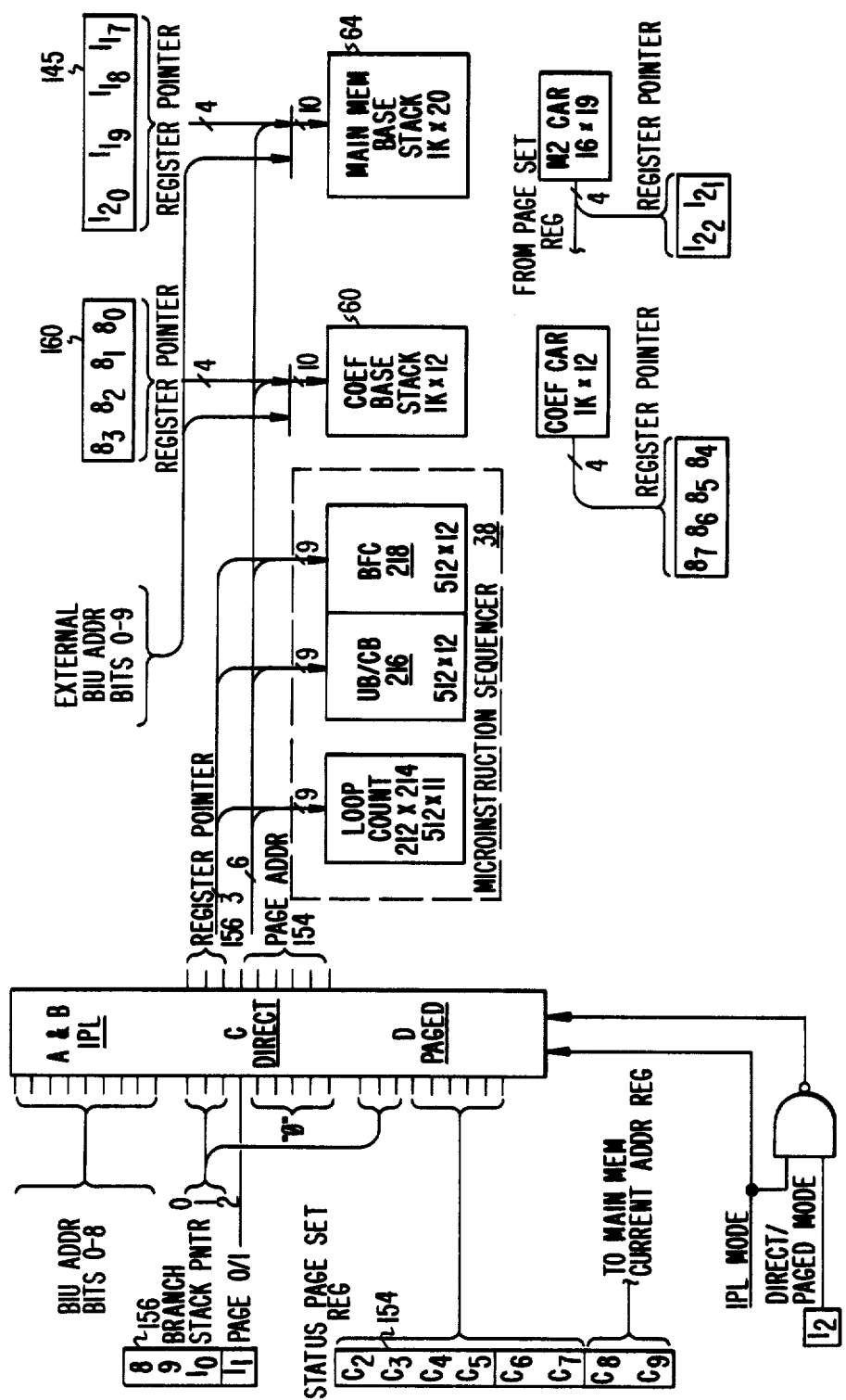
FIG. 20 is an overall functional block diagram illustrating the unity of control by page address, of the control stacks, the main memory pointer stack, and the coefficient memory pointer stack.
Figure 21:
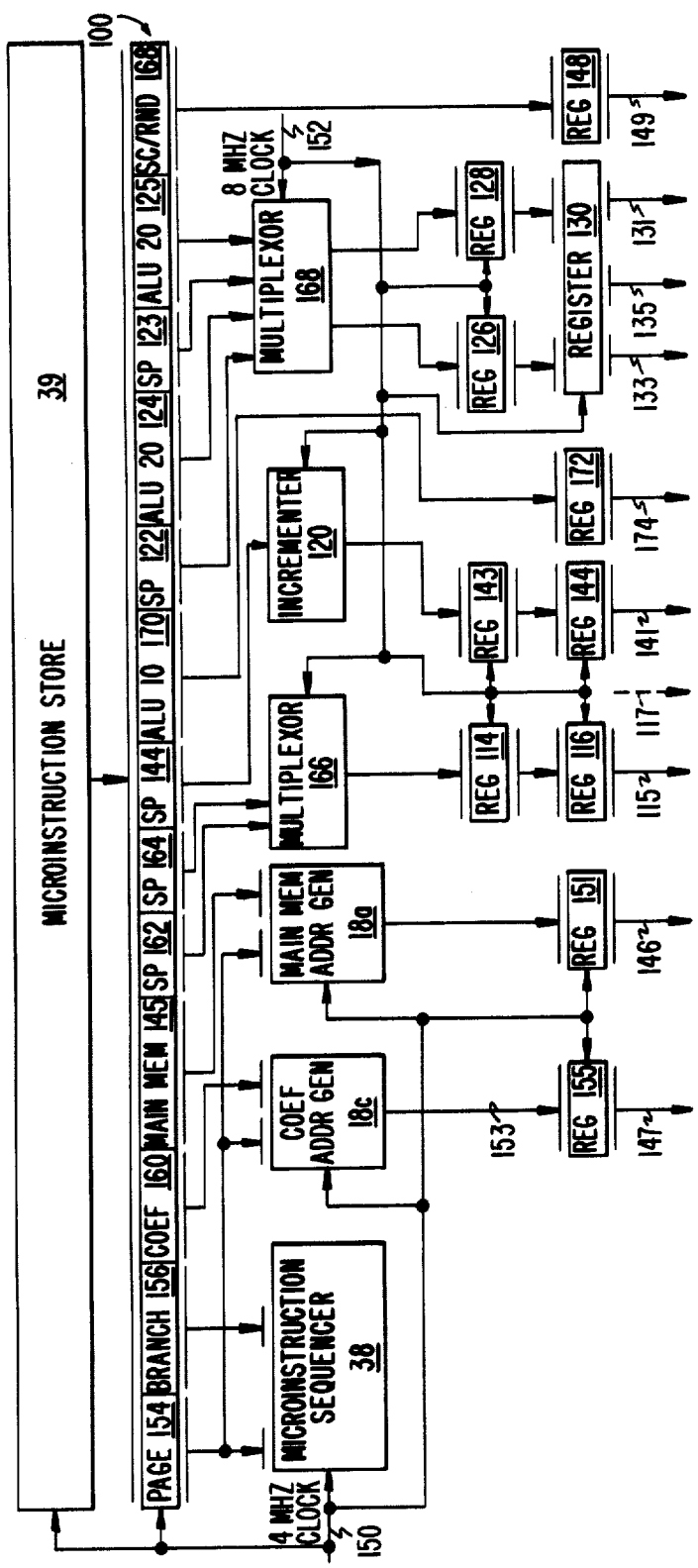
FIG. 21 is a more detailed functional block diagram of the controller 2.

These significant advantages are achieved by the control unit invention which is shown in greater detail in FIGS. 15, 20, and 21. FIG. 20 is a functional block diagram illustrating the unity of control over the control stacks in the microinstruction sequencer 38, the coefficient base stack 60, and the main memory base stack 64. FIG. 15 focuses more particularly on the detailed structure of the microinstruction sequencer 38. FIG. 21 focuses with greater particularlity on the detailed structure of the scratch pad address generation logic 18b and the arithmetic control logic.

As may be seen in FIG. 15, the microinstruction storage 39 has an address input and a microinstruction word output to a register 100, for storing microinstruction words, each having a control field group 200 including a page address field 154, a branch stack pointer field 156, and a branch control field 232. Each of the microinstruction words further includes an arithmetic field group 202 and a storage field group 204. A first clock 150', operates at 4 MHz, and is connected to the microinstruction storage 39, for producing a first clock signal 150 at the 4 MHz repetition rate, to signal the microinstruction storage to output the microinstruction words at the 4 MHz rate, each microinstruction word being respectively accessed at an address applied to its address input during a corresponding 250 nanosecond microinstruction interval.

A sequencer decoder 206 has a clock input connected to the first clock 150, a first input connected to the branch control field 232 of the microinstruction storage output, and an output, for decoding branch control instructions in the microinstruction words at the 4 MHz repetition rate.

A branch as a function of loop count (BFC) address stack 218 has a page address input connected to the page address field 154 of the microinstruction storage 39 output, it has a pointer address input connected to the branch stack pointer field 156 of the microinstruction storage, it has a control input connected to an output of the decoder 206, and it has an output. The BFC address stack 218 stores microinstruction loop starting point addresses in a plurality of page groups, each page group being accessed by the page address input, each respective page group having a plurality of the starting point addresses which are accessed by the pointer address input. The BFC address stack 218 selectively outputs new loop starting point addresses in response to the decoder 206 outputting to the stack 218, an indication that the branch control field 232 of the most recent microinstruction word output from the microinstruction store 39, has an end-of-loop instruction in it.

A current loop count stack 214 has a page address input connected to the page address field 154 of the microinstruction storage 39 output, it has a pointer address input connected to the branch stack pointer field 156 of the microinstruction storage, it has a control input connected to the output of the decoder 206, it has an input and an output. The current loop count stack 214 stores the current microinstruction loop counts in a plurality of page groups, each page group being accessed by the page address input, each respective page group having a plurality of the loop counts which are accessed by the pointer address input. The current loop count stack 214 selectively outputs new loop counts in response to the decoder 206 outputting to it, an indication that the branch control field 232 of the most recent microinstruction word output from the microinstruction store 39, has an end-of-loop instruction in it.

A decrementer 210 has an input connected to the output of the current loop count stack 214 and an output connected to the input of the current loop count stack 214, for decrementing by unity the loop count values input to it and outputting the decremented value as the new current loop count, to the input of the current loop count stack 214.

A zero detector 228 has an input connected to the output of the decrementer 210 and an output connected as an input to the decoder 206, for outputting a zero detect signal to the decoder 206 when the decremented current loop count is zero.

A program counter 208 has a clock input connected to the 4 MHz clock 150, an input connected to the output of the BFC address stack 218, a control input connected to the output of the decoder 206, and an output connected to the address input of the microinstruction storage 39. The program counter 208 stores the address of the most recent microinstruction word output from the microinstruction store 39 as a program count (PC) and increments PC by unity at the first 4 MHz repetition rate, as the next microinstruction store address. The program counter 208 selectively outputs the loop starting point address from the BFC address stack 218 as the next microinstruction store address, in response to the decoder 206 not receiving the zero detect signal from the zero detector 228 when the decoder 206 outputs the indication that the branch control field 232 of the most recent microinstruction word output from the microinstruction store 39, has an end-of-loop instruction in it.

In this manner, looped microinstruction sequences can be flexibly controlled in the signal processing computer.

The microinstruction sequencer 38 of FIG. 15 further includes an initial loop count stack 212 having a page address input connected to the page address field 154 of the microinstruction storage output, having a pointer address input connected to the branch stack pointer field 156 of the microinstruction storage, having a control input connected to the output of the decoder 206, and having an output. The initial loop count stack 212 stores the initial microinstruction loop counts in a plurality of page groups, each page group being accessed by the page address input, each respective page group having a plurality of the initial loop counts which are accessed by the pointer address input. The initial loop count stack 212 selectively outputs new initial loop counts in response to the decoder 206 outputting to it an indication that the branch control field 232 of the most recent microinstruction word output from the microinstruction store 39, has an initialize-loop instruction in it.

The decrementer 210 has a second input connected to the output of the initial loop count stack 212 and a control input connected to the output of the decoder 206. The decrementer 210 transfers the new initial loop counts to the input of the current loop count stack 214 without decrementation, in response to the decoder 206 outputting to it the indication that the branch control field 232 of the most recent microninstruction word output from the microinstruction store 39, has an initialize-loop instruction in it.

In this manner, looped microinstruction sequences can be flexibly initialized in the signal processing computer.

The decrementer 210 will transfer the new initial loop count from the initial loop count stack 212 to the current loop count stack 214, in response to the decoder 206 receiving a zero detect signal from the zero detector 228, when the decremented current loop count is zero. In this manner, the current loop count stack can be automatically re-initialized after the completion of a loop.

The microinstruction sequencer 38 of FIG. 15 further includes a branch address stack 216 which has a page address input connected to the page address field 154 of the microinstruction storage 39 output, it has a pointer address input connected to the branch stack pointer field 156 of the microinstruction storage 39, it has a control input connected to the output of the decoder 206, and it has an output connected to the input of the program counter 208. The branch address stack 216 stores microinstruction branch destination addresses in a plurality of page groups, each group being accessed by the page address input, each respective page group having a plurality of the branch destination addresses which are accessed by the pointer address input. The branch address stack 216 selectively outputs new branch destination addresses in response to the decoder 206 outputting to it an indication that the branch control field 232 of the most recent microinstruction word output from the microninstruction store 39 has a branch operation instruction in it.

The program counter 208 will store the new branch destination address as the new program count (PC) and will output it as the next microinstruction store 39 address in response to the decoder 206 outputting to it the indication that the branch control field 232 of the most recent microninstruction word output from the microinstruction store 39, has a branch operation instruction in it.

In this manner, branched microinstruction operations can be flexibly controlled in the signal processing computer.

The branch operation instruction can either be an unconditional branch or it can be a conditional branch.

A condition bit register 234 has an input connected to a source whose condition is to be monitored, such as an overflow condition in the arithmetic unit 4. The condition bit register 234 has an output connected to an input of the decoder 206. The condition bit register 234 stores a condition bit indicating the condition of the source being monitored.

The control field group 200 of the microinstruction words further include a status control field 230.

The sequence decoder 206 has an input connected to the status control field 230 of the microinstruction storage 39 output, for decoding condition response instructions in the microinstruction words at the first 4 MHz repetition rate.

The branch address stack 216 stores conditional branch destination addresses and selectively outputs new conditional branch destination addresses in response to the decoder 206 outputting to it an indication that the branch control field 232 has a conditional branch instruction in it, that the status control field has a condition response instruction in it, and that the condition bit register has the condition bit on in it.

The program counter 208 will store the new conditional branch destination address as the new program count (PC) and will output it as the new microinstruction store 39 address in response to the decoder 206.

In this manner, conditional branch operations can be flexibly controlled in the signal processing computer.

The microinstruction sequence 38 of FIG. 15 further includes a branch and link address store 220 which has an address inut, a control input connected to an output from the decoder 206, a data input connected to the output of the program counter 208, and a data output connected to the input of the program counter 208. The branch and link address store 220 has N storage locations for storing the incremented program count PC+1 as a microinstruction return-from-branch address in response to the decoder 206 outputting to it a first indication that the branch control field 232 of the most recent microinstruction word output from the microinstruction store 39, has a branch and link instruction in it.

A mod N counter 222 has a control input connected to an output of the decoder 206 and an output connected to the address input of the branch and link store 220. The mod N counter 222 increments by unity in response to the decoder 206 producing the first indication of the branch and link instruction. The mod N counter 222 will decrement by unity in response to the decoder 206 outputting to it a second indication that the branch control field 232 of the most recent microinstruction word output for the microinstruction store 39 has a return-from-branch instruction in it.

The branch and link address store 220 outputs the stored microinstruction return-from-branch address in response to the decoder 206 providing the second indication of the return-from-branch instruction.

The program counter 208 stores the return-from-branch address as the new program count (PC) and outputs it as the next microinstruction store 39 address in response to the decoder 206.

In this manner, branch and link and return-from-branch operations can be flexibly controlled in a signal processing computer.

The unity of control aspect of the invention can be further appreciated with reference to FIG. 20. The microinstruction words have a main memory pointer field 145 in the storage field group. The control unit 2 further includes a main memory address stack 64 having a clock input connected to the 4 MHz clock, having a page address input connected to the page control field 154 of the microinstruction storage 39 output, having a pointer address input connected to the main memory pointer field 145 of the microinstruction storage 39 output, and having an output connected to an address input of the main data memory 6. The main memory address stack 64 stores main data memory addresses in a plurality of page groups, each page group being accessed by the page address input of it, each respective page group having a plurality of the main data memory addresses which are accessed by the pointer address input of it. The main memory address stack 64 accesses data words from the main data memory 6 in response to the page field 154 and the main memory pointer field 145 of the most recent microinstruction word output from the microinstruction store, this being done at the 4 MHz repetition rate.

In this manner, microinstruction words and data to be operated upon in response thereto, can be flexibly accessed in the signal processing computer.

The microinstruction words further include a coefficient memory pointer field 160. The control unit 2 further includes the coefficient memory address stack 60, which has a page address input connected to the page control field 154 of the microinstruction storage 39 output, it has a pointer address input connected to the coefficient memory pointer field 160 of the microinstruction storage 39 output, and it has an output connected to an address input of the coefficient memory 24. The coefficient memory address stack 60 stores coefficient memory addresses in a plurality of page groups, each page group being accessed by the page address input of it, each respective page group having a plurality of the coefficient memory addresses which are accessed by the pointer address input of it. The coefficient memory address stack 60 accesses coefficient words from the coefficient memory 24 in response to the page field 154 and the coefficient memory pointer field 160 of the most recent microinstruction word output from the microinstruction store 39, and at the 4 MHz repetition rate.

In this manner,, microinstruction words, data and coefficients to be operated upon by the microinstruction words, can be flexibly accessed in the signal processing computer.

The close coordination of the arithmetic operations, the data storage accessing operations, and the branching and loop control operations are illustrated with reference to FIG. 21. The microinstruction word further includes a first scratch pad pointer field 162 and a second scratch pad pointer field 164 in the storage field group 204.

The control unit 2 further includes a second clock 152' having an output, for producing a second clock signal 152 at an 8 MHz repetition rate, twice the repetition rate of the first clock signal 150, thereby producing two clock pulses of 125 nanoseconds duration during each microinstruction interval which is of 250 nanoseconds duration.

A first multiplexer 166 has a clock input connected to the 8 MHz clock 152, it has a first input connected to the first scratch pad pointer field 162 of the microinstruction storage 39 output, it has a second input connected to the second scratch pad pointer field 164 of the microinstruction storage 39 output, and it has an output. The first multiplexer 166 connects the output thereof to the first input thereof during the first half of the microinstruction interval and to the second input thereof during the second half of the microinstruction interval.

The arithmetic unit 4 includes a first scratch pad memory SP0 which has a clock input 115 connected to the 8 MHz clock 152, it has an address input connected to the output of the first multiplexer 166, it has a data input connected to a data output of the data memory 6, and it has a data output connected to a first input to a first arithmetic element, ALU10. The first scratch pad memory SP0 will read a first data word out of a first location in it and will output that data word to the arithmetic element ALU10, in response to a first scratch pad pointer field 162 during the first half of the microinstruction interval. The first scratch pad memory SP0 will write a second data word into a second location therein, which was applied at the data input, from the main memory 6, in response to the second scratch pad pointer field 164 during the second half of the microinstruction interval.

In this manner, the first scratch pad SP0 is controlled by the microinstruction word so as to operate at twice the rate at which microinstructions are accessed from the microinstruction storage 39.

The microinstruction words further include a first arithmetic element control field 170 in the arithmetic field group 202. The first arithmetic element ALU10 has a clock input connected to the 4 MHz clock 150, a control input 174 connected to the first arithmetic element control field 170 of the microinstruction storage 39 output, a second data input selectively connected to a coefficient word output of the coefficient word memory 24 or to a second scratch pad memory SP1, and an output. The first arithmetic element ALU10 produces a first resultant value once during each microinstruction interval in response to the first arithmetic element control field 170 in the microinstruction word. As was previously described, the ALU10 performs a two-input add operation. Referring to the microinstruction word format in FIG. 5, the first arithmetic element control field 170 constitutes bits 90 through 103 and the first scratch pad pointer field 162 for SP0 constitutes bits 104-108.

The output of the first multiplexer 166 passes through a first staging register 114 and a second staging register 116 and then over line 115 at the 8 MHz rate to the address input of the scratch memory SP0, shown in FIG. 3. The first arithmetic element control field 170 for the ALU10 passes through the staging register 172 at a 4 MHz repetition rate and is output on line 174 to the control input of the ALU10 shown in FIG. 3. The control and operation of the scratch pad memory SP1 is similar to that described for the scratch pad memory SP0, and its control and addressing signals are output on line 117 from the control unit 2 to the scratch pad memory SP1.

As was described above, the ALU10 operates at a 4 MHz repetition rate and outputs its sum values to a first input of the multiplier 12 which also operates at the 4 MHz rate to multiply those sum values times coefficients which are input thereto from the coefficient memory 24 over line 137, at the 4 MHz repetition rate. The product values output by the multiplier 12 pass through the multiplexer 139 and through the scaler 22 to the adder ALU20. Product values at the output of the multiplier 12 are held valid for a full 250 nanosecond microinstruction interval. The multiplexer 139 can also pass data stored in the scratch pad memories PS3, SP4, or SP2. The scaler 22 operates at a 8 MHz rate, under control of line 131, passing values output from the multiplexer 139 to a first data input of the second arithmetic element, the ALU20 of the arithmetic pipeline shown in FIG. 3.

In the control unit of FIG. 21, the microinstruction words further include a third scratch pad pointer field 122 constituting bits 64-70 of FIG. 5, a fourth scratch pad pointer field 123 constituting bits 42-48 of FIG. 5, a second arithmetic element control field 124 constituting bits 71-74 of FIG. 5, and a third arithmetic element control field 125 constituting bits 49-52 of FIG. 5.

The control unit of FIG. 21 includes a second multiplexer 168 which has a clock input connected to the 8 MHz clock 152, having a first pair of inputs respectively connected to the third scratch pad pointer field 122 and a second arithmetic element control field 124 of the microinstruction storage output, having a second pair of inputs respectively connected to the fourth scratch pad pointer field 123 and the third arithmetic element control field 125 of the microinstruction storage 39 output, and having a pair of outputs. The second multiplexer 168 connects the pair of outputs thereof to the first pair of inputs thereof during the first half of the microinstruction interval and to the second pair of inputs thereof during the first half of the microinstruction interval.

The second arithmetic element ALU20 has a clock input connected to the 8 MHz clock 152, it has a first data input connected to the output of the first arithmetic element ALU10, through the multiplier 12, a second data input, a control input 131 connected to a first one of the pair of outputs from the second multiplexer 168, and an output. The second arithmetic element ALU20 produces second result values which are sums, twice during each microinstruction interval in response to the second arithmetic element control field 124 during the first half of the microinstruction interval and in response to the third arithmetic element control field 125 during the second half of the microinstruction interval.

In this manner, the second arithmetic element ALU20 is controlled by the microinstruction word so as to operate at twice the rate at which the microinstructions are accessed from the microinstruction storage 39.

A second scratch pad memory SP3 has a clock input connected to the 8 MHz clock 152, it has an address input 133 connected to a second one of the pair of outputs from the second multiplexer 168, and it has a data output connected to the second input of the second arithmetic element ALU20. The second scratch pad memory SP3 reads a first data word out of a first location therein and outputs it to the second arithmetic element ALU20 in response to the third scratch pad pointer field 122 during the first half of the microinstruction interval. The second scratch pad memory SP3 reads a second data word out of a second location therein and outputs it to the second arithmetic element ALU20 in response to the fourth scratch pad pointer field 123 during the second half of the microinstruction word. Control for the arithmetic element ALU20 passes out of the multiplexer 168 and through the first staging register 126 and the second staging register 130 at the 8 MHz rate, to be output over line 131 to the ALU20. Address and control for the scratch pad memory SP3 passes out of the multiplexer 168 and through the first staging register 128 and the second staging register 130 to be output over line 133 to the scratch pad memory SP3. A scratch pad memory SP4 shown in FIG. 3, is controlled and operates in a manner similar to that described for the scratch pad memory SP3, and receives its control and address information over line 135.

In an alternate mode of operation, the second scratch pad memory SP3 and the third scratch memory SP4 can alternately supply data to the second input of the second arithmetic element ALU20 during alternate halves of a microinstruction interval. The second scratch pad memory SP3 will read a first data word out of a first location therein and output it to the second arithmetic element ALU20 in response to the third scratch pad pointer field 122 during the first half of the microinstruction interval. The third scratch pad memory SP4 will read a second data word out of a second location therein and output it to the second arithmetic element ALU20 in response to the fourth scratch pad pointer field 123 during the second half of the microinstruction word. Both SP3 and SP4 have their address and control inputs connected to the second one of the pair of outputs of the second multiplexer 168 and that address and control information will be bused to both SP3 and SP4, with SP3 utilizing the control information during the first half and SP4 utilizing the control information during the second half of the microinstruction interval.

The ALU20 operates at an 8 MHz repetition rate and can output its sum through the scaler 23 and the rounder 26 through either the feedback scratch pad SP5 or the output scratch pad SP6. The feedback scratch pad SP5 can then supply the data to the ALU10 for further processing. The output scratch pad SP6 will transfer the processed data back to the main data memory 6.

The microinstruction words further include a scratch pad pointer field 144 which constitutes bits 25-32 of the format of FIG. 5. An address incrementer 120 has a clock input connected to the second clock 152 operating at 8 MHz, it has an address input connected to the scratch pad pointer field 144 of the microinstruction storage 39 output, and it has an output. The address incrementer 120 transfers the scratch pad pointer field 144 to the output thereof during the first half of the microinstruction interval and it increments the scratch pad pointer field 144 by the value of one at the output thereof during the second half of the microinstruction interval.

The scratch pad memory SP5 has a clock input connected to the second clock 152 operating at 8 MHz, it has an address input line 141 connected to the output of the address incrementer 120 and it has a data input connected to the output of the arithmetic element ALU20. The scratch pad memory SP5 writes a first one of the result values from the ALU20 into a first location therein in response to the scratch pad pointer field 144 during the first half of the microinstruction interval. The scratch pad memory SP5 writes a second one of the result values from the ALU20 into a second location therein in response to the incremented scratch pad pointer field 144 during the second half of the microinstruction interval.

The output of the incrementer 120 passes through the first staging register 143 and the second staging register 144 at the 8 MHz rate, and the address values and control values are output over line 141 to the scratch pad memory SP5. The scratch pad memory SP6 is connected to the control unit 2 and operates in a manner similar to that described for the scratch pad memory SP5.

With regard to the second arithmetic element ALU20, the scratch pad memory SP3 can have its data output selectively connected to the first input of the ALU20 by means of passing the output of SP3 through the multiplexer 139 and the scaler 22. In this manner, the data output from SP3 can be selectively connected to the first input and to the second input of the ALU20 during alternate halves of a microinstruction interval. A first data word can be read out of a first location in SP3 and output to the first input of the ALU20 in response to a first scratch pad pointer field 122 during the first half of the microinstruction interval and SP3 can read a second data word out of a second location therein and output it to the second input of the ALU20 in response to a second scratch pad pointer field 124 during the second half of the microinstruction word.

In an alternate mode of operation, SP3 can output a first data word during the first half of the microinstruction interval to the first input of the ALU20 through the multiplexer 139 and the scaler 22 and the second scratch pad memory SP4 can output a second data word to the second input of the ALU20 during the second half of the microinstruction interval. SP3 will read a first data word out of a first location therein and output it to the first input of the ALU20 in response to a first scratch pad pointer field 122 during the first half of the microinstruction interval and SP4 will read a second data word out of a second location therein and output it to the second input of the ALU20 in response to the second scratch pad pointer field 124 during the second half of the microinstruction interval.

Detailed Description of the Operation of the Control Unit Invention

The operation of the invention will be illustrated with the control unit 2 executing a loop while the arithmetic unit 4 carries out a simple arithmetic operation. Table 2 illustrates a sequence of microinstructions which will carry out a loop during which the arithmetic operation illustrated in the timing diagram of FIG. 13 will be performed.

In Table 2, the microinstruction page field 154 corresponds to bits 17-20 of FIG. 5, the status field 230 corresponds to the microinstruction bits 13-16 of FIG. 5, the branch pointer field 156 corresponds to the microinstruction bits 8-11, the branch control field 232 corresponds to the microinstruction bits 4-7, the main memory pointer field 145 corresponds to the microinstruction bits 117-122, the scratch pad SP0 pointer field 162 corresponds to the microinstruction bits 96-99 of FIG. 5, the scratch pad SP0 pointer field 164 corresponds to the microinstruction bits 105-108 of FIG. 5, the ALU10 field 170 corresponds to the microinstruction bits 101-103 of FIG. 5, the multiplier coefficient pointer field 160 corresponds to the microinstruction bits 80-87 of FIG. 5, the scaler and rounder field 168 corresponds to the microinstruction bits 21-35, 53-57, and 75-79 of FIG. 5, the scratch pad SP3 field 122 corresponds to the microinstruction bits 68-70 of FIG. 5, the ALU20 field 124 corresponds to the microinstruction bits 71-74 of FIG. 5, the scratch pad SP3 field 123 corresponds to the microinstruction bits 46-48 of FIG. 5, and the ALU20 field 125 corresponds to the microinstruction bits 49-52 of FIG. 5.

Table 2 illustrates a sequence of microinstruction words which are labeled by their program counter numbers 41 through 49 and 60 and 61. Microinstruction 41 initializes the loop constituted by microinstructions 42 through 48. Microinstruction 41 has page number equal to 3, the branch pointer equal to 2, and a branch control equal to initialize loop, which causes the initial loop count stack 212 to transfer the initial loop count values stored at page 3, pointer value 2, into the current loop count stack 214 at the corresponding address. The program counter 208 increments by one so that the program count 42 addresses microinstruction 42 at the beginning of the loop.

Assume now that the loop has been operating for a period of time so that the arithmetic pipeline in the arithmetic unit 4 is completely filled and operating. Microinstruction 42 through microinstruction 46 employ the same page number 3 and employ a continuation instruction in the branch control field 232 which causes the program counter 208 to increment by one at each step.

As is seen in the timing diagram of FIG. 13, microinstruction 42 contains a value in the main memory pointer field 145 to provide for address generation to the main memory 6 to access the next operand for the arithmetic unit 4. As is illustrated in the next microinstruction interval of the timing diagram of FIG. 13 and in Table 2, microinstruction 43 contains a pointer value in the scratch pad SP0 pointer field 164 indicating the location in the scratch pad pointer SP0 where the operand accessed from the main memory 6 is to be written. Also in microinstruction 43, there is an entry in the multiplier coefficient pointer field 160 to provide for address generation for the coefficient to be input to the multiplier 12.

In the next microinstruction 44, there is an entry in the scratch pad SP0 pointer field 162 indicating the address in the SP0 from which an operand is to be read for input into the adder ALU10 during the first half of the microinstruction interval SC1. There is also an entry in the ALU10 field 170 instructing the adder to add the operand input from SP0 during the first half of the microinstruction interval SC1. The sum from the adder ALU10 is output to the multiplier 12 and is available during the second half of the microinstruction interval SC2 so that the multiplier 12 can carry out its multiplication during the second half of the microinstruction SC2 and the first half of the subsequent microinstruction interval SC1, as is shown in FIG. 13.

During the next microinstruction 45, a scaling operation is carried out in the scaler 22 during the second half of the microinstruction. The scaler operation is controlled by the field 168 of the microinstruction 45.

Microinstruction 46 has a first scratch pad and ALU20 operation carried out during the first half of the microinstruction interval SC1 and a second scratch pad and ALU20 operation carried out in the second half of the microinstruction interval SC2. The SP3 field 122 has an entry calling for the transfer of the operand from a designated location therein to the ALU20 during the first half of the microinstruction interval and the ALU20 control field 124 has an entry for carrying out the designated adder operation during the first half of the interval. Then, during the second half of the microinstruction interval, the SP3 field 123 has an entry which transfers an operand to the ALU20 and the ALU20 field 125 has an entry which controls the addition of that operand during the second half of the microinstruction interval. The scaler field 168 has an entry which controls a scaling operation during the second half of the microinstruction interval.

Table 2 shows microinstruction 47 whose branch control field 232 contains a decrement loop count instruction which causes the subtracter 210 in FIG. 15 of the microinstruction sequencer 38 to decrement the current loop count value accessed from the loop count stack 214 by unity, and then replace that decremented value back into the current loop count stack 214. Microinstruction 47 also includes an entry in the main memory pointer field 145 to start the address generation operation for the main memory, to enable the storage of the result of the arithmetic pipeline operation. Microinstruction 47 also includes an entry in the scaler and rounder field 168 to cause the rounder 26 to carry out the desired rounding operation on the result of the arithmetic operation in the arithmetic pipeline 4.

Microinstruction 48 contains an entry in the branch control field 232 which is an instruction for the branch as a function of loop count and the branch pointer field 156 contains a branch pointer value to a location in page 3 of the branch as a function of loop count address stack 218, which contains the microinstruction address 42 for the head of the loop now being operated upon. This branch as a functional count (BFCU) instruction causes the stack 218 to output the value 42 to the program counter 208. The sequence decoder 206 causes the program counter 208 to pass the value 42 as a new value for PC to the address input of the microinstruction store 39, only if the sequence decoder 206 has not detected a zero detect signal from the zero circuit 228 of FIG. 15, which would indicate that the loop count had been decremented to zero and that the loop operations had been completed. If, instead, the sequence decoder 206 does in fact detect a zero detect signal from the circuit 228, then its signals to the program counter 208 that the present program count (PC) value 48 is to be incremented by unity and a new PC value 49 is to be used as the address for accessing the next microinstruction from the microinstruction store 39. This will cause the program to pass out of the current loop.

Microinstruction 49 of FIG. 2 contains an entry in the branch control field 232 which is the conditional branch instruction CBS0 which calls for the testing of the condition bit 234 by the sequence decoder 206 to determine whether the specified condition has been met and if the condition has in fact been met, the entry in the status field 230 of the microinstruction 49 specifies a branch operation to the location specified in the branch pointer field 156 of the conditional branch address stack 216. This will cause the accessing of a conditional branch address from stack 216 which is output to the program counter 208 as the next value for the program count (PC). This value is passed through the program counter 208 and is applied as the address input to the microinstruction store 39. For illustrative purposes, the new PC value accessed from the conditional branch address stack 216 is instruction number 60 shown in Table 2 which contains a new page number 5 and has a continuation instruction in its branch control field. This shows the ease and flexibility with which a change can be made from one program subroutine to another.

TABLE 2

| No. | Page | Status | Branch Pointer | Branch Control | Main Mem. Pointer | SP0 PTR Read | SP0 PTR Write | ALU10 | Coeff. Pointer | SC & RNDR | SP3 | ALU20 | SP3 | ALU20 |
|---|---|---|---|---|---|---|---|---|---|---|---|---|---|---|
| PC | | | | | | | | | | | | | | |
| 41 | 3 | | 2 | INIT | | | | | | | | | | |
| 42 | 3 | | | CONT | ADDR GEN | | | | | | | | | |
| 43 | 3 | | | CONT | | | MAIN→ SP0 | | ADDR GEN | | | | | |
| 44 | 3 | | | CONT | | SP0→ ALU10 | | ADD | COEF→ MULT | | | | | |
| 45 | 3 | | | CONT | | | | | | SC22 | | | | |
| 46 | 3 | | | CONT | | | | | | SC23 | SP3→ ALU20 | ADD | SP3→ ALU20 | ADD |
| 47 | 3 | | | DEC | ADDR GEN | | | | | RND | | | | |
| 48 | 3 | | 6(42) | BFCU | | | | | | | | | | |
| 49 | 3 | If Cond Then Branch | 8(60) | CBS0 | | | | | | | | | | |
| 60 | 5 | | | CONT | | | | | | | | | | |
| 61 | 5 | | | | | | | | | | | | | |

UNCONDITIONAL BRANCH AND CONDITIONAL BRANCH OPERATIONS

Figure 24:
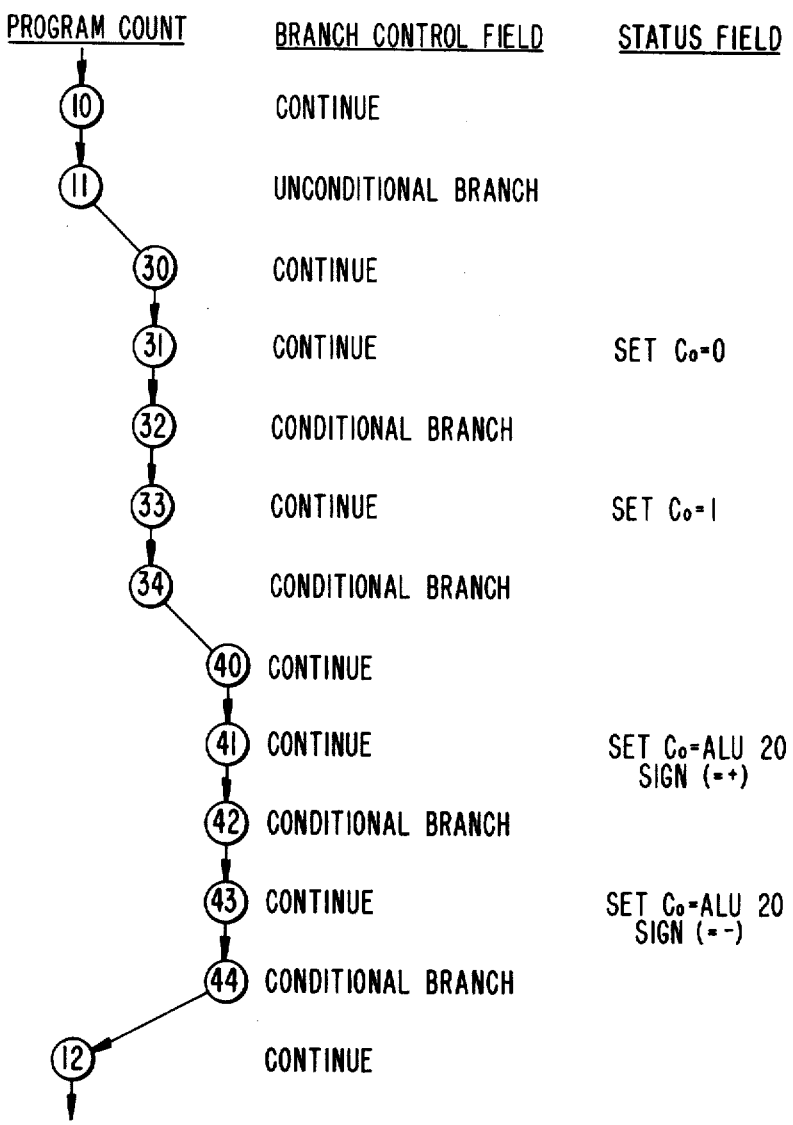
FIG. 24 is a sequential flow diagram of an example unconditional/conditional branch operation.

FIG. 24 illustrates both an unconditional branch and a conditional branch. Assume that a sequence of microinstructions 10 and 11 come to an unconditional branch which goes to a sequence of microinstructions 30 through 34 where a conditional branch is called for, which goes to a sequence of instructions 40 through 44 which is a conditional branch, which goes to a new instruction 12. As is shown in FIG. 24, microinstruction 10 contains a continuation instruction in the branch instruction field 232. This causes the program counter 208 to increment the current program count PC value by one and apply that value as the next microinstruction address. The new PC value 11 accesses microinstruction 11 which contains an unconditional branch (UB) instruction in the branch instruction field 232. The unconditional branch/conditional branch address stack 216 is accessed at the page number and branch stack pointer number address designated by microinstruction 11. The unconditional branch address accessed from the stack 216 is the new program counter PC value which we will assume to be 30. This value of 30 is passed through the program counter 208 and is applied as the new address to the microinstruction store 39.

The new sequence of microinstructions 30 through 34 which have been branched to, start with the first microinstruction 30 containing a continuation instruction in the branch instruction field 232, causing the program counter 208 to increment PC by one yielding the value 31. The next microinstruction 31 contains a continuation instruction in the branch instruction 232 also causing the program counter 208 to increment PC by one yielding the value 32. The status field 230 contains an instruction to cause the co-condition bit 234 to be set to zero. Microinstruction 32 contains the conditional branch instruction CBS0 in the branch instruction field 232. This causes the sequence decoder 206 to examine the state of the condition bit 234 and cause a conditional branch to the field in the branch stack pointer field 156 if the condition bit is a one. Since the condition bit has been set to zero, the condition is not satisfied and therefore program counter 208 is instructed by the sequence decoder 206 to increment the value PC by one, yielding the value 33.

Microinstruction 33 contains a continuation instruction in the branch instruction field 232 which causes a program counter 208 to increment the value of PC by one yielding the next value 34. During this microinstruction interval, the status field 230 contains an instruction to set the co-condition bit 234 to the value one.

The next microinstruction 34 is a conditional branch instruction CBS0 which tests the state of the condition bit 234. Since the condition bit 234 is now a one, the sequencing decoder 206 causes the conditional branch address stack 216 to output the address value stored at the page number and branch stack pointer number designated in the microinstruction 34 as the new PC value. The sequence decoder 206 causes the program counter 208 to pass this new PC value, which we will assume to be 40, as the new address input to the microinstruction store 39. The setting of the condition bit 234 can be carried out expressly by instruction from the status field 230, as is indicated in microinstruction 31 and in microinstruction 33 of FIG. 24.

In a similar manner, microinstructions 40 through 44 carry out operations in which microinstruction 40 calls for a continuation and microinstruction 41 calls for a continuation. During microinstruction 42, the status field 230 calls for the co-condition bit 234 to be set based upon the sign value of the ALU20. Assuming that the ALU sign value during that interval is positive, the condition bit 234 is set to a zero. During microinstruction 42, the conditional branch instruction CBS0 causes the testing of the condition bit 234 which detects the zero, and therefore a branch is not taken and the value of PC is incremented by one yielding a value of 43.

During microinstruction 43, the status field 230 calls for the setting of the co-condition bit 234 to the signed value ALU20 which will be assumed to be negative during that interval, and thus the condition bit 234 is set to a value of one. The microinstruction 44 contains a conditional branch instruction CBS0 in the branch instruction field 232, calling for the testing of the condition bit 234. Since the condition bit 234 is now a value of one, the conditional branch address stack 216 is accessed at the page number and branch stack pointer number contained in the microinstruction 44, and the address value is output as the new PC value which will be assumed to be 12. This value of 12 is passed through the program counter 208 to the address input of the microinstruction store 39, as the new microinstruction address for the next microinstruction. This shows the ease and flexibility with which a change can be made from one program subrountine to another.

BRANCH AND LINK OPERATIONS

Branch and link operations are illustrated with reference to FIG. 23 which shows a sequence of instructions starting with microinstructions 50 and 51 which undergo a branch and link to a sequence of instructions 70 through 79 at which a return instruction returns the program to the sequence of instructions 52 and so forth. FIG. 23 shows microinstruction 50 containing a continuation instruction in the branch control 232 causing the next program count value to be 51. Microinstruction 51 contains a branch and link (BAL) instruction in the branch control field 232 which causes the present PC value of 51 to be incremented by one yielding the value 52, which is transferred by the program counter 208, under control of the sequence decoder 206, to the input of the branch and link address store 220. The value of 52 is stored in the currently addressed location of the branch and link address store 220, which is addressed by the up/down counter 222. The sequence decoder 206 then controls the up/down counter 222 to increment its address value by one for the next storage operation in the branch and link address store 220. The number of storage locations in the branch and link address store 220 can be N=16 and in that example, the up/down counter 222 would be a mod 16 counter. The branch and link instruction in microinstruction 51 further causes the sequence decoder 206 to signal the unconditional branch/conditional branch address stack 216 to access an unconditional branch address at the location specified by the page value and branch stack pointer value in the microinstruction 51. Assume that address value so accessed in a value 70, that value is output to the program counter 208 as the new value of PC. That new PC value of 70 is then passed through the program counter 208 to the address input of the microinstruction store 39 as the address of the microinstruction which has been branched to.

FIG. 23 shows that the microinstructions from 70 through 78 all contain a continue instruction in the branch control field 232, unitl microinstruction 79 has been accessed.

Microinstuction 79 contains a return instruction in the branch control field 232, which causes the sequence decoder 206 to decrement the up/down counter 222 and apply the decremented address to the branch and link address store 220. The branch and link address store 220 is then controlled to output the previously stored value of 52 as the new PC value to the program counter 208. The program counter 208 is then controlled by the sequence decoder 206 to pass the value of 52 to the address input of the microinstruction store 39 as the return address for the program. The program then continues on with microinstructions 52, 53 and so forth.

Thus it is seen that by virtue of the unity of control conferred by the microinstruction designation of common page values for the control stacks and memory pointer stacks and the inclusion in the microinstructions of branching operation instructions, storage accessing instructions, and arithmetic operation instructions, that a closely coupled control of looping and branching control operations with storage accessing operations and pipelined arithmetic operations is achieved, which provides for immediate and flexible responses to changes in processing tasks.

Although a specific embodiment of the invention has been disclosed, it will be understood by those of skill in the art that the foregoing and other changes in form and details may be made therein without departing from the spirit and the scope of the invention.

Having thus described our invention, what we claim as new, and desire to secure by Letters Patent is:

1. A controller for a signal processing computer, comprising:

a microinstruction storage having an address input and a microinstruction word output, for storing microinstruction words, each having a page control field, a microinstruction address stack sequencing pointer field, and a main memory pointer field;

a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval;

a microinstruction address stack having a clock input connected to said first clock, having a page address input connected to the page control field of said microinstrudtion storage output, having a pointer address input connected to the microinstruction address stack sequencing pointer field of said microinstruction storage output, and having an output connected to said address input of said microinstruction storage, for storing microinstruction word addresses in a plurality of page groups, each page group being accessed by said page address input, each respective page group having a plurality of said microword addresses which are accessed by said pointer address input, said microinstruction address stack selectively accessing new microinstruction words from said microinstruction storage in response to said page field and sequencing pointer field of a current microinstruction word at said first repetition rate;

a main memory address stack having a clock input connected to said first clock, having a page address input connected to said page control field of said microinstruction storage output, having a pointer address input connected to the main memory pointer field of said microinstruction storage output, and having an output connected to an address input of a main data memory, for storing main data memory addresses in a plurality of page groups, each page group being accessed by said page address input thereof, each respective page group having a plurality of said main data memory addresses which are accessed by said pointer address input thereof, said main memory address stack selectively accessing data words from said main data memory in response to said page field and main memory pointer field of said current microinstruction word at said first repetition rate;

said microinstruction words further including a first scratch pad pointer field and a second scratch pad pointer field;

a second clock having an output, for producing a second clock signal at a second repetition rate which is twice said first repetition rate, producing two second clock pulses initiating the first half and the second half, respectively of said microinstruction interval;

a first multiplexer having a clock input connected to said second clock, having a first input connected to the first scratch pad pointer field of said microinstruction storage output, having a second input connected to the second scratch pad pointer field of said microinstruction storage output, and having an output, for connecting said output thereof to said first input thereof during said first half of said microinstruction interval and to said second input thereof during said second half of said microinstruction interval;

a first scratch pad memory having a clock input connected to said second clock, having an address input connected to said output of said first multiplexer, having a data input connected to a data output of said data memory and having a data output connected to a first input to a first arithmetic element, for reading a first data word from a first location therein, and outputting it to said arithmetic element, in response to said first scratch pad pointer field during said first half of said microinstruction interval and writing a second data word into a second location therein applied at said data input thereof from said main memory, in response to said second scratch pad pointer field during said second half of said microinstruction interval;

whereby said first scratch pad is controlled by said microinstruction word to operate at twice the rate at which said microinstructions are accessed from said microinstruction storage.

2. The controller of claim 1, which further comprises:
said microinstruction words further including a coefficient memory pointer field;

a coefficient memory address stack, having a page address input connected to said page control field of said microinstruction storage output, having a pointer address input connected to the coefficient memory pointer field of said microinstruction storage output, and having an output connected to an address input of a coefficient memory, for storing coefficient memory addresses in a plurality of page groups, each page group being accessed by said page address input thereof, each respective page group having a plurality of said coefficient memory addresses which are accessed by said pointer address input thereof, said coefficient memory address stack selectively accessing coefficient words from said coefficient memory in response to said page field and coefficient memory pointer field of said current microinstruction word at said first repetition rate;

said microinstruction words further including a first arithmetic element control field;

said first arithmetic element having a clock input connection to said first clock, a control input connected to the first arithmetic control of said microinstruction storage output, a second data input connected to a coefficient word output of said coefficient word memory and an output, for producing a first resultant value once during each microinstruction interval in response to said first arithmetic element control field.

3. The controller of claim 2, which further comprises:
said microinstruction words further including a thrid scratch pad pointer field, a fourth scratch pad pointer field, a second arithmetic element control field and a third arithmetic element control field;

a second multiplexer having a clock input connected to said second clock, having a first pair of inputs respectively connected to said third scratch pad pointer field and said second arithmetic element control field of said microinstruction storage output, having a second pair of inputs respectively connected to said fourth scratch pad pointer field and said third arithmetic element control field of said microinstruction storage output, and having a pair of outputs, for connecting said pair of outputs thereof to said first pair of inputs thereof during the first half of said microinstruction interval and to said second pair of inputs thereof during the second half of said microinstruction interval;

a second arithmetic element having a clock input connected to said second clock, having a first data input connected to said output of said first arithmetic element, a second data input, a control input connected to a first one of said pair of outputs from said second multiplexer, and an output, for producing second result values twice during each microinstruction interval in response to said second arithmetic element control field during said first half of said microinstruction interval and in response to said third arithmetic element control field during said second half of said microinstruction interval;

whereby said second arithmetic element is controlled by said microinstruction word to operate at twice the rate at which said microinstructions are accessed from said microinstruction storage.

4. The controller of claim 3, which further comprises:
a second scratch pad memory having a clock input connected to said second clock, having an address input connected to a second one of said pair of outputs from said second multiplexer and having a data output connected to said second input to said second arithmetic element, for reading a first data word out of a first location therein and outputting it to said second arithmetic element in response to said thrid scratch pad pointer field during said first half of said microinstruction interval and for reading a second data word out of a second location therein and outputting it to said second arithmetic element in response to said fourth scratch pad pointer field during said second half of said microinstruction interval.

5. The controller of claim 3, which further comprises:
a second scratch pad memory having a clock input connected to said second clock, having an address input connected to a second one of said pair of outputs from said second multiplexer and having a data output connected to said second input of said second arithmetic element, for reading a first data word out of a first location therein and outputting it to said second arithmetic element in response to said third scratch pad pointer field during said first half of said microinstruction interval;

a third scratch pad memory having a clock input connected to said second clock, having an address input connected to said second one of said pair of outputs from said second multiplexer and having a data output connected to said second input of said second arithmetic element, for reading a second data word out of a second location therein and outputting it to said second arithmetic element in response to said fourth scratch pad pointer field during said second half of said microinstruction interval.

6. The controller of claim 3, wherein said first arithmetic element is a multiplier and said second arithmetic element is an adder.

7. The controller of claim 2, wherein said first arithmetic element is a multiplier.

8. The controller of claim 3, which further comprises:
said microinstruction words further including a first scratch pad pointer field, a second scratch pad pointer field, a first arithmetic element control field and a second arithmetic element control field;
a second clock having an output, for producing a second clock signal at a second repetition rate which is twice said first repetition rate, producing two second clock pulses during said microinstruction interval;
a first multiplexer having a clock input connected to said second clock, having a first pair of inputs respectively connected to said first scratch pad pointer field and said first arithmetic element control field of said microinstruction storage output, having a second pair of inputs respectively connected to said second scratch pad pointer field and said second arithmetic element control field of said microinstruction storage output, and having a pair of outputs, for connecting said pair of outputs thereof to said first pair of inputs thereof during the first half of said microinstruction interval and to said second pair of inputs thereof during the second half of said microinstruction interval;
a first arithmetic element having a clock input connected to said second clock, having a first data input, a second data input, a control input connected to a first one of said pair of outputs from said first multiplexer, and an output, for producing first result values twice during each microinstruction interval in response to said first arithmetic element control field during said first half of said microinstruction interval and in response to said second arithmetic element control field during said second half of said microinstruction interval;
whereby said first arithmetic element is controlled by said microinstruction word to operate at twice the rate at which said microinstructions are accessed from said microinstruction storage.

9. The controller of claim 8, which further comprises:
a first scratch pad memory having a clock input connected to said second clock, having an address input connected to a second one of said pair of outputs from said first multiplexer and having a data output connected to said second input to said first arithmetic element, for reading a first data word out of a first location therein and outputting it to said first arithmetic element in response to said first scratch pad pointer field during said first half of said microinstruction interval and for reading a second data word out of a second location therein and outputting it to said first arithmetic element in response to said second scratch pad pointer field during said second half of said microinstruction interval.

10. The controller of claim 8, which further comprises:
a first scratch pad memory having a clock input connected to said second clock, having an address input connected to a second one of said pair of outputs from said first multiplexer and having a data output connected to said second input of said first arithmetic element, for reading a first data word out of a first location therein and outputting it to said first arithmetic element in response to said first scratch pad pointer field during said first half of said microinstruction interval;
a second scratch pad memory having a clock input connected to said second clock, having an address input connected to said second one of said pair of outputs from said first multiplexer and having a data output connected to said second input of said first arithmetic element, for reading a second data word out of a second location therein and outputting it to said first arithmetic element in response to said second scratch pad pointer field during said second half of said microinstruction interval.

11. The controller of claim 10, which further comprises:
said microinstruction words further including a third scratch pad pointer field;
an address incrementer having a clock input connected to said second clock, having an address input connected to said third scratch pad pointer field of said microinstruction storage output, and an output, for transferring said third scratch pad pointer field to said output thereof during said first half of said microinstruction interval and for incrementing said third scratch pad pointer field by one at said output thereof during said second half of said microinstruction interval;
a third scratch pad memory having a clock input connected to said second clock, having an address input connected to said output of said address incrementer and having a data input connected to said output of said first arithmetic element for writing a first one of said result values into a first location therein in response to said third scratch pad pointer field during said first half of said microinstruction interval and for writing a second one of said result values into a second location therein in response to said incremented third scratch pad pointer field during said second half of said microinstruction interval.

12. The controller of claim 8, wherein said first arithmetic element is an adder.

13. The controller of claim 9, which further comprises:
said microinstruction words further including a third scratch pad pointer field;
an address incrementer having a clock input connected to said second clock, having an address input connected to said third scratch pad pointer field of said microinstruction storage output, and an output, for transferring said third scratch pad pointer field to said output thereof during said first half of said microinstruction interval and for incrementing said third scratch pad pointer field by one at said output thereof during said second half of said microinstruction interval;
a second scratch pad memory having a clock input connected to said second clock, having an address input connected to said output of said address incrementer and having a data input connected to said output of said first arithmetic element for writing a first one of said result values into a first location therein in response to said third scratch pad pointer field during said first half of said microinstruction interval and for writing a second one of said result values into a second location therein in response to said incremented third scratch pad pointer field during said second half of said microinstruction interval.

14. The controller of claim 8, which further comprises:
a first scratch pad memory having a clock input connected to said second clock, having an address input connected to a second one of said pair of outputs from said first multiplexer and having a data output selectively connected to said first input and said second input to said first arithmetic element, for reading a first data word out of a first location therein and outputting it to said first input of said first arithmetic element in response to said first scratch pad pointer field during said first half of said microinstruction interval and for reading a second data word out of a second location therein and outputting it to said second input of said first arithmetic element in response to said second scratch pad pointer field during said second half of said microinstruction word.

15. The controller of claim 8, which further comprises:
a first scratch pad memory having a clock input connected to said second clock, having an address input connected to a second one of said pair of outputs from said first multiplexer and having a data output connected to said first input of said first arithmetic element, for reading a first data word out of a first location therein and outputting it to said first input of said first arithmetic element in response to said first scratch pad pointer field during said first half of said microinstruction interval;
a second scratch pad memory having a clock input connected to said second clock, having an address input connected to said second one of said pair of outputs from said first multiplexer and having a data output connected to said second input of said first arithmetic element, for reading a second data word out of a second location therein and outputting it to said second input of said first arithmetic element in response to said second scratch pad pointer field during said second half of said microinstruction word.

16. A controller for a signal processing computer, comprising:
a microinstruction storage having an address input and a microinstruction word output, for storing microinstruction words, each having a page control field, and a main memory pointer field;
a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval;
a main memory address stack having a clock input connected to said first clock, having a page address input connected to said page control field of said microinstruction storage output, having a pointer address input connected to the main memory pointer field of said microinstruction storage output, and having an output connected to an address input of a main data memory, for storing main data memory addresses in a plurality of page groups, each page group being accessed by said page address input thereof, each respective page group having a plurality of said main data memory addresses which are accessed by said pointer address input thereof, said main memory address stack selectively accessing data words from said main data memory in response to said page field and main memory pointer field of said current microinstruction word at said first repetition rate;
said microinstruction words further including a first scratch pad pointer field and a second scratch pad pointer field;
a second clock having an output, for producing a second clock signal at a second reeptition rate which is twice said first repetition rate, producing two second clock pulses during said microinstruction interval;
a first mulitplexer having a clock input connected to said second clock, having a first input connected to the first scratch pad pointer field of said microinstruction storage output, having a second input connected to the second scratch pad pointer field of said microinstruction storage output, and having an output, for connecting said output thereof to said first input thereof during the first half of said microinstruction interval and to said second input thereof during the second half of said microinstruction interval;
a first scratch pad memory having a clock input connected to said second clock, having an address input connected to said output of said first multiplexer, having a data input connected to a data output of said data memory and having a data output connected to a first input to a first arithmetic element, for reading a first data word from a first location therein, and outputting it to said arithmetic element, in response to said first scratch pad pointer field during said first half of said microinstruction interval and writing a second data word into a second location therein applied at said data input thereof from said main memory, in response to said second scratch pad pointer field during said second half of said microinstruction interval;
whereby said first scratch pad is controlled by said microinstruction word to operate at twice the rate at which said microinstructions are accessed from said microinstruction storage.

17. The controller of claim 16, which further comprises:
said microinstruction words further including a coefficient memory pointer field;
a coefficient memory address stack, having a page address input connected to said page control field of said microinstruction storage output, having a pointer address input connected to the coefficient memory pointer field of said microinstruction storage output, and having an output connected to an address input of a coefficient memory, for storing coefficient memory addresses in a plurality of page groups, each page group being accessed by said page address input thereof, each respective page group having a plurality of said coefficient memory addresses which are accessed by said pointer address input thereof, said coefficient memory address stack selectively accessing coefficient words from said coefficient memory in response to said page field and coefficient memory pointer field of said current microinstruction word at said first repetition rate;

said microinstruction words further including a first arithmetic element control field;

said first arithmetic element having a clock input connection to said first clock, a control input connected to the first arithmetic control of said microinstruction storage output, a second data input connected to a coefficient word output of said coefficient word memory and an output, for producing a first resultant value once during each microinstruction interval in response to said first arithmetic element control field.

18. The controller of claim 17, which further comprises:

said microinstruction words further including a third scratch pad pointer field, a fourth scratch pad pointer field, a second arithmetic element control field and a third arithmetic element control field;

a second multiplexer having a clock input connected to said second clock, having a first pair of inputs respectively connected to said third scratch pad pointer field and said second arithmetic element control field of said microinstruction storage output, having a second pair of inputs respectively connected to said fourth scratch pad pointer field and said third arithmetic element control field of said microinstruction storage output, and having a pair of outputs, for connecting said pair of outputs thereof to said first pair of inputs thereof during the first half of said microinstruction interval and to said second pair of inputs thereof during the second half of said microinstruction intervals;

a second arithmetic element having a clock input connected to said second clock, having a first data input connected to said output of said first arithmetic element, a second data input, a control input connected to a first one of said pair of outputs from said second multiplexer, and an output, for producing second result values twice during each microinstruction interval in response to said second arithmetic element control field during said first half of said microinstruction interval and in response to said third arithmetic element control field during said second half of said microinstruction interval;

whereby said second arithmetic element is controlled by said microinstruction word to operate at twice the rate at which said microinstructions are accessed from said microinstruction storage.

19. The controller of claim 18, which further comprises:

a second scratch pad memory having a clock input connected to said second clock, having an address input connected to a second one of said pair of outputs from said second multiplexer and having a data output connected to said second input to said second arithmetic element, for reading a first data word out of a first location therein and outputting it to said second arithmetic element in response to said third scratch pad pointer field during said first half of said microinstruction interval and for reading a second data word out of a second location therein and outputting it to said second arithmetic element in response to said fourth scratch pad pointer field during said second half of said microinstruction word.

20. The controller of claim 18, which further comprises:

a second scratch pad memory having a clock input connected to said second clock, having an address input connected to a second one of said pair of outputs from said second multiplexer and having a data output connected to said second input of said second arithmetic element, for reading a first data word out of a first location therein and outputting it to said second arithmetic element in response to said third scratch pad pointer field during said first half of said microinstruction interval;

a third scratch pad memory having a clock input connected to said second clock, having an address input connected to said second one of said pair of outputs from said second multiplexer and having a data output connected to said second input of said second arithmetic element, for reading a second data word out of a second location therein and outputting it to said second arithmetic element in response to said fourth scratch pad pointer field during said second half of said microinstruction word.

21. A controller for a signal processing computer, comprising:

a microinstruction storage having an address input and a microinstruction word output, for storing microinstruction words;

a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval;

said micronstruction words further including a first scratch pad pointer field, a second scratch pad pointer field, a first arithmetic elemeent control field and a second arithmetic element control field;

a second clock having an output, for producing a second clock signal at a second repetition rate which is twice said first repetition rate, producing two second clock pulses during said microinstruction interval;

a first multiplexer having a clock input connected to said second clock, having a first pair of inputs respectively connected to said first scratch pad pointer field and said first arithmetic element control field of said microinstruction storage output, having a second pair of inputs respectively connected to said second scratch pad pointer field and said second arithmetic element control field of said microinstruction storage output, and having a pair of outputs, for connecting said pair of outputs thereof to said first pair of inputs thereof during the first half of said microinstruction interval and to said second pair of inputs thereof during the second half of said microinstruction interval;

a first arithmetic element having a clock input connected to said second clock, having a first data input, a second data input, a control input connected to a first one of said pair of outputs from said first multiplexer, and an output, for producing first result values twice during each microinstruction interval in response to said first arithmetic element control field during said first half of said microinstruction interval and in response to said second arithmetic element control field during said second half of said microinstruction interval;

whereby said first arithmetic element is controlled by said microinstruction word to operate at twice the rate at which said microinstructions are accessed from said microinstruction storage.

22. The controller of claim 21, which further comprises:
a first scratch pad memory having a clock input connected to said second clock, having an address input connected to a second one of said pair of outputs from said first multiplexer and having a data output connected to said second input to said first arithmetic element, for reading a first data word out of a first location therein and outputting it to said first arithmetic element in response to said first scratch pad pointer field during said first half of said microinstruction interval and for reading a second data word out of a second location therein and outputting it to said first arithmetic element in response to said second scratch pad pointer field during said second half of said microinstruction interval.

23. The controller of claim 22, which further comprises:
said microinstruction words further including a third scratch pad pointer field;
an address incrementer having a clock input connected to said second clock, having an address input connected to said third scratch pad pointer field of said microinstruction storage output, and an output, for transferring said third scratch pad pointer field to said output thereof during said first half of said microinstruction interval and for incrementing said third scratch pad pointer field by one at said output thereof during said second half of said microinstruction interval;
a second scratch pad memory having a clock input connected to said second clock, having an address input connected to said output of said address incrementer and having a data input connected to said output of said first arithmetic element for writing a first one of said result values into a first location therein in response to said third scratch pad pointer field during said first half of said microinstruction interval and for writing a second one of said result values into a second location therein in response to said incremented third scratch pad pointer field during said second half of said microinstruction interval.

24. The controller of claim 21, which further comprises:
a first scratch pad memory having a clock input connected to said second clock, having an address input connected to a second one of said pair of outputs from said first multiplexer and having a data output connected to said second input of said first arithmetic element, for reading a first data word out of a first location therein and outputting it to said first arithmetic element in response to said first scratch pad pointer field during said first half of said microinstruction interval;
a second scratch pad memory having a clock input connected to said second clock, having an address input connected to said second one of said pair of outputs from said first multiplexer and having a data output connected to said second input of said first arithmetic element, for reading a second data word out of a second location therein and outputting it to said first arithmetic element in response to said second scratch pad pointer field during said second half of said microinstruction word.

25. The controller of claim 24, which further comprises:
said microinstruction words further including a third scratch pad pointer field;
an address incrementer having a clock input connected to said second clock, having an address input connected to said third scratch pad pointer field of said microinstruction storage output, and an output, for transferring said third scratch pad pointer field to said output thereof during said first half of said microinstruction interval and for incrementing said third scratch pad pointer field by one at said output thereof during said second half of said microinstruction interval;
a third scratch pad memory having a clock input connected to said second clock, having an address input connected to said output of said address incrementer and having a data input connected to said output of said first arithmetic element for writing a first one of said result values into a first location therein in response to said third scratch pad pointer field during said first half of said microinstruction interval and for writing a second one of said result values into a second location therein in response to said incremented third scratch pad pointer field during said second half of said microinstruction interval.

26. The controller of claim 21, wherein said first arithmetic element is an adder.

27. The controller of claim 21, which further comprises:
a first scratch pad memory having a clock input connected to said second clock, having an address input connected to a second one of said pair of outputs from said first multiplexer and having a data output selectively connected to said first input and said second input to said first arithmetic element, for reading a first data word out of a first location therein and outputting it to said first input of said first arithmetic element in response to said first scratch pad pointer field during said first half of said microinstruction interval and for reading a second data word out of a second location therein and outputting it to said second input of said first arithmetic element in response to said second scratch pad pointer field during said second half of said microinstruction word.

28. The controller of claim 21, which further comprises:
a first scratch pad memory having a clock input connected to said second clock, having an address input connected to a second one of said pair of outputs from said first multiplexer and having a data output connected to said first input of said first arithmetic element, for reading a first data word out of a first location therein and outputting it to said first input of said first arithmetic element in response to said first scratch pad pointer field during said first half of said microinstruction interval;
a second scratch pad memory having a clock input connected to said second clock, having an address input connected to said one of said pair of outputs from said first multiplexer and having a data output connected to said second input of said first arithmetic element, for reading a second data word out of a second location therein and outputting it to said second input of said first arithmetic element in response to said second scratch pad pointer field during said second half of said microinstruction word.

29. A controller for a signal processing computer, comprising:

a microinstruction storage having an address input and a microinstruction word output, for storing microinstruction words, each having a control field group including a page address field, a branch stack pointer field, and a branch control field, each of said words further including an arithmetic field group and a storage field group;

a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval;

a sequence decoder having a clock input connected to said first clock, a first input connected to the branch control field of said microinstruction storage output, and an output, for decoding branch control instructions in said microinstruction words at said first repetition rate;

a branch as a function of loop count (BFC) address stack having a page address input connected to the page address field of said microinstruction storage output, having a pointer address input connected to the branch stack pointer field of said microinstruction storage, having a control input connected to said output of said decoder, and having an output, for storing microinstruction loop starting point addresses in a plurality of page groups, each page group being accessed by said page address input, each respective page group having a plurality of said starting point addresses which are accessed by said pointer address input, said BFC address stack selectively outputting new loop starting point addresses in response to said decoder outputting thereto an indication that the branch control field of the most recent microinstruction word output from said microinstruction store has an end-of-loop instruction therein;

a current loop count stack having a page address input connected to the page address field of said microinstruction storage output, having a pointer address input connected to the branch stack pointer field of said microinstruction storage, having a control input connected to said output of said decoder, having an input and an output, for storing the current microinstruction loop counts in a plurality of page groups, each page group being accessed by said page address input, each respective page group having a plurality of said loop counts which are accessed by said pointer address input, said current loop count stack selectively outputting new loop counts in response to said decoder outputting thereto an indication that the branch control field of the most recent microinstruction word output from said microinstruction store has an end-of-loop instruction therein;

a decrementer having an input connected to said output of said current loop count stack and an output connected to said input of said current loop count stack, for decrementing by unity the loop count values input thereto and outputting the decremented value as the new current loop count, to said input of said current loop count stack;

a zero detector having an input connected to said output of said decrementer and an output connected as an input to said decoder, for outputting a zero detect signal to said decoder when said decremented current loop count is zero;

a program counter having a clock input connected to said first clock, an input connected to said output of said BFC address stack, a control input connected to said output of said decoder, and an output connected to said address input of said microinstruction storage, for storing the address of the most recent microinstruction word output from said microninstruction store as the program count (PC) and incrementing PC by unity at said first repetition rate, as the next microinstruction store address, said program counter selectively outputting said loop starting point address from said BFC address stack as the next microinstruction store address in response to said decoder not receiving said zero detect signal from said zero detector when said decoder outputs said indication that the branch control field of the most recent microinstruction word output from said microinstruction store has an end-of-loop instruction therein;

whereby looped microinstruction sequences can be flexibly controlled in a signal processing computer.

30. The controller of claim 29, which further comprises:

an initial loop count stack having a page address input connected to the page address field of said microinstruction storage output, having a pointer address input connected to the branch stack pointer field of said microinstruction storage, having a control input connected to said output of said decoder, and having an output, for storing the initial microinstruction loop counts in a plurality of page groups, each page group being accessed by said page address input, each respective page group having a plurality of said initial loop counts which are accessed by said pointer address input, said initial loop count stack selectively outputting new initial loop counts in response to said decoder outputting thereto an indication that the branch control field of the most recent microinstruction word output from said microinstruction store has an initialize loop instruction therein;

said decrementer having a second input connected to said output of said initial loop count stack and a control input connected to said output of said decoder, for transferring said new initial loop counts to said input of said current loop count stack without decrementation, in response to said decoder outputting thereto said indication that the branch control field of the most recent microinstruction word output from said microinstruction store has an initialize loop instruction therein;

whereby looped microinstruction sequences can be flexibly initialized in a signal processing computer.

31. The controller of claim 30, which further comprises:

said decrementer transferring said new initial loop count from said initial loop count stack to said current loop count stack, in response to said decoder receiving a zero detect signal from said zero detector when said decremented current loop count is zero;

whereby said current loop count stack can be automatically re-initialized after the completion of a loop.

32. The controller of claim 29, which further comprises:

a branch address stack having a page address input connected to the page address field of said microinstruction storage output, having a pointer address input connected to the branch stack pointer field of said microinstruction storage, having a control input connected to said output of said decoder, and having an output connected to said input of said program counter, for storing microinstruction branch destination addresses in a plurality of page groups, each page group being accessed by said page address input, each respective page group having a plurality of said branch destination addresses which are accessed by said pointer address input, said branch address stack selectively outputting new branch destination addresses in response to said decoder outputting thereto an indication that the branch control field of the most recent microinstruction word output from said microinstruction store has a branch operation instruction therein;

said program counter storing said new branch destination address as the new program count (PC) and outputting it as the next microinstruction store address in response to said decoder outputting thereto said indication that the branch control field of the most recent microinstruction word output from said microinstruction store has a branch operation instruction therein;

whereby branched microinstruction operations can be flexibly controlled in a signal processing computer.

33. The controller of claim 32, wherein said branch operation is an unconditional branch.

34. The controller of claim 32, which further comprises:

a condition bit register having an input connected to a source whose condition is to be monitored and an output connected to an input of said decoder, for storing a condition bit indicating the condition of said source;

said control field group of said microinstruction words further including a status control field;

said sequence decoder having an input connected to the status control field of said microinstruction storage output, for decoding condition response instructions in said microinstruction words at said first repetition rate;

said branch address stack storing conditional branch destination addresses, said branch address stack selectively outputting new conditional branch destination addresses in response to said decoder outputting thereto an indication that the branch control field has a conditional branch instruction therein, that the status control field has a condition response instruction therein, and that said condition bit register has the condition bit on therein;

said program counter storing said new conditional branch destination address as the new program count (PC) and outputting it as the next microinstruction store address in response to said decoder;

whereby conditional branch operations can be flexibly controlled in a signal processing computer.

35. The controller of claim 32, which further comprises:

a branch and link address store having an address input, a control input connected to an output from said decoder, a data input connected to said output of said program counter and a data output connected to said input of said program counter, having N storage locations for storing the incremented program count (PC+1) as a microinstruction return from branch address in response to said decoder outputting thereto a first indication that the branch control field of the most recent microinstruction word output from said microinstruction store has a branch and link instruction therein;

a mod N counter having a control input connected to an output of said decoder and an output connected to said address input of said branch and link address store, for incrementing by unity in response to said decoder's said first indication of said branch and link instruction and for decrementing by unity in response to said decoder outputting thereto a second indication that the branch control field of the most recent microinstruction word output from said microinstruction store has a return from branch instruction therein;

said branch and link address store outputting said stored microinstruction return from branch address in response to said decoder's said second indication of said return from branch instruction;

said program counter storing said return from branch address as the new program count (PC) and outputting it as the next microinstruction store address in response to said decoder;

whereby branch and link and return from branch operations can be flexibly controlled in a signal processing computer.

36. The controller of claim 32, which further comprises:

said microinstruction word having a main memory pointer field in said storage field group;

a main memory address stack having a clock input connected to said first clock, having a page address input connected to said page control field of said microinstruction storage output, having a pointer address input connected to the main memory pointer field of said microinstruction storage output, and having an output connected to an address input of a main data memory, for storing main data memory addresses in a plurality of page groups, each page group being accessed by said page address input thereof, each respective page group having a plurality of said main data memory addresses which are accessed by said pointer address input thereof, said main memory address stack selectively accessing data words from said main data memory in response to said page field and main memory pointer field of said current microinstruction word at said first repetition rate;

whereby microinstruction words and data to be operated upon in response thereto, can be flexibly accessed in a signal processing computer.

37. The controller of claim 36, which further comprises:

said microinstruction words further including a coefficient memory pointer field;

a coefficient memory address stack, having a page address input connected to said page control field of said microinstruction storage output, having a pointer address input connected to the coefficient memory pointer field of said microinstruction storage output, and having an output connected to an address input of a coefficient memory, for storing coefficient memory addresses in a plurality of page groups, each page group being accessed by said page address input thereof, each respective page group having a plurality of said coefficient memory addresses which are accessed by said pointer address input thereof, said coefficient memory address stack selectively accessing coefficient words from said coefficient memory in response to said page field and coefficient memory pointer field of said current microinstruction word at said first repetition rate;

whereby microinstruction words, data and coefficients to be operated upon by said microinstruction words, can be flexibly accessed in a signal processing computer.

38. The controller of claim 36, which further comprises:

said microinstruction words further including a first scratch pad pointer field and a second scratch pad pointer field in said storage field group;

a second clock having an output, for producing a second clock signal at a second repetition rate which is twice said first repetition rate, producing two second clock pulses during said microinstruction interval;

a first multiplexer having a clock input connected to said second clock, having a first input connected to the first scratch pad pointer field of said microinstruction storage output, having a second input connected to the second scratch pad pointer field of said microinstruction storage output, and having an output, for connecting said output thereof to said first input thereof during the first half of said microinstruction interval and to said second input thereof during the second half of said microinstruction interval;

a first scratch pad memory having a clock input connected to said second clock, having an address input connected to said output of said first multiplexer, having a data input connected to a data output of said data memory and having a data output connected to a first input to a first arithmetic element, for reading a first data word from a first location therein, and outputting it to said arithmetic element, in response to said first scratch pad pointer field during said first half of said microinstruction interval and writing a second data word into a second location therein applied at said data input thereof from said main memory, in response to said second scratch pad pointer field during said second half of said microinstruction interval;

whereby said first scratch pad is controlled by said microinstruction word to operate at twice the rate at which said microinstructions are accessed from said microinstruction storage.

39. The controller of claim 38, which further comprises:

said microinstruction words further including a coefficient memory pointer field;

a coefficient memory address stack, having a page address input connected to said page control field of said microinstruction storage output, having a pointer address input connected to the coefficient memory pointer field of said microinstruction storage output, and having an output connected to an address input of a coefficient memory, for storing coefficient memory addresses in a plurality of page groups, each page group being accessed by said page address input thereof, each respective page group having a plurality of said coefficient memory addresses which are accessed by said pointer address input thereof, said coefficient memory address stack selectively accessing coefficient words from said coefficient memory in response to said page field and coefficient memory pointer field of said current microinstruction word at said first repetition rate;

said microinstruction words further including a first arithmetic element control field in said arithmetic field group;

said first arithmetic element having a clock input connection to said first clock, a control input connected to the first arithmetic control of said microinstruction storage output, a second data input connected to a coefficient word output of said coefficient word memory and an output, for producing a first resultant value once during each microinstruction interval in response to said first arithmetic element control field.

40. The controller of claim 39, which further comprises:

said microinstruction words further including a third scratch pad pointer field and a fourth scratch pad pointer field in said storage field group, a second arithmetic element control field and a third arithmetic element control field in said arithmetic field group;

a second multiplexer having a clock input connected to said second clock, having a first pair of inputs respectively connected to said third scratch pad pointer field and said second arithmetic element control field of said microinstruction storage output, having a second pair of inputs respectively connected to said fourth scratch pad pointer field and said third arithmetic element control field of said microinstruction storage output, and having a pair of outputs, for connecting said pair of outputs thereof to said first pair of inputs thereof during the first half of said microinstruction interval and to said second pair of inputs thereof during the second half of said microinstruction interval;

a second arithmetic element having a clock input connected to said second clock, having a first data input connected to said output of said first arithmetic element, a second data input, a control input connected to a first one of said pair of outputs from said second multiplexer, and an output, for producing second result values twice during each microinstruction interval in response to said second arithmetic element control field during said first half of said microinstruction interval and in response to said third arithmetic element control field during said second half of said microinstruction interval;

whereby said second arithmetic element is controlled by said microinstruction word to operate at twice the rate at which said microinstructions are accessed from said microinstruction storage.

41. The controller of claim 40, which further comprises:

a second scratch pad memory having a clock input connected to said second clock, having an address input connected to a second one of said pair of outputs from said second multiplexer and having a data output connected to said second input to said second arithmetic element, for reading a first data word out of a first location therein and outputting it to said second arithmetic element in response to said third scratch pad pointer field during said first half of said microinstruction interval and for reading a second data word out of a second location therein and outputting it to said second arithmetic element in response to said fourth scratch pad pointer field during said second half of said microinstruction word.

42. The controller of claim 40, which further comprises:

a second scratch pad memory having a clock input connected to said second clock, having an address input connected to a second one of said pair of outputs from said second multiplexer and having a data output connected to said second input of said second arithmetic element, for reading a first data word out of a first location therein and outputting it to said second arithmetic element in response to said third scratch pad pointer field during said first half of said microinstruction interval;

a third scratch pad memory having a clock input connected to said second clock, having an address input connected to said second one of said pair of outputs from said second multiplexer and having a data output connected to said second input of said second arithmetic element, for reading a second data word out of a second location therein and outputting it to said second arithmetic element in response to said fourth scratch pad pointer field during said second half of said microinstruction word.

43. The controller of claim 40, wherein said first arithmetic element is a multiplier and said second arithmetic element is an adder.

44. The controller of claim 39, wherein said first arithmetic element is a multiplier.

45. The controller of claim 36, which further comprises:

said microinstruction words further including a first scratch pad pointer field and a second scratch pad pointer field in said storage field group, a first arithmetic element control field and a second arithmetic element control field in said arithmetic field group;

a second clock having an output, for producing a second clock signal at a second repetition rate which is twice said first repetition rate, producing two second clock pulses during said microinstruction interval;

a first multiplexer having a clock input connected to said second clock, having a first pair of inputs respectively connected to said first scratch pad pointer field and said first arithmetic element control field of said microinstruction storage output, having a second pair of inputs respectively connected to said second scratch pad pointer field and said second arithmetic element control field of said microinstruction storage output, and having a pair of outputs, for connecting said pair of outputs thereof to said first pair of inputs thereof during the first half of said microinstruction interval and to said second pair of inputs thereof during the second half of said microinstruction interval;

a first arithmetic element having a clock input connected to said second clock, having a first data input, a second data input, a control input connected to a first one of said pair of outputs from said first multiplexer, and an output, for producing first result values twice during each microinstruction interval in response to said first arithmetic element control field during said first half of said microinstruction interval and in response to said second arithmetic element control field during said second half of said microinstruction interval;

whereby said first arithmetic element is controlled by said microinstruction word to operate at twice the rate at which said microinstructions are accessed from said microinstruction storage.

46. The controller of claim 45, which further comprises:

a first scratch pad memory having a clock input connected to said second clock, having an address input connected to a second one of said pair of outputs from said first multiplexer and having a data output connected to said second input to said first arithmetic element, for reading a first data word out of a first location therein and outputting it to said first arithmetic element in response to said first scratch pad pointer field during said first half of said microinstruction interval and for reading a second data word out of a second location therein and outputting it to said first arithmetic element in response to said second scratch pad pointer field during said second half of said microinstruction word.

47. The controller of claim 46, which further comprises:

said microinstruction words further including a third scratch pad pointer field in said storage field group;

an address incrementer having a clock input connected to said second clock, having an address input connected to said third scratch pad pointer field of said microinstruction storage output, and an output, for transferring said third scratch pad pointer field to said output thereof during said first half of said microinstruction interval and for incrementing said third scratch pad pointer field by one at said output thereof during said second half of said microinstruction interval;

a second scratch pad memory having a clock input connected to said second clock, having an address input connected to said output of said address incrementer and having a data input connected to said output of said first arithmetic element for writing a first one of said result values into a first location therein in response to said third scratch pad pointer field during said first half of said microinstruction interval and for writing a second one of said result values into a second location therein in response to said incremented third scratch pad pointer field during said second half of said microinstruction interval.

48. The controller of claim 45, which further comprises:

a first scratch pad memory having a clock input connected to said second clock, having an address input connected to a second one of said pair of outputs from said first multiplexer and having a data output connected to said second input of said first arithmetic element, for reading a first data word out of a first location therein and outputting it to said first arithmetic element in response to said first scratch pad pointer field during said first half of said microinstruction interval;

a second scratch pad memory having a clock input connected to said second clock, having an address input connected to said second one of said pair of outputs from said first multiplexer and having a data output connected to said second input of said first arithmetic element, for reading a second data word out of a second location therein and outputting it to said first arithmetic element in response to said second scratch pad pointer field during said second half of said microinstruction word.

49. The controller of claim 48, which further comprises:

said microinstruction words further including a third scratch pad pointer field in said storage field group;

an address incrementer having a clock input connected to said second clock, having an address input connected to said third scratch pad pointer field of said microinstruction storage output, and an output, for transferring said third scratch pad pointer field to said output thereof during said first half of said microinstruction interval and for incrementing said third scratch pad pointer field by one at said output thereof during said second half of said microinstruction interval;

a third scratch pad memory having a clock input connected to said second clock, having an address input connected to said output of said address incrementer and having a data input connected to said output of said first arithmetic element for writing a first one of said result values into a first location therein in response to said third scratch pad pointer field during said first half of said microinstruction interval and for writing a second one of said result values into a second location therein in response to said incremented third scratch pad pointer field during said second half of said microinstruction interval.

50. The controller of claim 45, wherein said first arithmetic element is an adder.

51. The controller of claim 45, which further comprises:

a first scratch pad memory having a clock input connected to said second clock, having an address input connected to a second one of said pair of outputs from said first multiplexer and having a data output selectively connected to said first input and said second input to said first arithmetic element, for reading a first data word out of a first location therein and outputting it to said first input of said first arithmetic element in response to said first scratch pad pointer field during said first half of said microinstruction interval and for reading a second data word out of a second location therein and outputting it to said second input of said first arithmetic element in response to said second scratch pad pointer field during said second half of said microinstruction word.

52. The controller of claim 45, which further comprises:

a first scratch pad memory having a clock input connected to said second clock, having an address input connected to a second one of said pair of outputs from said first multiplexer and having a data output connected to said first input of said first arithmetic element, for reading a first data word out of a first location therein and outputting it to said first input of said first arithmetic element in response to said first scratch pad pointer field during said first half of said microinstruction interval;

a second scratch pad memory having a clock input connected to said second clock, having an address input connected to said second one of said pair of outputs from said first multiplexer and having a data output connected to said second input of said first arithmetic element, for reading a second data word out of a second location therein and outputting it to said second input of said first arithmetic element in response to said second scratch pad pointer field during said second half of said microinstruction word.

53. The controller of claim 36, which further comprises:

said main data memory comprising M basic storage modules (BSM), each separately accessible by a BSM pointer and all commonly accessed by said main data memory address input from said main memory address stack;

said microinstruction word having a BSM control field in said storage field group;

a modulo M counter having a control input connected to said BSM control field output of said microinstruction, for counting modulo M when an input is received on the control input thereof and outputting the count as said BSM pointer;

said BSMs each having a first multiplexer at the respective data input thereof, with a control input connected to a count value output from said modulo M counter, a first data input and a second data input being selectively, alternately connected to said data input of said respective BSM in response to said count value of said modulo M counter;

said BSMs each having a second multiplexer at the respective data output thereof, with a control input connected to a count value output from said modulo M counter, a first data output and a second data output being selectively, alternately connected to said data output of said respective BSM in response to said count value of said modulo M counter;

whereby a revolving buffer operation for said BSMs can be flexibly controlled in a signal processing computer.

54. A method for controlling a signal processing computer which includes a microinstruction storage having an address input and a microinstruction word output, for storing microinstruction words, each having a page control field, a microinstruction address stack sequencing pointer field, and a main memory pointer field, and which further includes a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval, comprising the steps of:

storing microinstruction word addresses in a plurality of page groups in a microinstruction address stack having a clock input connected to said first clock, having a page address input connected to the page control field of said microinstruction storage output, having a pointer address input connected to the microinstruction address stack sequencing pointer field of said microinstruction storage output, and having an output connected to said address input of said microinstruction storage, each page group being accessed by said page address input, each respective page group having a plurality of said microword addresses which are accessed by said pointer address input;

storing main data memory addresses in a plurality of page groups in a main memory address stack having a clock input connected to said first clock, having a page address input connected to said page control field of said microinstruction storage output, having a pointer address input connected to the main memory pointer field of said microinstruction storage output, and having an output connected to an address input of a main data memory, each page group being accessed by said page address input thereof, each respective page group having a plurality of said main data memory addresses which are accessed by said pointer address input thereof;

selectively accessing new microinstruction words form said microinstruction storage with said microinstruction address stack in response to said page field and sequencing pointer field of a current microinstruction word at said first repetition rate;

selectively accessing data words from said main data memory with said main memory address stack in response to said page field and main memory pointer field of said current microinstruction word at said first repetition rate simultaneous with said address stack accessing;

said microinstruction words further including a first scratch pad pointer field and a second scratch pad pointer field, and in which the signal processing computer further includes a second clock having an output, for producing a second clock signal at a second repetition rate which is twice said first repetition rate, producing two second clock pulses during said microinstruction interval, and which further includes a first multiplexer having a clock input connected to said second clock, having a first input connected to the first scratch pad pointer field of said microinstruction storage output, having a second input connected to the second scratch pad pointer field of said microinstruction storage output, and having an output, the method further comprising the steps of:

connecting said output of said first multiplexer to said first input thereof during the first half of said microinstruction interval and to said second input thereof during the second half of said microinstruction interval;

said signal processing computer further including a first scratch pad memory having a clock connected to said second clock, having an address input connected to said output of said first multiplexer, having a data input connected to a data output of said data memory and having a data output connected to a first input to a first arithmetic element;

reading a first data word from a first location in said first scratch pad memory and outputting it to said arithmetic element, in response to said first scratch pad pointer field during said first half of said microinstruction interval; and writing a second data word a second location in said first scratch pad memory, applied at said data input thereof from said main memory, in response to said second scratch pad pointer field during said second half of said microinstruction interval;

whereby said first scratch pad is controlled by said microinstruction word to operate at twice the rate at which said microinstructions are accessed from said microinstruction storage.

55. The method of claim 54, said microinstruction words further including a first scratch pad pointer field, a second scratch pad pointer field, a first arithmetic element control field, and a second arithmetic element control field, and in which the signal processing computer further includes a second clock having an output, for producing a second clock signal at a second repetition rate which is twice said first repetition rate, producing two second clock pulses during said microinstruction interval, and which further includes a first multiplexer having a clock input connected to said second clock, having a first pair of inputs respectively connected to said first scratch pad pointer field and said first arithmetic element control field of said microinstruction storage output, having a second pair of inputs respectively connected to said second scratch pad pointer field and said second arithmetic element control field of said microinstruction storage output, and having a pair of outputs, the method further comprising the steps of:

connecting said pair of outputs of said first multiplexer to said first pair of inputs thereof during the first half of said microinstruction interval and to said second pair of inputs thereof during the second half of said microinstruction interval;

producing first result values twice during each microinstruction interval in response to said first arithmetic element control field during said first half of said microinstruction interval and in response to said second arithmetic element control field during said second half of said microinstruction interval, in a first arithmetic element having a clock input connected to said second clock, having a first data input, a second data input, a control input connected to a first one of said pair of outputs from said first multiplexer, and an output;

whereby said first arithmetic element is controlled by said microinstruction word to operate at twice the rate at which said microinstructions are accessed from said microinstruction storage.

56. The method of claim 55, said signal processing computer further including a first scratch pad memory having a clock input connected to said second clock, having an address input connected to a second one of said pair of outputs from said first multiplexer and having a data output connected to said second input to said first arithmetic element, the method further comprising the steps of:

reading a first data word out of a first location therein and outputting it to said first arithmetic element in response to said first scratch pad pointer field during said first half of said microinstruction interval and for reading a second data word out of a second location therein and outputting it to said first arithmetic element in response to said second scratch pad pointer field during said second half of said microinstruction word;

a second scratch pad memory having a clock input connected to said second clock, having an address input connected to said second one of said pair of outputs from said first multiplexer and having a data output connected to said second input of said first arithmetic element, for reading a second data word out of a second location therein and outputting it to said second input of said first arithmetic element in response to said second scratch pad pointer field during said second half of said microinstruction word.

57. A method for controlling a signal processing computer which includes a microinstruction storage having an address input and a microinstruction word output, for storing microinstruction words, each having a page control field, and a main memory pointer field, and which further includes a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval, comprising the steps of:

- storing main data memory addresses in a plurality of page groups in a main memory address stack having a clock input connected to said first clock, having a page address input connected to said page control field of said microinstruction storage output, having a pointer address input connected to the main memory pointer field of said microinstruction storage output, and having an output connected to an address input of a main data memory, each page group being accessed by said page address input thereof, each respective page group having a plurality of said main data memory addresses which are accessed by said pointer address input thereof;
- selectively accessing data words from said main data memory with said main memory stack in response to said page field and main memory pointer field of said current microinstruction word at said first repetition rate;
- said microinstruction words further including a first scratch pad pointer field and a second scratch pad pointer field and said signal processing computer further including a second clock having an output, for producing a second clock signal at a second repetition rate which is twice said first repetition rate, producing two second clock pulses during said microinstruction interval and further including a first multiplexer having a clock input connected to said second clock, having a first input connected to the first scratch pad pointer field of said microinstruction storage output, having a second input connected to the second scratch pad pointer field of said microinstruction storage output, and having an output;
- connecting said output of said first multiplexer to said first input thereof during the first half of said microinstruction interval and to said second input thereof during the second half of said microinstruction interval;
- said signal processing computer further including a first scratch pad memory having a clock input connected to said second clock, having an address input connected to said output of said first multiplexer, having a data input connected to a data output of said data memory and having a data output connected to a first input to a first arithmetic element;
- reading a first data word from a first location in said first scratch pad memory, and outputting it to said arithmetic element, in response to said first scratch pad pointer field during said first half of said microinstruction interval;
- writing a second data word into a second location in said first scratch pad memory applied at said data input thereof from said main memory, in response to said second scratch pad pointer field during said second half of said microinstruction interval;
- whereby said first scratch pad is controlled by said microinstruction word to operate at twice the rate at which said microinstructions are accessed from said microinstruction storage.

58. A method for controlling a signal processing computer which includes a microinstruction storage having an address input and a microinstruction word output, for storing microinstruction words, and which further includes a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval, said microinstruction words further including a first scratch pad pointer field, a second scratch pad pointer field, a first arithmetic element control field and a second arithmetic element control field, the signal processing computer further including a second clock having an output, for producing a second clock signal at a second repetition rate which is twice said first repetition rate, producing two second clock pulses during said microinstruction interval, and which still further includes a first multiplexer having a clock input connected to said second clock, having a first pair of inputs respectively connected to said first scratch pad pointer field and said first arithmetic element control field of said microinstruction storage output, having a second pair of inputs respectively connected to said second scratch pad pointer field and said second arithmetic element control field of said microinstruction storage output, and having a pair of outputs, the method comprising the steps of:

- connecting said pair of outputs of said first multiplexer to said first pair of inputs thereof during the first half of said microinstruction interval and to said second pair of inputs thereof during the second half of said microinstruction interval;
- producing first result values twice during each microinstruction interval in response to said first arithmetic element control field during said first half of said microinstruction interval and in response to said second arithmetic element control field during said second half of said microinstruction interval in a first arithmetic element having a clock input connected to said second clock, having a first data input, a second data input, a control input connected to a first one of said pair of outputs from said first multiplexer, and an output;
- whereby said first arithmetic element is controlled by said microinstruction word to operate at twice the rate at which said microinstructions are accessed from said microinstruction storage.

59. The method of claim 58, the signal processing computer further including a first scratch pad memory having a clock input connected to said second clock, having an address input connected to a second one of said pair of outputs from said first multiplexer and having a data output connected to said second input to said first arithmetic element, the method further comprising the steps of:

reading a first data word out of a first location in said first scratch pad and outputting it to said first arithmetic element in response to said first scratch pad pointer field during said first half of said microinstruction interval; and reading a second data word out of a second location in said first scratch pad and outputting it to said first arithmetic element in response to said second scratch pad pointer field during said second half of said microinstruction word.

60. The method of claim 59, said microinstruction words further including a third scratch pad pointer field, the signal processing computer further including an address incrementer having a clock input connected to said second clock, having an address input connected to said third scratch pad pointer field of said microinstruction storage output, and an output, and further including a second scratch pad memory having a clock input connected to said second clock, having an address input connected to said output of said address incrementer and having a data input connected to said output of said first arithmetic element, the method further comprising the steps of:

transferring said third scratch pad pointer field to said output thereof during said first half of said microinstruction interval and for incrementing said third scratch pad pointer field by one at said output thereof during said second half of said microinstruction interval;

writing a first one of said result values into a first location therein in response to said third scratch pad pointer field during said first half of said microinstruction interval;

writing a second one of said result values into a second location therein in response to said incremented third scratch pad pointer field during said second half of said microinstruction interval.

61. The method of claim 58, the signal processing computer further including a first scratch pad memory having a clock input connected to said second clock, having an address input connected to a second one of said pair of outputs from said first multiplexer and having a data output selectively connected to said first input and said second input to said first arithmetic element, the method further comprising the steps of:

reading a first data word out of a first location of said first scratch pad memory and outputting it to said first input of said first arithmetic element in response to said first scratch pad pointer field during said first half of said microinstruction interval;

reading a second data word out of a second location of said scratch pad memory and outputting it to said second input of said first arithmetic element in response to said second scratch pad pointer field during said second half of said microinstruction word.

62. The method of claim 58, the signal processing computer further including a first scratch pad memory having a clock input connected to said second clock, having an address input connected to a second one of said pair of outputs from said first multiplexer and having a data output connected to said first input of said first arithmetic element, and further including a second scratch pad memory having a clock input connected to said second clock, having an address input connected to said second one of said pair of outputs from said first multiplexer and having a data output connected to said second input of said first arithmetic element, the method further comprising the steps of:

reading a first data word out of a first location therein and outputting it to said first input of said first arithmetic element in response to said first scratch pad pointer field during said first half of said microinstruction interval;

reading a second data word out of a second location therein and outputting it to said second input of said first arithmetic element in response to said second scratch pad pointer field during said second half of said microinstruction word.

63. A method for controlling a signal processing computer, which includes a microinstruction storage having an address input and a microinstruction word output, for storing microinstruction words, each having a control field group including a page address field, a branch stack pointer field, and a branch control field, each of said words further including an arithmetic field group and a storage field group, and which further includes a first clock connected to said microinstruction storage, for producing a first clock signal at a first repetition rate to signal said microinstruction storage to output said microinstruction words at said first repetition rate, each microinstruction word respectively accessed at an address applied to said address input thereof during a corresponding microinstruction interval, comprising the steps of:

decoding branch control instructions in said microinstruction words at said first repetition rate in a sequence decoder having a clock input connected to said first clock, a first input connected to the branch control field of said microinstruction storage output, and an output;

storing microinstruction loop starting point addresses in a plurality of page groups in a branch as a function of loop count (BFC) address stack having a page address input connected to the page address field of said microinstruction storage output, having a pointer address input connected to the branch stack pointer field of said microinstruction storage, having a control input connected to said output of said decoder, and having an output, each page group being accessed by said page address input, each respective page group having a plurality of said starting point addresses which are accessed by said pointer address input;

selectively outputting new loop starting point addresses from said BFC address stack in response to said decoder outputting thereto an indication that the branch control field of the most recent microinstruction word output from said microinstruction store has an end-of-loop instruction therein;

storing the current microinstruction loop counts in a plurality of page groups in a current loop count stack having a page address input connected to the page address field of said microinstruction storage output, having a pointer address input connected to the branch stack pointer field of said microinstruction storage, having a control input connected to said output of said decoder, having an input and an output, each page group being accessed by said page address input, each respective page group having a plurality of said loop counts which are accessed by said pointer address input;

selectively outputting new loop counts from said current loop count stack in response to said decoder outputting thereto an indication that the branch control field of the most recent microinstruction word output from said microinstruction store has an end-of-loop instruction therein;

decrementing by unity the loop count values in a decrementer having an input connected to said output of said current loop count stack and an output connected to said input of said current loop count stack, and outputting the decremented value as the new current loop count, to said input of said current loop count stack;

outputting a zero detect signal to said decoder from a zero detector having an input connected to said output of said decrementer and an output connected as an input to said decoder, when said decremented current loop count is zero;

storing the address of the most recent microinstruction word output from said microinstruction store as the program count (PC) and incrementing PC by unity at said first repetition rate in a program counter having a clock input connected to said first clock, an input connected to said output of said BFC address stack, a control input connected to said output of said decoder, and an output connected to said address input of said microinstruction storage, as the next microinstruction store address;

selectively outputting said loop starting point address through said program counter from said BFC address stack as the next microinstruction store address in response to said decoder not receiving said zero detect signal from said zero detector when said decoder outputs said indication that the branch control field of the most recent microinstruction word output from said microinstruction store has an end-of-loop instruction therein;

whereby looped microinstruction sequences can be flexibly controlled in a signal processing computer.

64. The method of claim 63, which further comprises the steps of:

storing initial microinstruction loop counts in a plurality of page groups in an initial loop count stack having a page address input connected to the page address field of said microinstruction storage output, having a pointer address input connected to the branch stack pointer field of said microinstruction storage, having a control input connected to said output of said decoder, and having an output, each page group being accessed by said page address input, each respective page group having a plurality of said initial loop counts which are accessed by said pointer address input;

selectively outputting new initial loop counts from said initial loop count stack in response to said decoder outputting thereto an indication that the branch control field of the most recent microinstruction word output from said microinstruction store has an initialize loop instruction therein;

transferring said new initial loop counts to said input of said current loop count stack without decrementation from said decrementer having a second input connected to said output of said initial loop count stack and a control input connected to said output of said decoder, for transferring said new initial loop counts to said input of said current loop count stack without decrementation, in response to said decoder outputting thereto said indication that the branch control field of the most recent microinstruction word output from said microinstruction store has an initialize loop instruction therein;

whereby looped microinstruction sequences can be flexibly initialized in a signal processing computer.

65. The method of claim 64, which further comprises the steps of:

transferring said new initial loop count through said decrementer from said initial loop count stack to said current loop count stack, in response to said decoder receiving a zero detect signal from said zero detector when said decremented current loop count is zero;

whereby said current loop count stack can be automatically re-initialized after the completion of a loop.

66. The method of claim 63, which further comprises the steps of:

storing microinstruction branch destination addresses in a plurality of page groups in a branch address stack having a page address input connected to the page address field of said microinstruction storage output, having a pointer address input connected to the branch stack pointer field of said microinstruction storage, having a control input connected to said output of said decoder, and having an output connected to said input of said program counter, each page group being accessed by said page address input, each respective page group having a plurality of said branch destination addresses which are accessed by said pointer address input;

selectively outputting new branch destination addresses from said branch address stack in response to said decoder outputting thereto an indication that the branch control field of the most recent microinstruction word output from said microinstruction store has a branch operation instruction therein;

storing said new branch destination address as the new program count (PC) and outputting it as the next microinstruction store address from said program counter in response to said decoder outputting thereto said indication that the branch control field of the most recent microinstruction word output from said microinstruction store has a branch operation instruction therein;

whereby branched microinstruction operations can be flexibly controlled in a signal processing computer.

67. The method of claim 66, wherein said branch operation is an unconditional branch.

68. The method of claim 66, which further comprises the steps of:

storing a condition bit indicating the condition of a source in a condition bit register having an input connected to a source whose condition is to be monitored and an output connected to an input of said decoder;

decoding condition response instructions in said microinstruction words at said first repetition rate in said sequence decoder having an input connected to a status control field of said microinstruction storage output;

storing conditional branch destination addresses in said branch address stack and selectively outputting new conditional branch destination addresses in response to said decoder outputting thereto an indication that the branch control field has a conditional branch instruction therein, that the status control field has a condition response instruction therein, and that said condition bit register has the condition bit on therein;

storing said new conditional branch destination address in said program counter as the new program count (PC) and outputting it as the next microinstruction store address in response to said decoder;

whereby conditional branch operations can be flexibly controlled in a signal processing computer.

69. The method of claim 66, which further comprises the steps of:

storing the incremented program count (PC+1) as a microinstruction return from branch address in a branch and link address store having an address input, a control input connected to an output from said decoder, a data input connected to said output of said program counter and a data output connected to said input of said program counter, having N storage locations, in response to said decoder outputting thereto a first indication that the branch control field of the most recent microinstruction word output from said microinstruction store has a branch and link instruction therein;

incrementing a mod N counter by unity, having a control input connected to an output of said decoder and an output connected to said address input of said branch and link address store, in response to said decoder's said first indication of said branch and link instruction and decrementing said mod N counter by unity in response to said decoder outputting thereto a second indication that the branch control field of the most recent microinstruction word output from said microinstruction store has a return from branch instruction therein;

outputting said stored microinstruction return from branch address from said branch and link address store in response to said decoder's said second indication of said return from branch instruction;

storing said return from branch address in said program counter as the new program count (PC) and outputting it as the next microinstruction store address in response to said decoder;

whereby branch and link and return from branch operations can be flexibly controlled in a signal processing computer.

* * * * *